(12) United States Patent
Kawamura

(10) Patent No.: US 7,783,922 B2
(45) Date of Patent: Aug. 24, 2010

(54) STORAGE CONTROLLER, AND STORAGE DEVICE FAILURE DETECTION METHOD

(75) Inventor: Shunji Kawamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 395 days.

(21) Appl. No.: 11/971,395

(22) Filed: Jan. 9, 2008

(65) Prior Publication Data

US 2009/0106583 A1 Apr. 23, 2009

(30) Foreign Application Priority Data

Oct. 23, 2007 (JP) ............................. 2007-275775

(51) Int. Cl.
*G06F 11/00* (2006.01)
(52) U.S. Cl. ............................................ 714/20; 714/5
(58) Field of Classification Search .................. 714/20, 714/5, 6, 42, 54, 718, 719, 766; 711/114
See application file for complete search history.

(56) References Cited

U.S. PATENT DOCUMENTS 5,805,788 A * 9/1998 Johnson ........................ 714/6

2005/0071553 A1 3/2005 Mannen et al.
2006/0136777 A1 * 6/2006 Terashita et al. ............... 714/6
2007/0011598 A1 * 1/2007 Hassner et al. ............. 714/801

FOREIGN PATENT DOCUMENTS

| JP | 2001-338468 | 12/2001 |
| JP | 2004-288078 | 10/2004 |
| JP | 2006-164319 | 6/2006 |

* cited by examiner

*Primary Examiner*—Dieu-Minh Le
(74) *Attorney, Agent, or Firm*—Brundidge & Stanger, P.C.

(57) ABSTRACT

Even when a failure incapable of being detected by a single guarantee code occurs in data, a storage controller of the present invention can detect and restore this failure. The controller, upon receiving a write command from a host, establish a first data guarantee code in the write data, and establish a second data guarantee code in the parity related to the write data. Upon receiving a read command from the host, the controller determines the correctness of the data based on the first data guarantee code, and also detects the presence or absence of a failure by comparing the first data guarantee code with the second data guarantee code. When a failure is detected, the controller restores the failure on the basis of RAID technology.

15 Claims, 39 Drawing Sheets

FIG. 24

| DRIVE 0 | DRIVE 1 | DRIVE 2 | DRIVE 3 |
|---|---|---|---|
| D00 | D01 | D00 | D01 |
| GC-D00 (LA, LRC) | GC-D01 (LA, LRC) | GC-D00 (LA, LRC) | GC-D01 (LA, LRC) |

FIG. 27

| DRIVE 0 | DRIVE 1 | DRIVE 2 | DRIVE 3 |
|---|---|---|---|
| D00 | D01 | D00 | D01 |
| GC-D00 (LA, LRC, TC, SEQ#) | GC-D01 (LA, LRC, TC, SEQ#) | GC-D00 (LA, LRC, TC, SEQ#) | GC-D01 (LA, LRC, TC, SEQ#) |

# STORAGE CONTROLLER, AND STORAGE DEVICE FAILURE DETECTION METHOD

CROSS-REFERENCE TO PRIOR APPLICATION

This application relates to and claims the benefit of priority from Japanese Patent Application number 2007-275775, filed on Oct. 23, 2007, the entire disclosure of which is incorporated herein by reference.

BACKGROUND OF THE INVENTION

1. Field of the Invention

The present invention relates to a storage controller and a storage device failure detection method.

2. Description of the Related Art

A storage controller provides a host computer with redundant storage areas based on RAID (Redundant Array of Inexpensive Disks). Therefore, even if a failure should occur in one of the storage devices, parity data can be used to recover the data.

Furthermore, to enhance data protection reliability, technology for adding a guarantee code to data and storing the guarantee code-appended data in a storage device is known (Japanese Patent Laid-open Nos. 2004-288078, 2006-164319 and 2001-338468). For example, a combination of a LA (Logical Address) and LRC (Longitudinal Redundancy Check) is used as the guarantee code. The logical address is a logical block address, which a host computer specifies as the access target. The LRC is a value determined for carrying out an exclusive OR operation for a logical block of data.

The guarantee code is made correspondent to the data and stored in a storage device. When the data is read out from the storage device, the guarantee code is read out together with the data, and the guarantee code is checked. Consequently, it is possible to determine whether or not the data was read out from the correct location, and also whether or not there was a change in data bits that were read out.

However, an abnormality or the mechanical vibration of the control circuit inside the storage device can result in the updating of data in a location other than the location that is supposed to be updated. For example, in the case of a device, such as a hard disk device, in which old data is overwritten with new data, a write-error failure occurs when old data cannot be overwritten with new data in a target location.

Since the target location is not updated with new data, the data read out from this target location is still the old data. However, the guarantee code added to this old data only guarantees that this old data was read out from the original location, and that the bits have not changed. Therefore, when old data is read out from a location, which should have been updated, there is no means of checking if this data is new data, and it is not possible to detect that updating of the old data failed. This is called a write-error failure in this specification.

Conversely, in the case of a device, such as a flash memory device, which updates address mapping such that new data is written to a page other than the page in which the old data is stored, and the page to which the new data was written becomes the valid page, there is the danger of a read-error failure occurring. When old data is mistakenly read out from the page on which the old data is written when the intention was to read out the new data, this error cannot be detected.

Accordingly, in a second prior art (Japanese Patent Laid-open No. 2006-164319), historical information, which is updated in line with the updating of data to be stored in a first sector, is respectively added to the relevant data and the data to be stored in a second sector, and the historical information added to the data stored in the first sector is collated against the historical information added to the data stored in the second sector. Consequently, the second prior art verifies the data, which is stored in the first sector.

The prior art verifies whether or not stored data is correct by respectively storing historical information in the first sector and the second sector. However, the restoration of data in which an error is detected is not considered.

SUMMARY OF THE INVENTION

With the foregoing problems in view, an object of the present invention is to provide a storage controller and a storage device failure detection method, which makes it possible to detect whether or not a failure has occurred in data stored in a storage device, and to restore the detected failure. Another object of the present invention is to provide a storage controller and storage device failure detection method, which, even for a failure that is difficult to restore based on RAID, makes it possible to restore the failure by waiting for all the data in the same stripe to be assembled. Further objects of the present invention should become clear from the following descriptions of the aspects of the embodiment.

To solve for the above-mentioned problems, a storage controller according to a first aspect of the present invention is a storage controller for inputting/outputting data to/from a storage device in accordance with a request from a host computer, and comprises a check data setting unit, which creates a first check data and a second check data on the basis of a first data received from the host computer, and which associates the first check data with the first data and stores the associated first check data in a first storage area in which the first data is stored, and associates the second check data with a second data which is associated to the first data, and stores the associated second check data in a second storage area; a checking unit, which, when the first data is read out from the first storage area, checks whether or not the first check data read out from the first storage area matches the second check data read out from the second storage area, and which, when the first check data matches the second check data, determines that the first data is correctly read out from the first storage area, and when the first check data and second check data do not match, detects an occurrence of a failure; and a restore unit, which, when the checking unit detects a failure, restores the failure in use of the second data.

In a second aspect, the first check data and the second check data respectively comprise update sequence information showing the update sequence of the first data stored in the first storage area, and when the first check data and second check data do not match, the checking unit compares the update sequence information inside the first check data with the update sequence information inside the second check data, determines whether one of the first data and second data is older than the other, and determines that older data is incorrect data.

In a third aspect according to the second aspect, the update sequence information comprises either one of an update time, which shows the time at which the first data has been stored in the first storage area, and a sequence number, which shows the order in which the first data has been issued from the host computer.

In a fourth aspect according to the second aspect, the update sequence information comprises both the update time, which shows the time at which the first data has been stored in the first storage area, and the sequence number, which shows the order in which the first data was issued from the host computer, and the checking unit determines whether one of the first data and the second data is older than the other based on the update time in the first check data and the update time in the second check data, and furthermore, when the update time in the first check data and the update time in the second check data are the same time, determines that data with smaller sequence numbers is older data based on the sequence number in the first check data and the sequence number in the second check data.

In a fifth aspect according to the first aspect, the check data setting unit creates the first check data and the second check data as the same data.

In a sixth aspect according to the first aspect, the check data setting unit creates the second check data from a portion of the first check data.

In a seventh aspect according to the first aspect, a plurality of the respectively different first data exist in the same stripe, and the second data is created as parity data of the respective first data.

In an eighth aspect according to the seventh aspect, the restore unit uses the plurality of first data and the second data in accordance with RAID and restores either one or both of the first data for which a read is requested by the host computer, or the second data, which is to be updated in accordance with the first data for which an update is requested by the host computer.

In a ninth aspect according to the seventh aspect, when the host computer requests an update of the first data stored in the first storage area, and the failure is detected, the restore unit stores new first data received from the host computer in the first storage area until all the new first data are assembled in the same stripe, and when all the new first data have been assembled in the same stripe, creates the second data based on these respective first data.

In a tenth aspect according to the eighth aspect, when the host computer requests an update of the first data stored in the first storage area, and the failure, which is determined to be unrestorable in use of RAID, is detected, the restore unit stores new first data received from the host computer in the first storage area until all new first data are assembled in the same stripe, and when all the new first data have been assembled in the same stripe, creates the second data based on these respective first data.

In an eleventh aspect according to the first aspect, the storage device is constituted as a device for storing new first data in an address that differs from a storage-destination address of a stored first data, and for updating the stored first data with a new first data by changing address mapping.

In a twelfth aspect according to the first aspect, the storage device is constituted as a device for updating the stored first data with the new first data by storing the new first data in the same address as the storage-destination address of the stored first data.

In a thirteenth aspect according to the tenth aspect, the restore unit is constituted so as to notify the host computer of all the new first data in the same stripe, which are necessary for creating the second data.

A storage device failure detection method, which accords with a fourteenth aspect, and which detects and restores a failure of data stored in a storage device, respectively executes a step for creating a first check data based on a first data when the first data received from a host computer, is written to the storage device, associating this first check data with the first data, and storing the associated first check data in a first storage area; a step for creating a second check data which is associated with the first check data, associating this second check data with a second data associated to the first data, and storing this associated second check data in a second storage area; a step for checking whether or not the first check data read out from the first storage area matches the second check data read out from the second storage area when the first data is read out from the first storage area; a step for determining that the first data was correctly read out from the first storage area when the first check data matches the second check data; a step for detecting the occurrence of a failure when the first check data does not match with the second check data; and a step for using the second data to restore a failure when the failure is detected by a checking unit.

In a fifteenth aspect according to the fourteenth aspect, the first check data and the second check data respectively comprise update sequence information, which shows the update sequence of the first data stored in the first storage area, and when the first check data and the second check data do not match, steps are executed for comparing the update sequence information in the first check data against the update sequence information in the second check data, determining if either the first data or the second data is old data, and detecting the occurrence of a failure in the old data.

A storage controller according to a sixteenth aspect is a storage controller, which operates in accordance with a request from a host computer, and comprises a controller, which controls a plurality of storage devices in accordance with a request from the host computer, and the controller comprises a first communication control unit for communicating with the host computer; a second communication control unit for communicating with the respective storage devices, which provide respective storage areas; a check data setting unit, which creates a first check data and a second check data on the basis of a first data received via the first communication control unit from the host computer, and which associates the first check data with the first data and stores the associated first check data via the second communication control unit in a first storage area in which the first data is stored, and associates the second check data with parity data, which is created based on the first data and other first data in the same stripe, and stores the second check data via the second communication control unit in a second storage area; a checking unit, which checks whether or not the first check data corresponding to the first data read out via the second communication control unit from the first storage area matches the second check data read out via the second communication control unit from the second storage area, and which, when the first check data matches the second check data, determines that the first data was read out correctly from the first storage area, and when the first check data and second check data do not match, detects the occurrence of a failure; and a restore unit, which restores a failure when the checking unit detects the failure, and which, when it is possible to restore the failure on the basis of RAID, restores the first data, in which the failure occurred, based on the other first data and parity data in the same stripe, and when it is not possible to restore the failure on the basis of RAID, stores a new first data received from the host computer in the first storage area until all the new first data are assembled in the same stripe, and when all the new first data have been assembled in the same stripe, creates a new parity data based on these respective first data.

At least a portion of the respective units or respective steps of the present invention can be constituted as a computer program. This computer program can either be affixed to a recording medium and distributed, or can be delivered via a network. Further, combinations other than the combinations expressed in the respective aspects can also be formed, and combinations such as these are also comprised in the scope of the present invention.

BRIEF DESCRIPTION OF THE DRAWINGS

FIG. 24 is a schematic diagram showing a data guarantee code configuration method used by a storage controller related to a fourth embodiment;

FIG. 27 is a schematic diagram showing another data guarantee code configuration method;

DESCRIPTION OF THE SPECIFIC EMBODIMENTS

Figure 1:
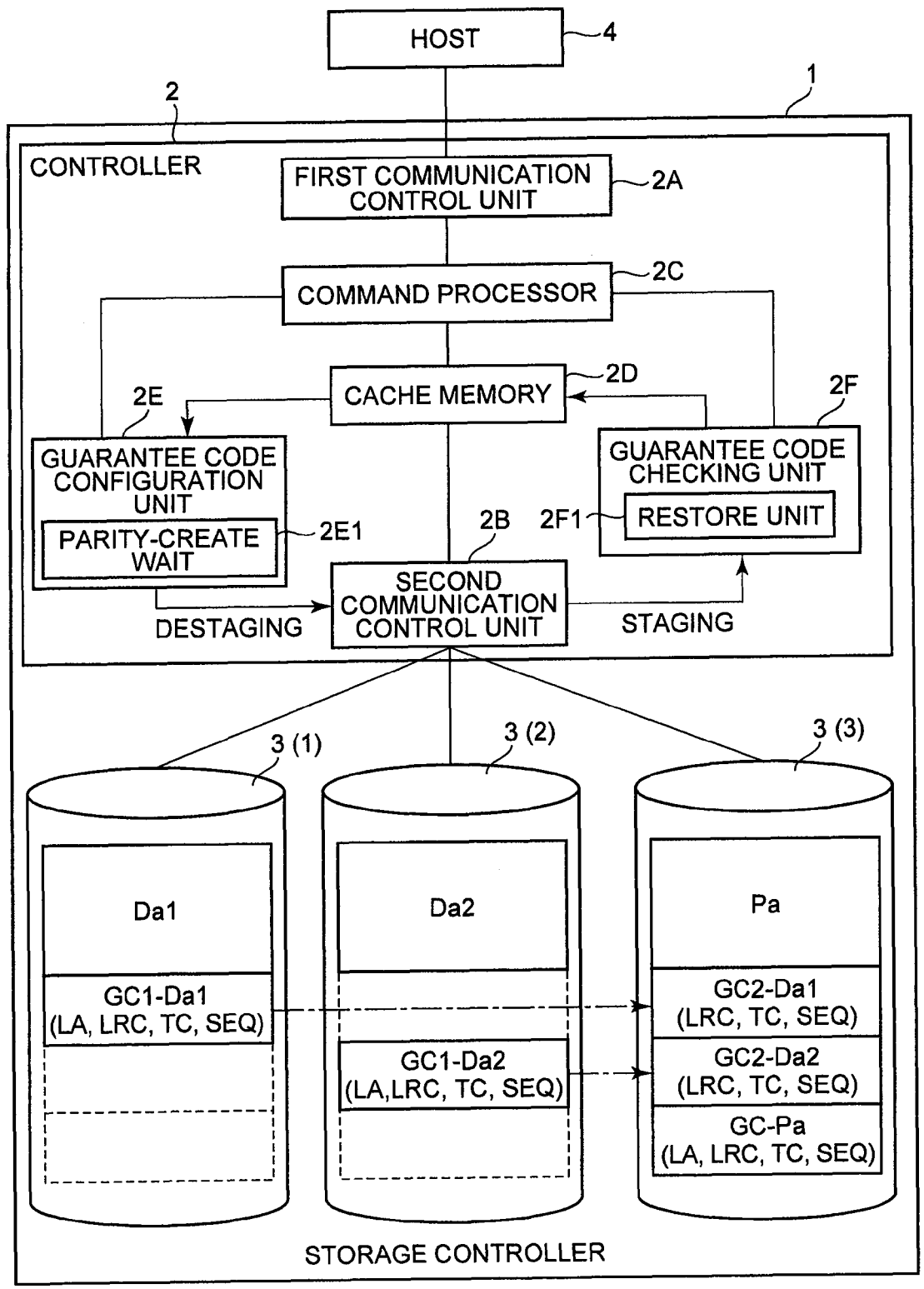
FIG. 1 is a schematic diagram showing the overall concept of the present invention.

The embodiments of the present invention will be explained hereinbelow based on the figures. First, the concept of the present invention will be explained initially, and thereafter specific embodiments will be explained. FIG. 1 is a diagram schematically showing the concept of the present invention. In this embodiment, as will be explained below, guarantee codes stored in respectively different locations will be used to detect the presence or absence of a failure, and to restore a detected failure.

The storage controller 1 comprises a controller 2, and a plurality of storage devices 3. The controller 2, for example, comprises a first communication control unit 2A, a second communication control unit 2B, a command processor 2C, a cache memory 2D, a guarantee code configuration unit 2E, and a guarantee code checking unit 2F.

The guarantee code of this embodiment is redundancy data added to the data and parity to verify whether or not the data is correct. The guarantee codes (GC1-Da1, GC1-Da2) added to the respective data (Da1, Da2) correspond to "first check data". The guarantee codes (GC2-Da1, GC2-Da2) added to the parity (Pa) correspond to the "second check data".

The first communication control unit 2A is a circuit for carrying out communications with a host 4. The first communication control unit 2A is connected to the host 4. The host 4, for example, is constituted as a computer device, such as a mainframe computer, server computer, or personal computer. The first communication control unit 2A and the host 4, for example, are connected via a communication network CN such as a FC_SAN (Fibre Channel_Storage Area Network), IP_SAN (Internet Protocol_SAN), LAN (Local Area Network) or the like.

When the host 4 is a mainframe computer, for example, a communication protocol such as FICON (Fibre Connection: registered trademark), ESCON (Enterprise System Connection: registered trademark), ACONARC (Advanced Connection Architecture: registered trademark), or FIBARC (Fibre Connection Architecture: registered trademark) is used. When the host 4 is a server computer or personal computer, for example, a communication protocol such as TCP/IP (Transmission Control Protocol/Internet Protocol), or FCP (Fibre Channel Protocol) iSCSI (internet Small Computer System Interface) is used.

The second communication control unit 2B is a circuit for communicating with the storage devices 3(1) through 3(3). In the following explanation, the storage devices will be called storage device 3 barring the need to distinguish between them.

For example, various kinds of devices capable of reading and writing data can be used as the storage device 3, such as a hard disk device, semiconductor memory device, optical disk device, magneto-optical disk device, magnetic tape device, and flexible disk device.

When a hard disk device is used as the storage device 3, for example, a FC (Fibre Channel) disk, SCSI (Small Computer System Interface) disk, SATA disk, ATA (AT Attachment) disk, or SAS (Serial Attached SCSI) disk can be utilized. When a semiconductor memory device is used as the storage device, for example, various types of memory devices, such as flash memory, FeRAM (Ferroelectric Random Access Memory), MRAM (Magnetoresistive Random Access Memory), Ovonic Unified Memory, and RRAM (Resistance RAM), can be used.

In this embodiment, the hard disk drive is given as an example of the type of storage device, which updates data by overwriting an old data storage location with new data. Further, in this embodiment, a flash memory device is given as an example of the type of storage device, which carries out data updating by writing new data to a location that differs from the location in which the old data is stored, and changing the address mapping. An address mapping change is carried out by the file system of a flash memory device. Furthermore, the hard disk device and flash memory device are examples, and the present invention is not limited to these devices.

The command processor 2C is for processing a command issued from the host 4, and sending the results thereof to the host 4. As commands, a write command and read command can be cited. The cache memory 2D is for storing data received from the host 4, and data read out from the storage device 3.

The guarantee code configuration unit 2E corresponds to the "check data configuration unit". The guarantee code configuration unit 2E respectively configures guarantee codes in data received from the host 4. Furthermore, the guarantee code configuration unit 2E waits for parity to be created (2E1), and respectively makes the guarantee codes configured in the data (GC2-Da1, GC2-Da2) and the guarantee code specific to the parity (GC-Pa) correspondent to the created parity.

The guarantee code checking unit 2F corresponds to the "checking unit". The guarantee code checking unit 2F is for detecting the presence or absence of a failure by comparing the guarantee codes respectively configured for the data and parity.

The configuration method and contents of the guarantee codes will be explained. To expedite the explanation, in this embodiment, a situation is described in which data is stored in storage devices 3(1) and 3(2), and parity is stored in storage device 3(3). However, as is known with RAID 5 and RAID 6, the constitution can also be such that data and parity are distributively arranged among a plurality of storage devices.

Data (Da1) and the guarantee code corresponding to this data (GC1-Da1) are respectively stored in storage device 3(1). The guarantee code, for example, comprises the logical address (LA), LRC, update time (TC) and sequence number (SEQ).

The logical address is the write-target address of the data (Da1). The LRC is for detecting a data bit change. The update time shows the time at which the data was written to the storage device 3. The sequence number shows the data update sequence.

Data (Da2) and the guarantee code corresponding to this data (GC1-Da2) are respectively stored in storage device 3(2), similar to storage device 3(1).

Parity (Pa), second guarantee codes (GC2-Da1, GC2-Da2), which correspond to the first guarantee codes (GC1-Da1, GC1-Da2) configured in the respective data, and the guarantee code configured in the parity (GC-Pa) are respectively stored in storage device 3(3).

Taking into account that there is a data area for storing the data unit (comprising data and parity), and a guarantee code area for storing the guarantee codes configured in this data unit, in this embodiment, the size of the guarantee code area is configured so as to enable a plurality of guarantee codes to be stored in the guarantee code area. That is, for example, when the size of the respective guarantee codes is 8 bytes, the size of the guarantee code area will be configured to 24 bytes (=8 bytes×3).

The only storage device in which guarantee codes are filled into the entire guarantee code area is storage device 3(3), which stores parity. Only one guarantee code is respectively stored inside the guarantee code areas in storage devices 3(1) and 3(2), which store the data. The parts indicated by dotted lines are blank areas in which nothing is stored.

Furthermore, in this embodiment, the second guarantee codes (GC2-Da1, GC2-Da2) are respectively stored in the guarantee code area of the parity-storing storage device 3(3) in locations corresponding to the guarantee codes (GC1-Da1, GC1-Da2) configured in the respective data. Consequently, the reading and writing of guarantee codes can be carried out relatively efficiently in this embodiment.

However, bringing the guarantee code storage locations together is merely one advantage of this embodiment, and the present invention is not limited to this. That is, for example, the constitution can also be such that the blank areas are eliminated from the guarantee code areas inside the data-storing storage devices 3(1) and 3(2).

The operation of the storage controller 1, when either a read command or write command is issued from the host 4, will be explained. When a read command is issued, the controller 2 reads out from the storage device 3 the data requested from the host 4 via the second communication control unit 2B. Here, to expedite the explanation, it is supposed that data (Da1) is read out. When the data is read out, the guarantee code configured in this data is also read out together with the data. Further, the parity and respective guarantee codes made correspondent to the parity are also read out.

The read-out data (Da1) is stored in the cache memory 2D. The guarantee code checking unit 2F compares the first guarantee code (GC1-Da1) configured in the data (Da1) against the second guarantee code (GC2-Da1), which has been made correspondent to the parity, and checks if the two coincide with one another.

When the two guarantee codes match, it is possible to determine that the data (Da1) read out from storage device 3(1) is correct data, and that a failure has not occurred. By contrast, when the two guarantee codes do not match, it is possible to determine that a failure has occurred relative to either the data or the parity, or both.

When the guarantee code comprises only LA and LRC, it is not possible to determine if a failure has occurred in either the data or the parity. When the guarantee code comprises either one of the update time or sequence number, it is possible to determine if a failure has occurred in either the data or the parity based on chronology. An example will be given here of a case in which the parity update is newer than the data update. In this case, since the parity is newer, a determination can be made that the failure occurred in the data.

Accordingly, the restore unit 2F1 restores the data (Da1) to the correct value based on the other data (Da2) and parity in the same stripe. After the restored data has been stored in the cache memory 2D, this restored data is sent to the host 4 via the first communication control unit 2A. Furthermore, the restored data is written to storage device 3(1) via the second communication control unit 2B. Furthermore, FIG. 1 shows the restore unit 2F1 as being provided inside the guarantee code checking unit 2F, but the restore unit 2F1 can also be provided outside the guarantee code checking unit 2F.

A case in which a write command has been issued from the host 4 will be explained. An example will be given here of a case in which data (Da1) stored in storage device 3(1) is updated with new data (Da1n). The stored data (Da1) will be called old data, and the stored parity (Pa) will be called old parity.

The controller 2 creates a new parity from the old data and old parity read out from storage devices 3(1) and 3(3), and the new data stored in the cache memory 2D. Prior to creating the new parity, the controller 2 compares the first guarantee code configured in the old data, and the second guarantee code of the old data, which is correspondent to the old parity, to make sure that a failure has not occurred in the old data and old parity as described hereinabove.

Subsequent to new parity creation, the guarantee code configuration unit 2E respectively configures guarantee codes for the new data and the new parity, and stores the new data in storage device 3(1), and the new parity in storage device 3(3), respectively.

The preceding is the normal operation. If a failure occurs in the old parity, it is not possible to use the respective guarantee codes, which have been made correspondent to the old parity, and so this embodiment waits for all the data in the same stripe to be updated. That is, this embodiment stands by until the data (Da2n) is received in accordance with a new write command from the host 4. When new data (Da1n) and (Da2n) are stored in the cache memory 2D, a new parity can be created on the basis of these new data.

When a failure occurs in the old data (Da1), a new parity can be created on the basis of the other data (Da2) and new data (Da1n) in the same stripe.

According to this embodiment, which is constituted like this, since the guarantee codes, which detect the correctness of data, are correspondingly stored in the respective data and parity, it is possible to detect a so-called write-error failure or read-error failure by comparing these two guarantee codes against one another.

According to this embodiment, since an update time and update sequence number are comprised inside the guarantee code, it is possible to determine if a failure has occurred in either the data or the parity.

According to this embodiment, either the data or parity is restored based on RAID when a failure occurs. Therefore, storage controller reliability and user ease-of-use are enhanced.

According to this embodiment, when restoration is not possible using RAID, the present invention creates a new parity after waiting for all the data in the same stripe to be stored in the cache memory 2D. Therefore, even if restoration cannot be performed using RAID, it is still possible to store the correct data and parity in the storage device 3. Consequently, storage controller reliability and user ease-of-use are further enhanced. This embodiment will be explained in detailed hereinbelow.

First Embodiment

Figure 2:
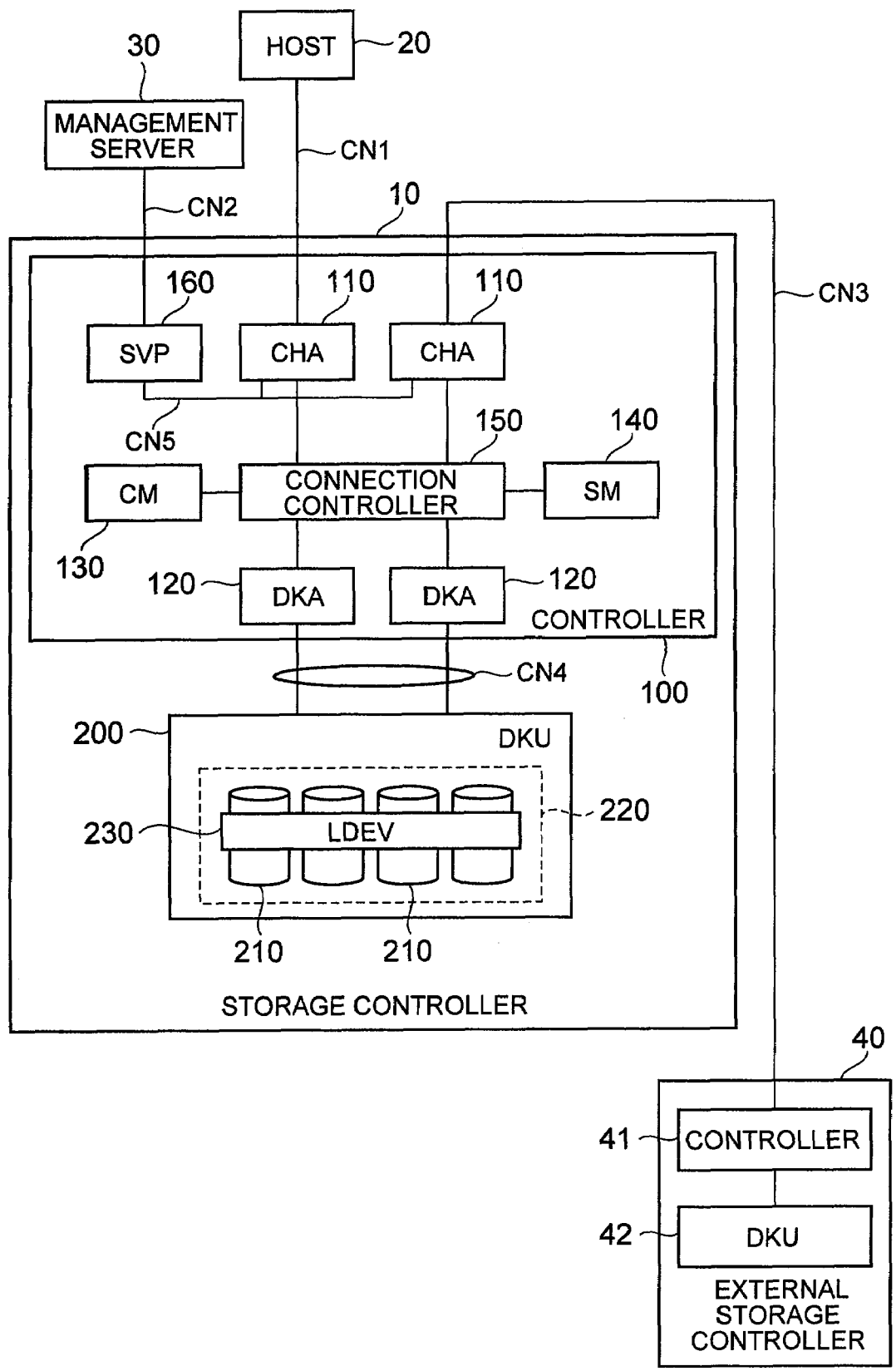
FIG. 2 is a block diagram showing the overall constitution of a storage controller according to an embodiment of the present invention.

FIG. 2 is a schematic diagram showing the overall constitution of a system comprising the storage controller. This system, for example, comprises a storage controller 10, host 20, management server 30, and an external storage controller 40. The corresponding relationship with the above FIG. 1 will be explained. The storage controller 10 corresponds to the storage controller 1 in FIG. 1, and the host 20 corresponds to the host 4 in FIG. 1, respectively. The storage device 210, channel adapter 110, disk adapter 120, and cache memory 130 respectively correspond to the storage device 3, first communication control unit 2A, second communication control unit 2B and cache memory 2D on FIG. 1.

The controller 100 utilizes the microprocessor of the respective channel adapters 110 and disk adapters 120, and can realize the respective command processor 2C, guarantee code configuration unit 2E, guarantee code checking unit 2F, and restore unit 2F1 of FIG. 1 by executing prescribed programs. Furthermore, the respective functions of creating and configuring a guarantee code, checking a guarantee code, and restoring either data or a parity can also be realized via hardware circuits.

The constitution of the storage controller 10 will be explained. The storage controller 10, for example, comprises a controller 100 for controlling the operation of the storage controller 10, and a storage unit 200, which is controlled by the controller 100.

The controller 100, for example, comprises a channel adapter (hereinafter CHA) 110, a disk adapter (hereinafter DKA) 120, a cache memory 130, a shared memory 140, a connection controller 150, and a service processor 160.

The CHA 110 is a control circuit comprising a microprocessor and a memory, and is in charge of communications with the host 20. The CHA 110 is connected to the host 20 via a communication network CN1.

The DKA 120 is a control circuit constituted the same as the CHA 110, and is in charge of communications with the storage devices 210. The DKA 120 is connected to the respective storage devices 210 inside the storage unit 200 via a communications network CN4.

The cache memory 130 stores data received from the host 20, or data read out from the storage devices 210. The shared memory 140 stores various types of control information and management information required for controlling the storage controller 10.

The connection controller 150 is a circuit for connecting the respective CHA 110 and DKA 120 to the cache memory 130 and shared memory 140. The service processor (hereinafter SVP) 160 is connected to the respective CHA 110 via an internal network CN5. The SVP 160 collects information related to the various states of the storage controller 10 via the respective CHA 110, and sends the collected information to the management server 30 via a communication network CN2. Furthermore, the SVP 160 changes the constitution of the storage controller 10 on the basis of an indication from the management server 30.

The storage unit 200 comprises a plurality of storage devices 210. The storage devices 210, for example, are constituted from hard disk devices or flash memory devices. A hard disk device will be given as the main example and explained here.

The physical storage areas of the respective plurality of storage devices 210 can be virtualized as a parity group 220. Either one or a plurality of logical volumes (LDEV in the figure) 230 can be configured in the physical storage area of this parity group 220. Furthermore, either one or a plurality of logical volumes 230 can also be provided in the physical storage area of one storage device 210. The host 20 carries out the reading and writing of data by specifying a logical volume 230.

The external storage controller 40 will be explained. The external storage controller 40 is called the external storage controller because in exists outside the storage controller 10 as seen from the storage controller 10. The external storage controller 40 is connected to the storage controller 10 via a communication network CN3.

The external storage controller 40 comprises a controller 41 and a storage unit 42 just like the storage controller 10. The storage controller 10 maps a logical volume inside the external storage controller 40 to a virtual storage device inside the storage controller 10. Consequently, the storage controller 10 can use the logical volume of the external storage controller 40 just as if it were a storage resource of the storage controller 10.

Figure 3:
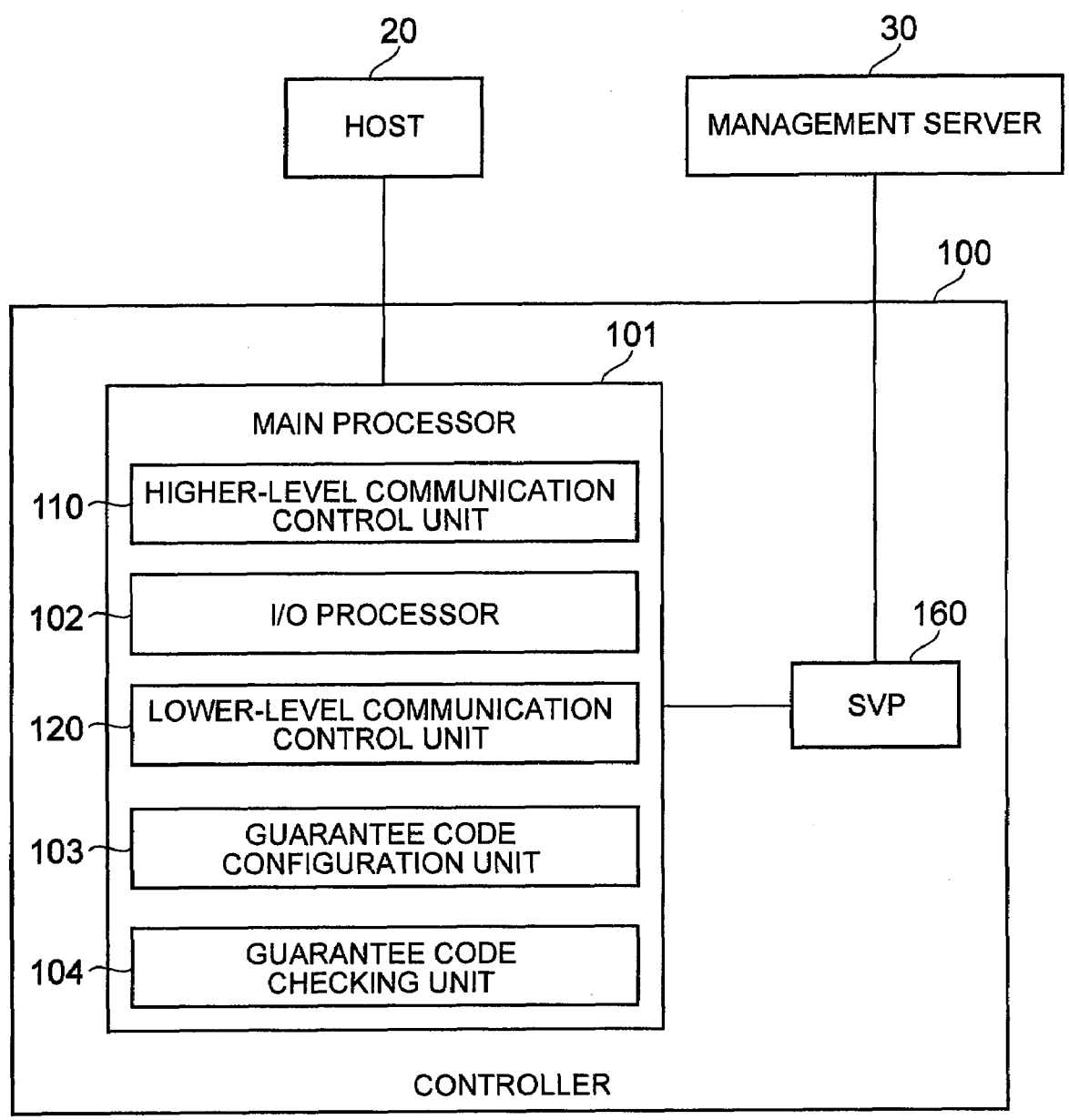
FIG. 3 is a block diagram focusing on the functioning of a controller.

FIG. 3 is a block diagram showing the constitution of the controller 100 from a different perspective. The respective CHA 110, respective DKA 120, cache memory 130 and shared memory 140 can be used to provide a main processor 101 inside the controller 100.

The main processor 101 comprises a higher-level communication control unit 110, I/O processor 102, lower-level communication control unit 120, guarantee code configuration unit 103, and guarantee code checking unit 104. The higher-level communication control unit 110 realizes the CHA 110 communication function, and is therefore assigned the same reference numeral "110". Similarly, since the lower-level communication control unit 120 realizes the DKA 120, the lower-level communication control unit 120 is assigned the same reference numeral "120".

The I/O processor 102 corresponds to the command processor 2C in FIG. 1. The I/O processor 102 processes a write command and a read command issued from the host 20, and sends the results thereof to the host 20.

The guarantee code configuration unit 103 corresponds to the guarantee code configuration unit 2E of FIG. 1. The guarantee code configuration unit 103 respectively configures guarantee codes in data and parity, as will be explained hereinbelow using FIGS. 5 and 6.

The guarantee code checking unit 104 corresponds to the guarantee code checking unit 2F of FIG. 1. The guarantee code checking unit 104 checks whether or not a failure has occurred in data and parity, which has been read out from the storage devices 210.

Figure 4:
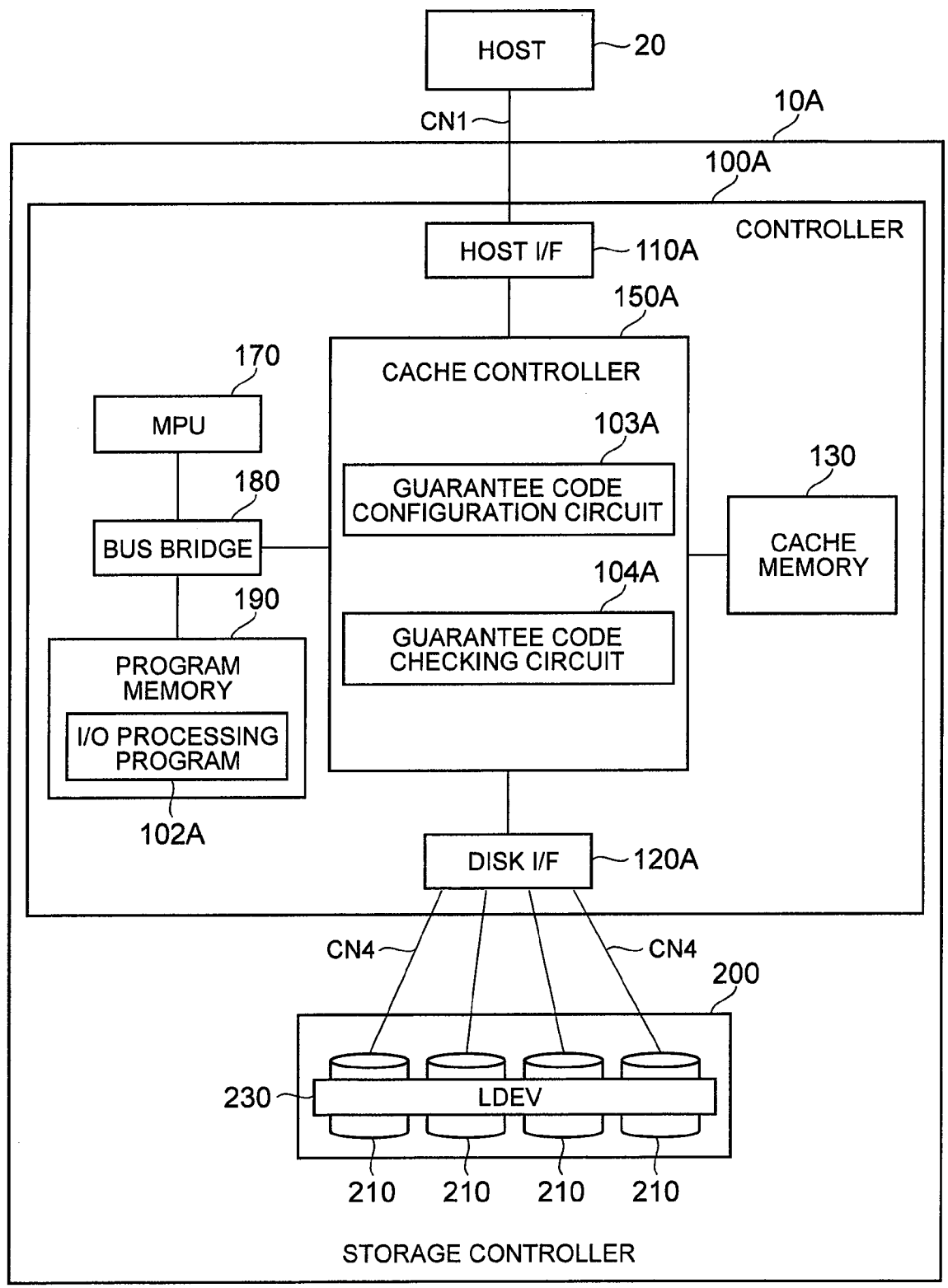
FIG. 4 is a block diagram showing an example of the constitution of another storage controller.

FIG. 4 shows a variation of the storage controller. The constitution shown in FIG. 4 can be employed instead of the constitution shown in FIG. 2. The storage controller 10A shown in FIG. 4 comprises a controller 100A and a storage unit 200. The controller 100A, for example, comprises a host interface 110A, disk interface 120A, cache memory 130, cache controller 150A, microprocessor 170, bus bridge 180 and program memory 190.

The host interface 110A is a control circuit in charge of communications with the host 20, just like the CHA 110. The disk interface 120A is a control circuit in charge of communications with the respective storage devices 210, just like the DKA 120.

The cache controller 150A is for controlling the input/output of data to/from the cache memory 130. The cache controller 150A, for example, comprises a guarantee code configuration circuit 103A for configuring a guarantee code, and a guarantee code checking circuit 104A for checking a guarantee code.

An I/O processing program 102A for processing commands from the host 20 is stored in the program memory 190. This program 102A is executed by the microprocessor 170. The bus bridge 180 connects the microprocessor 170 to the program memory 190 and the cache controller 150A.

Figure 5:
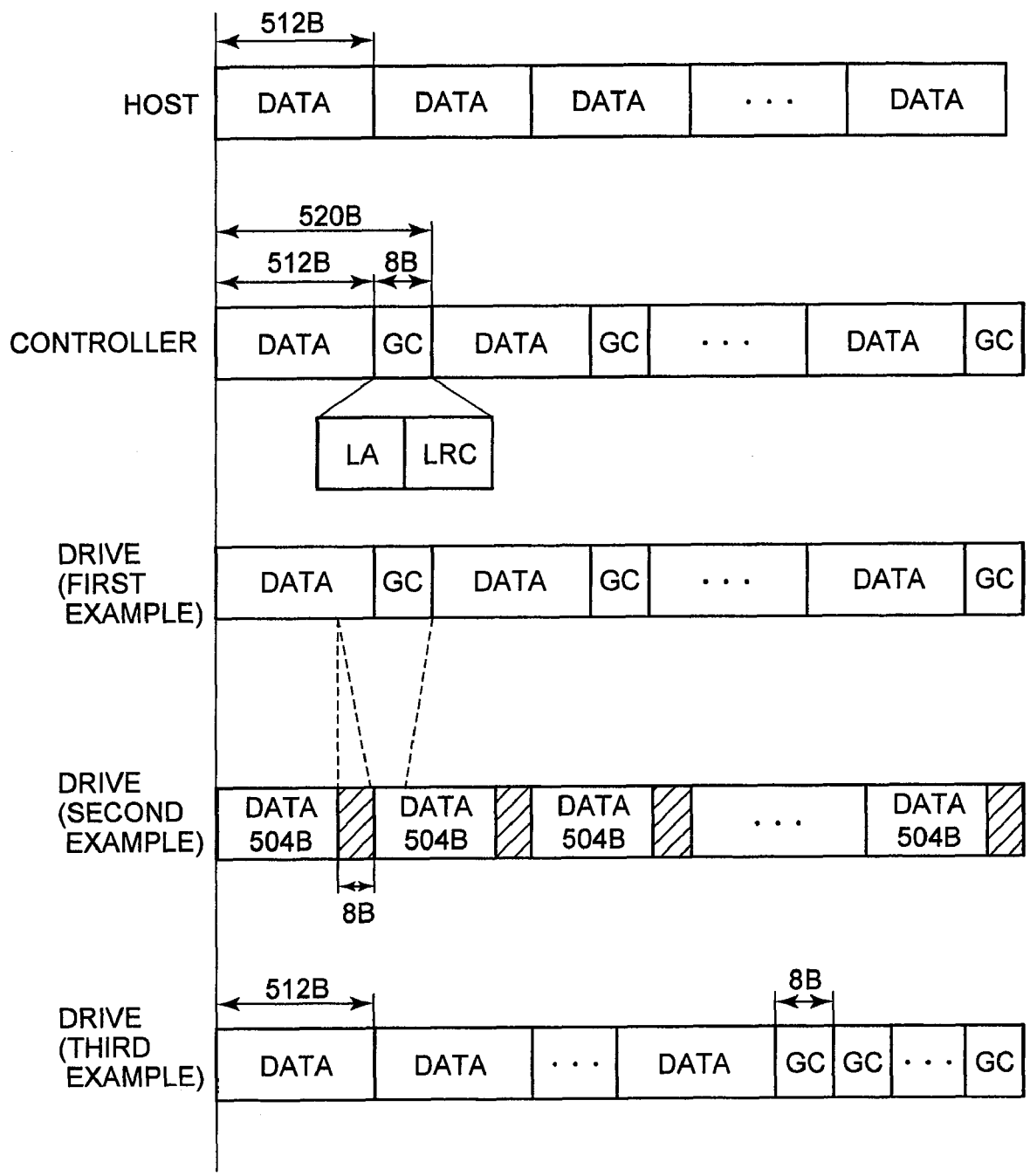
FIG. 5 is a schematic diagram showing a number of examples for configuring guarantee codes in data.

FIG. 5 is a schematic diagram showing an example of a guarantee code configuration method. As shown at the top of FIG. 5, data sent out from the host 20 is divided into 512-byte blocks. The controller 100 configures an 8-byte guarantee code (GC) for each block of data received from the host 20. Therefore, the size of the blocks stored in the cache memory 130 of the controller 100 is 520 bytes.

As in the first example shown in the middle portion of FIG. 5, for example, there is a storage device 210, such as an FC disk, which is capable of storing a block expanded to 520 bytes as-is. In this case, the guarantee code-appended blocks are stored as-is in the storage devices 210.

There is also a storage device 210, such as a SATA disk or the like, for which the storage format is fixed at 512 bytes. In this case, the smallest common multiple of 512 bytes and 520 bytes can be used as the data input/output unit. That is, when there are 65 512-byte blocks, the total size of these 65 blocks is equivalent to that of 64 520-byte blocks.

The second example shown below the first example depicts a situation in which the guarantee code-appended blocks are divided into blocks totaling 512 bytes and written to the storage devices 210. When the storage device 210 is a flash memory device, for example, the 512 bytes of data and 8-byte guarantee code are divided up and written so as to constitute a page size (for example, 512 bytes) tailored to the flash logical page address and flash write sequence number. When data is read out from the flash memory device, two pages worth of data are read out and the guarantee code is checked.

The third example given in FIG. 5 shows a state in which the data and guarantee codes are separated and stored separately. Data and guarantee codes can be made correspondent and stored in the storage devices 210 using any of the methods shown in FIG. 5, or a different method not shown in the figure.

Figure 6:
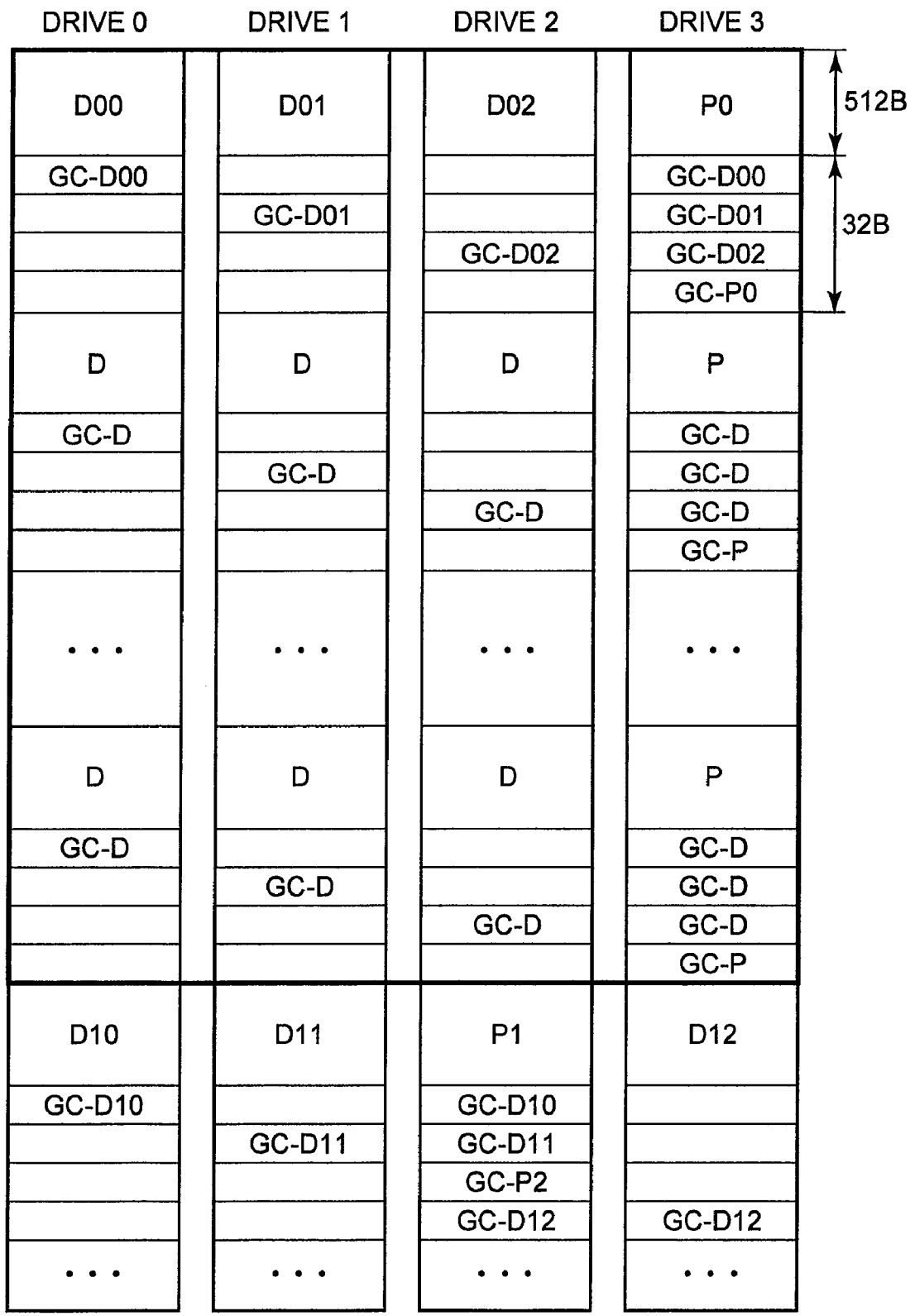
FIG. 6 is a schematic diagram showing how second data guarantee codes corresponding to the first data guarantee codes of the respective data are made correspondent to parity.

FIG. 6 is a schematic diagram showing the states of data and guarantee codes stored in the respective storage devices 210. FIG. 6 shows a RAID 5 configuration. Guarantee codes (GC-D) are made correspondent to the respective data (D). The guarantee codes correspondently stored in the respective data may be called first guarantee codes in the following explanation.

In the parity (P), the second guarantee codes of the respective data related to this parity are made correspondent to the guarantee code of this parity itself. As will be explained hereinbelow, a second guarantee code can be constituted the same as the first guarantee code, and can also be constituted from a part of the first guarantee code.

In the parity of the example shown in FIG. 6, the three second guarantee codes, which respectively correspond to the three data first guarantee codes, and the one guarantee code for checking the parity itself are correspondently stored in the storage devices 210. Therefore, the area for storing the guarantee codes is a size capable of storing only a total of four guarantee codes (32 bytes=8 bytes×4). Therefore, in the example shown in FIG. 6, free areas of 24 bytes (=8 bytes×3) are created in the guarantee code storage areas made correspondent to the data. Furthermore, guarantee code storage areas can also be created so as not to generate useless areas.

Figure 7:
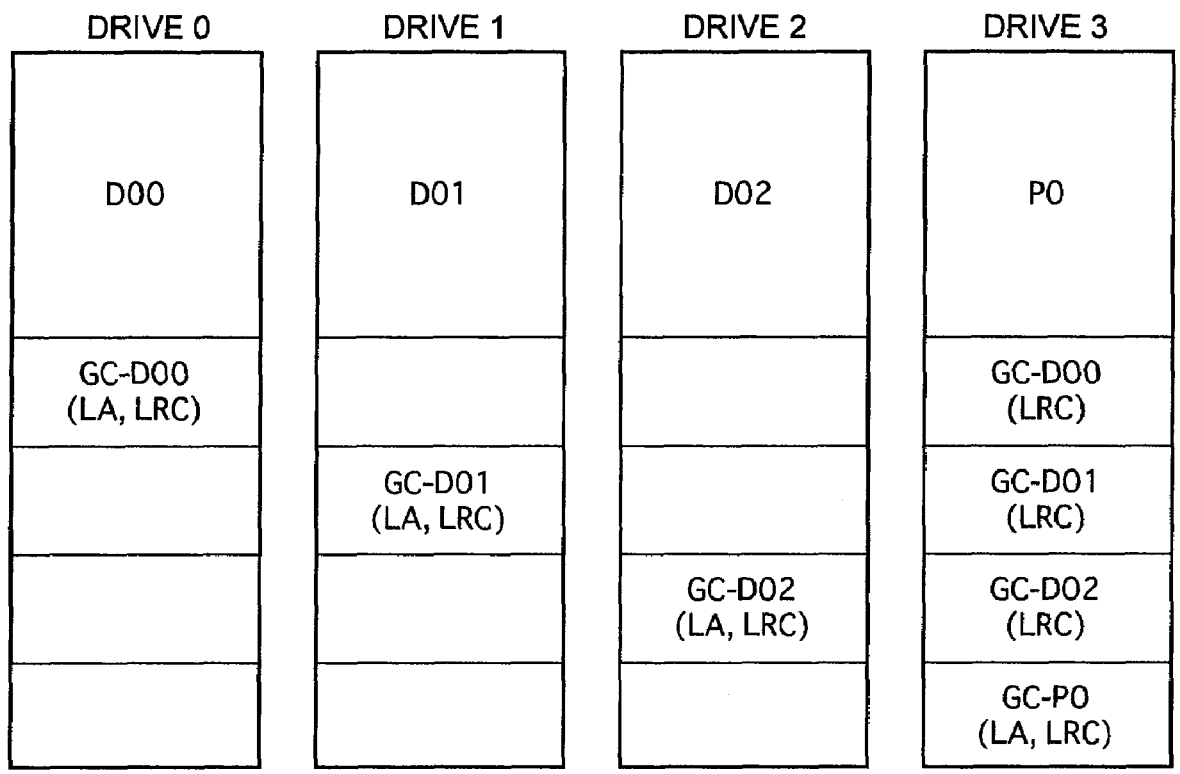
FIG. 7 is a schematic diagram showing the contents of a data guarantee code.

FIG. 7 is a schematic diagram showing the contents of the guarantee codes. The first guarantee codes, which are directly correspondent to the data, and the guarantee code for the parity comprise LA and LRC. By contrast, the second guarantee codes stored together with the parity comprise only LRC. This is because it is possible to detect the presence or absence of a failure by simply comparing the LRC of the first guarantee codes and the LRC of the second guarantee codes.

When data is read out from the storage device 210, the first guarantee code, which has been made correspondent to this data, is also read out together with the data. Similarly, when parity is read out from the storage device 210, the second guarantee code, which has been made correspondent to this parity, and the guarantee code for checking this parity itself are read out together with the parity. In the flowchart described below, it is explained that when data and parity are read out, the respective guarantee codes appended thereto are also read out.

Figure 8:
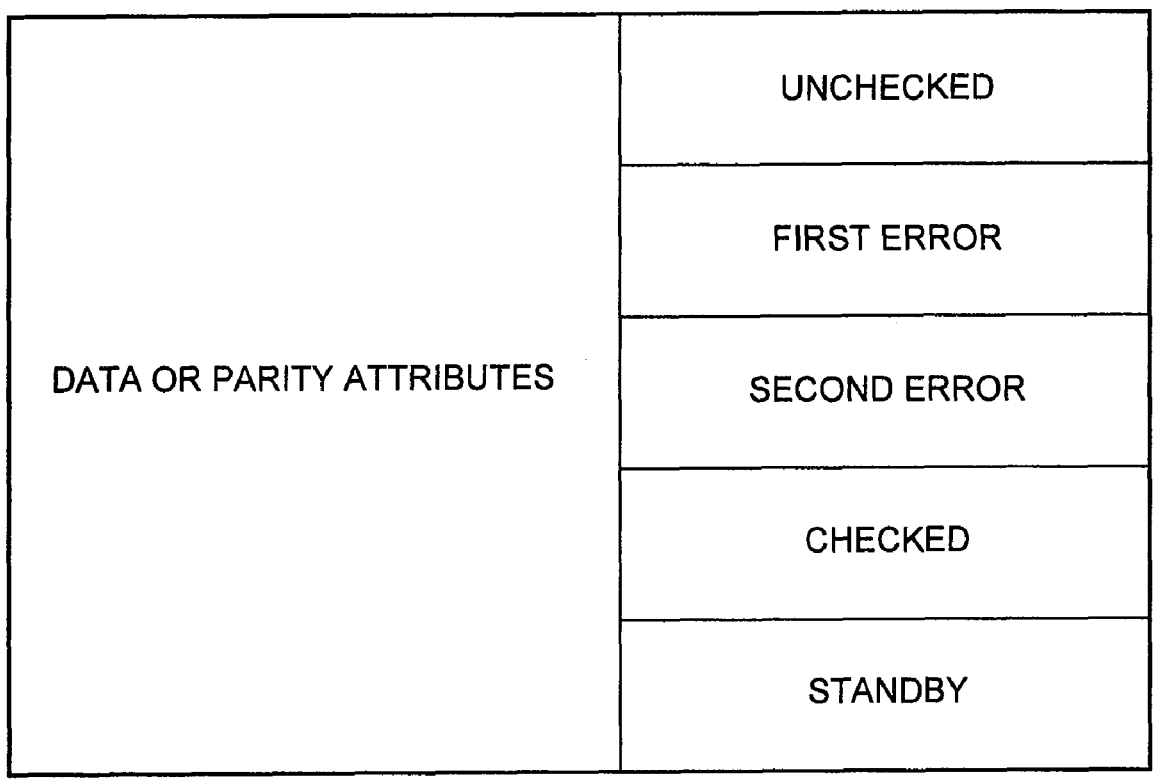
FIG. 8 is a schematic diagram showing the attributes of either data or parity.

FIG. 8 is a schematic diagram showing the attribute of either data or parity in the cache memory. The controller 100 manages the attributes (statuses) of the respective data and respective parities. Unchecked is a state in which a check has not been carried out on the basis of a guarantee code. That is, immediately subsequent to being read out from the storage device 210, data and parity are unchecked.

First error shows a state in which an error has been detected using the guarantee code alone. For example, when it is determined in accordance with a first guarantee code, which is directly correspondent to a data block, that this data has been written to the wrong location, or that the bits of this data have changed, this constitutes a first error. Similarly, in the case of parity as well, first error is when an error is detected in the parity itself in accordance with LA and LRC.

Second error shows a state in which the first guarantee code and second guarantee code do not match. That is, the situation is such that the first guarantee code and the second guarantee code related to the same data do not match, and a determination is made that a failure has occurred in this data.

Checked shows a state in which an error has not been detected. When a guarantee code-based check results in an error not being detected, this constitutes checked. Further, write data received from the host 20 also constitutes checked. This is because a failure caused by input/output to/from the storage device 210 does not occur in write data before it is written to the storage device 210.

Standby is a state in which standby is carried out until all the other data that resides in the same stripe as this data is stored in the cache memory 130. That is, standby is the state in which the present invention waits for the time when a new parity can be created.

Figure 9:
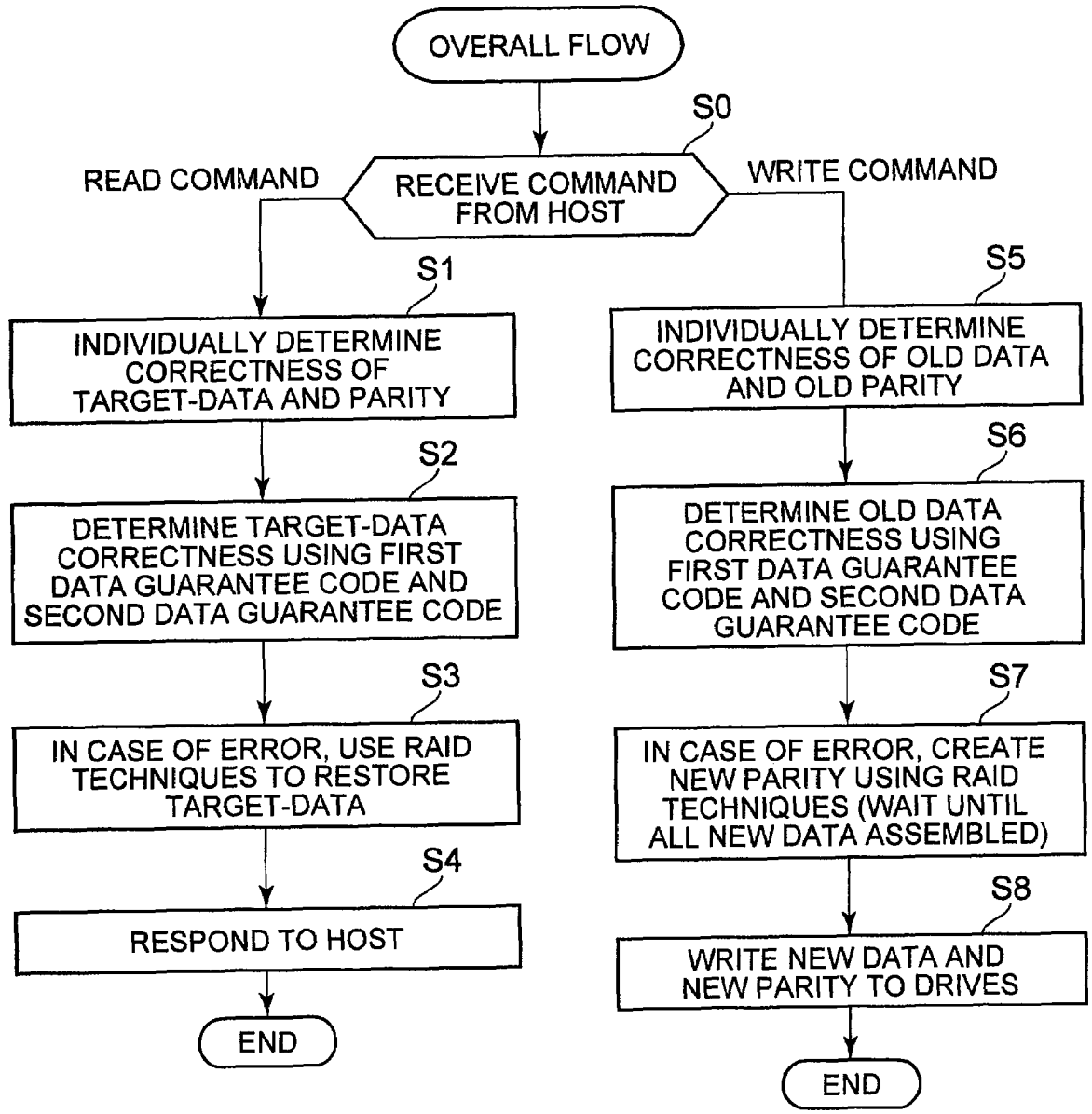
FIG. 9 is a flowchart schematically showing the flow of the overall operation of the storage controller.

FIG. 9 is a flowchart showing the simplified flows of all the operations of this embodiment. More detailed explanations of these operations will be explained using FIG. 10 and subsequent figures. A data and parity checking method and a data and parity restore method, to include portions that will be explained in the embodiments described hereinbelow, are shown in FIG. 9 in simplified form. Furthermore, for the sake of convenience, the storage device 210 is expressed as "drive" in the flowchart.

The controller 100 determines that a command has been received from the host 20 (S0). When a read command is received, the controller 100 reads the data and parity from the storage device 210, and determines whether or not the data and parity are correct.

Hereinafter, to clearly distinguish between the guarantee codes, the first guarantee code, which is directly correspondent to data, will be called a first data guarantee code. The second guarantee code, which is indirectly correspondent to data, will be called the second data guarantee code. The guarantee code, which is directly correspondent to the parity, will be called the parity guarantee code.

In S1, the controller 100 determines whether or not the data is correct based on the first data guarantee code. In S1, the controller 100 also determines whether or not this parity is correct base on the parity guarantee code. The attributes of data and parity for which errors have been detected are changed to first error.

Next, the controller 100 determines whether or not a failure has occurred in the data requested by the host 20 by comparing the first data guarantee code against the second data guarantee code (S2). When the first data guarantee code and the second data guarantee code match, it is determined that there is no failure in this data. By contrast, when the first data guarantee code and the second data guarantee code do not match, it is determined that a failure has occurred in the data. When a failure has been detected, the attribute of this data is changed to second error.

The controller 100, upon detecting a failure in the data read out from the storage device 210, restores this data on the basis of RAID techniques (S3). That is, by using the restore-targeted data and the other data and parity that exist in the same stripe to carry out a computation, it is possible to restore this restore-targeted data to the correct data. Furthermore, in the case of RAID 1, the correct data can be obtained by reading the data stored in a mirror disk.

The controller 100 sends the restored data to the host 20 (S4). Furthermore, when a failure is not detected in data for which a read was requested, the controller 100 skips S3, and sends the data read out from the storage device 210 to the host 20.

Upon receiving a write command, the controller 100 carries out a read-modified write process. The controller 100 respectively reads out from the storage devices 210 the update-targeted old data, and the old parity correspondent to this old data, and checks the old data and old parity based on the guarantee codes (S5).

Next, the controller 100 compares the first data guarantee code configured in the old data against the second data guarantee code configured relative to this old data, and checks whether or not a failure has occurred in this old data (S6).

When a failure is detected in the old data, the controller 100 restores the old data to the correct data using RAID techniques the same as described above (S7). When it is not possible to restore the old data using RAID techniques, the controller 100 waits until all the data in the same stripe has been updated, and calculates a new parity at the point when all the new data has been assembled together (S7).

The controller 100 configures the respective guarantee codes in the new data and new parity, and stores same in the storage devices 210 (S8). Furthermore, when it is possible to read out correct old data from the storage device 210, the controller 100 calculates a new parity based on the old data and old parity, and the new data, and stores the new data and new parity in the storage devices 210.

Figure 10:
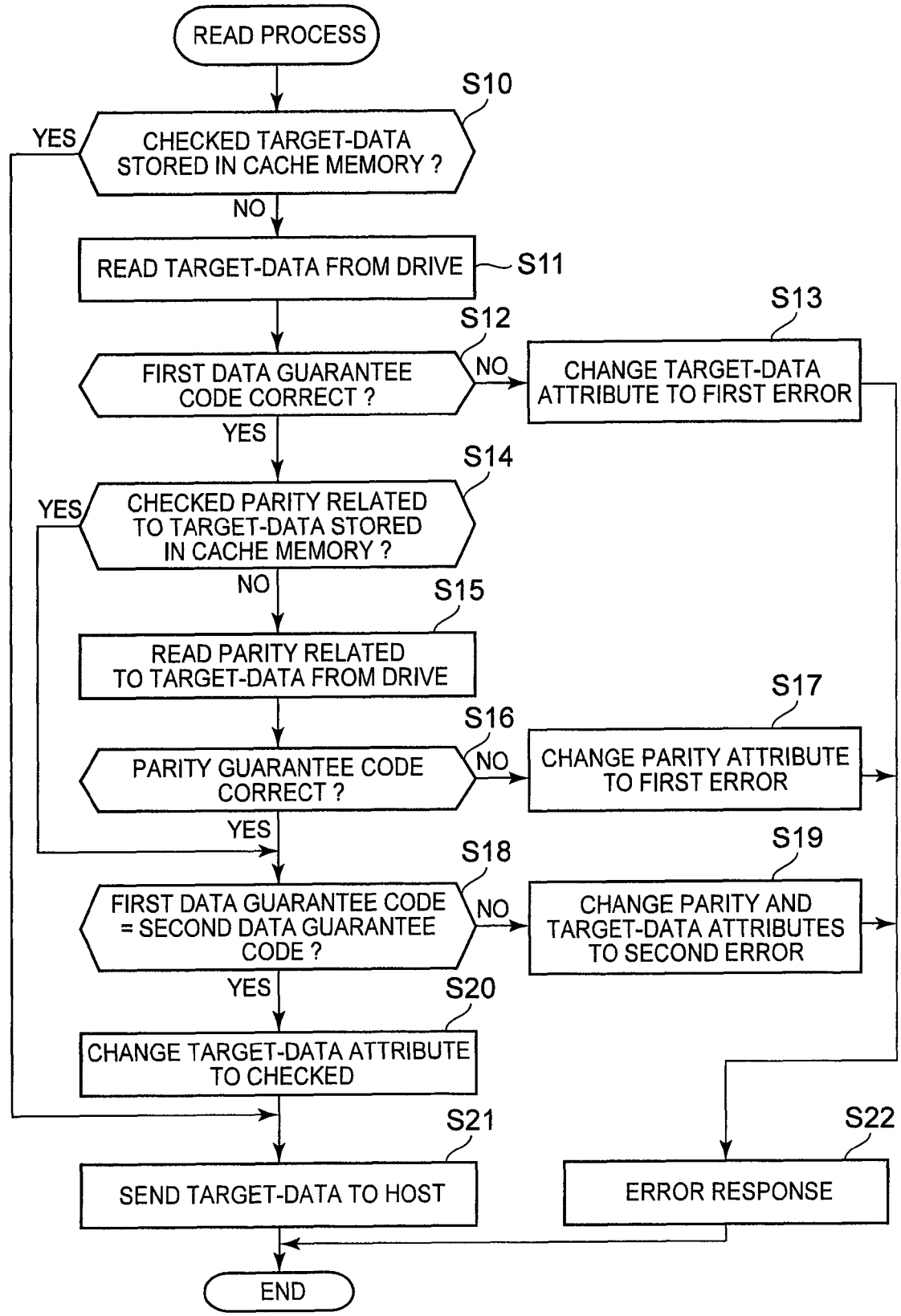
FIG. 10 is a flowchart showing a read process.
Figure 11:
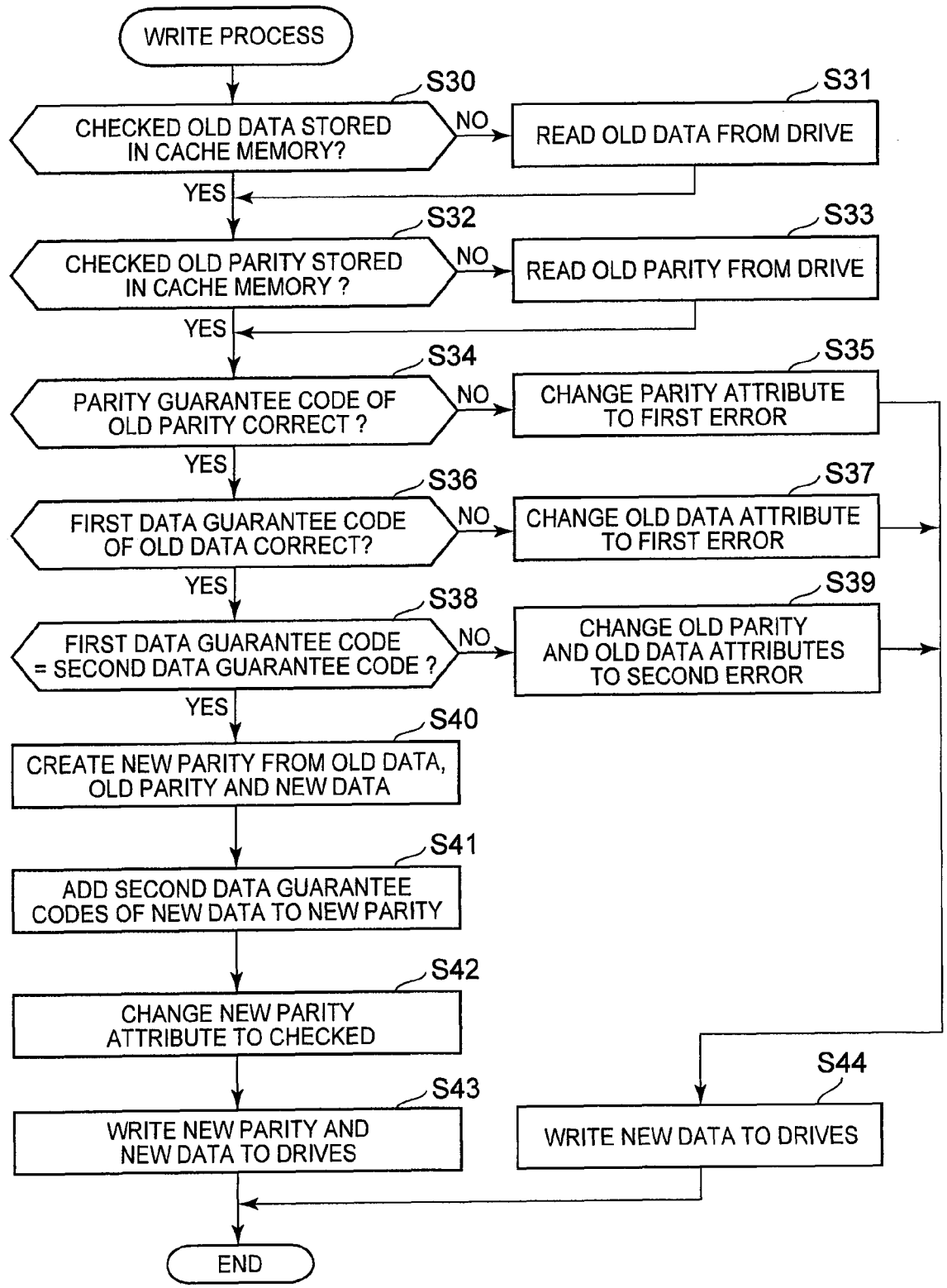
FIG. 11 is a flowchart showing a write process.

A method for checking data using a plurality of guarantee codes will be explained based on FIGS. 10 and 11. FIG. 10 shows a read process, and FIG. 11 shows a write process. Furthermore, the following respective flowcharts present overviews of the respective processes to the extent necessary to understand and implement the present invention, and may differ from the actual computer program. A so-called person with ordinary skill in the art, for example, should be able to change a step shown in the figures to a different step, change the order of the steps, delete a portion of the steps, or add a new step.

The read process will be explained by referring to FIG. 10. The controller 100, upon receiving a read command from the host 20, determines whether or not the checked target-data is stored in the cache memory 130 (S10). Checked target-data is data for which a read has been requested by the host 20, and for which the attribute thereof is configured in checked.

When checked target-data is stored in the cache memory 130 (S10: YES), the controller 100 sends this checked target-data to the host 20 (S21), and ends the read process.

When checked target-data is not stored in the cache memory 130 (S10: NO), the controller 100 reads out the target-data from the storage device 210 (S11). The controller 100 determines whether or not the target-data is correct based on the first data guarantee code configured in this target-data (S12). When the target-data is incorrect (S12: NO), the controller 100 changes the attribute of the target-data to first error (S13), and sends the host 20 an error response (S22).

Furthermore, in the following explanation, determining whether or not an error has occurred in data based on the first data guarantee code may be expressed as either "whether or not the first data guarantee code is correct" or as "whether or not the data is correct".

When the target-data is correct (S12: YES), the controller 100 determines whether or not a parity, which is related to the target-data, and for which a check has already been completed, is stored in the cache memory 130 (S14). A checked parity is parity for which the attribute thereof is configured in checked. When a checked parity is stored in the cache memory 130 (S14: YES), the controller 100 skips S15 and S16, and moves to S18.

When a checked parity is not stored in the cache memory 130 (S14: NO), the controller 100 reads out the parity related to the target-data from the storage device 210 (S15). The controller 100 checks whether or not the parity guarantee code is correct (S16), and when the parity guarantee code is incorrect (S16: NO), changes the parity attribute to first error (S17). Then, the controller 100 sends an error response to the host 20 (S22).

When the parity guarantee code is correct (S16: YES), the controller 100 compares the first data guarantee code against the second data guarantee code, and determines whether or not the respective data guarantee codes match (S18).

When the first data guarantee code and the second data guarantee code match, there are times when the respective data guarantee codes completely match, and other times when the respective data guarantee codes partially match. A partial match can include a situation in which, of the information comprised in the data guarantee codes, only the LRC match.

When the two data guarantee codes do not match (S18: NO), the controller 100 respectively changes the target-data attribute and parity attribute to second error (S19), and sends an error response to the host 20 (S22).

When the first data guarantee code and the second data guarantee code match (S18: YES), the controller 100 changes the target-data attribute to checked (S21), and sends the target-data to the host 20 (S21). Hereinafter, in order to avoid redundant descriptions, there may be times when the reference numerals of the storage device 210, controller 100 and cache memory 130 are omitted, and these components are expressed as storage device, controller and cache memory.

The write process will be explained by referring to FIG. 11. As described above, in the write process, old data and old parity are read out from the storage devices 210, new parity is calculated based on the old data, old parity and new data, and the new data and the new parity are written over the old data and the old parity in the storage devices 210.

The controller determines whether or not checked old data is stored in the cache memory (S30). When checked old data is not stored in the cache memory (S30: NO), the controller reads the old data from the storage device (S31). Similarly, the controller determines whether or not checked old parity is stored in the cache memory (S32). When checked old parity is not stored in the cache memory (S32: NO), the controller reads the old parity from the storage device (S33).

The controller checks the parity guarantee code of the old parity (S34), and when the parity guarantee code is incorrect (S34: NO), changes the old parity attribute to first error (S35). The controller checks the first data guarantee code of the old data (S36), and when the first data guarantee code is incorrect (S36: NO), changes the old data attribute to first error (S37).

The controller determines whether or not the first data guarantee code and the second data guarantee code related to the old data match (S38). When the first data guarantee code and second data guarantee code do not match (S38: NO), the controller changes both the old parity attribute and the old data attribute to second error (S39).

When the respective guarantee codes are each determined to be correct (S34: YES, S36: YES), and the first data guarantee code and the second data guarantee code are determined to match (S38: YES), the controller creates a new parity based on the old data, old parity and new data (S40).

The controller adds a newly created second data guarantee code to the new parity (S41), and, in addition, configures a new parity attribute in checked (S42). Then, the controller writes the new parity and new data to the storage devices (S43).

Meanwhile, when the old parity and old data are changed either to first error (S35, S37), or to second error (S39), the controller writes the new data received from the host 20 to the storage device (S44). There is no problem writing the new data to the storage device in order for this new data to be treated as checked. However, new parity corresponding to the new data has yet to be created at this point in time. A method for creating new parity when an error is detected will be explained using a different figure.

As explained in the basic operations of the read process and write process hereinabove, in this embodiment, second data guarantee codes respectively corresponding to the first data guarantee codes of the respective data are configured in the parity associated to the above-mentioned respective data. Therefore, it is possible to independently check whether or not the respective data and parity are correct, and furthermore, it is possible to determine whether or not a failure has occurred in either the data or the parity.

Figure 12:
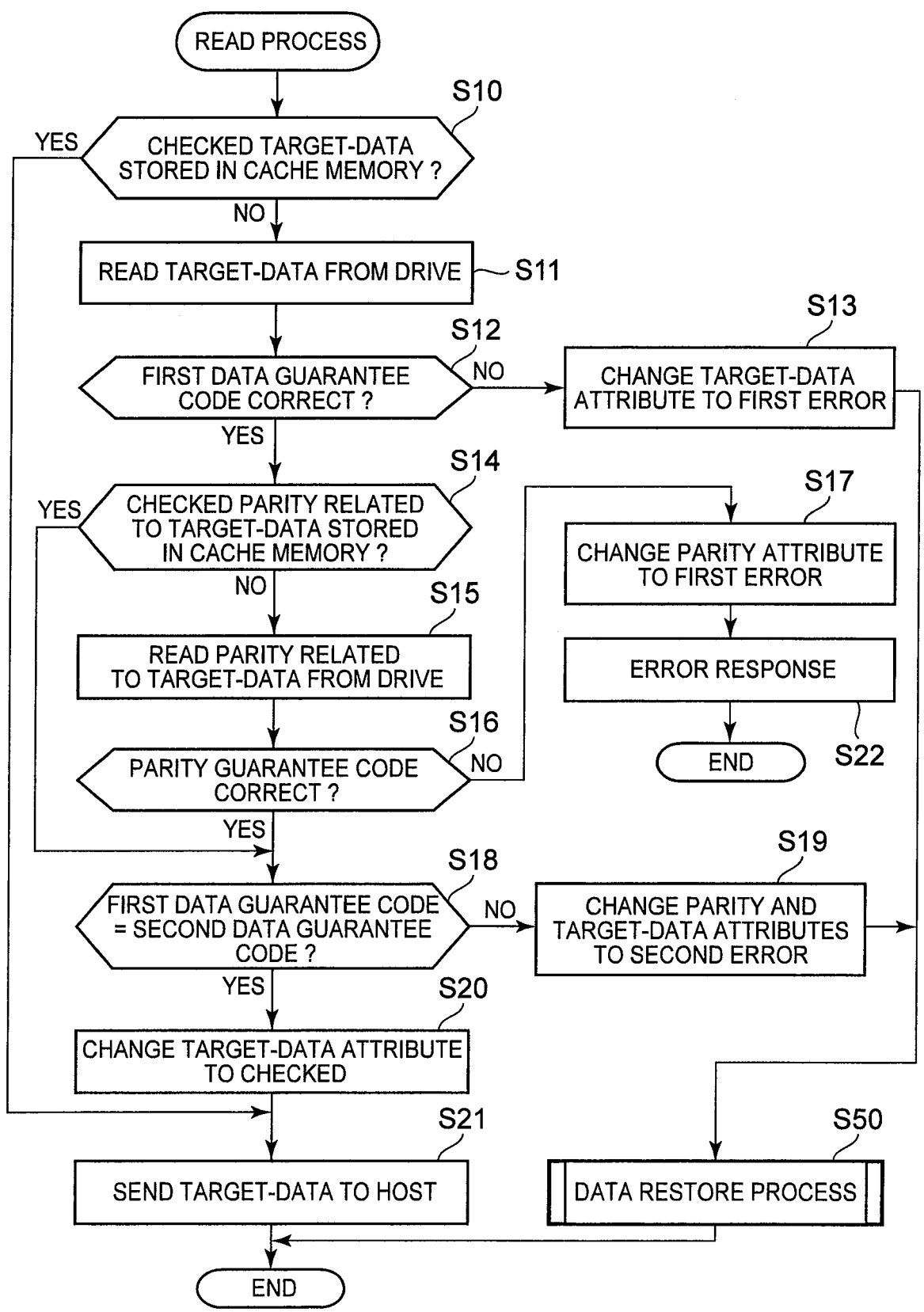
FIG. 12 is a flowchart showing a read process, to which steps have been added for restoring a failure.

Next, a method corresponding to when a failure is detected will be explained. FIG. 12 is a flowchart describing an improved read process. In this flowchart, a data restore process is executed instead of S22 in FIG. 10 (S50). As will be described hereinbelow, in the data restore process, prescribed-data associated to the same parity as that of the target-data is checked, and correct prescribed-data is used to restore the target-data.

Figure 13:
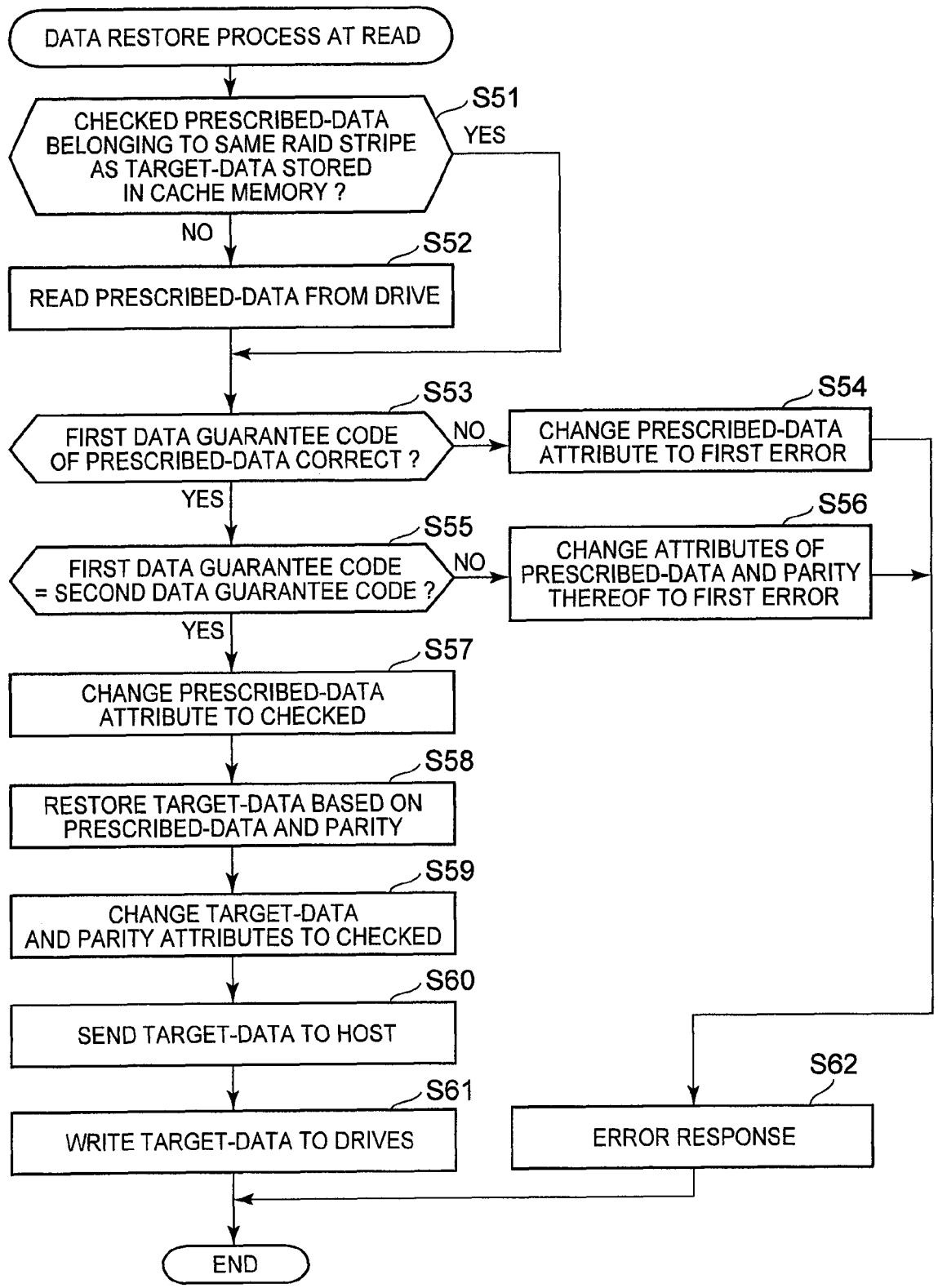
FIG. 13 is a flowchart showing a data restore process.

FIG. 13 is a flowchart showing details of the data restore process. S51 through S57 described hereinbelow are carried out for all data related to the same parity. Even in the other embodiments explained below, when data is restored based on RAID, respective correctness checks are carried out for all related data.

The controller determines whether or not the target-data and the checked prescribed-data belonging to the same stripe are stored in the cache memory (S51). Prescribed-data is data, which is managed by the parity coinciding with the target-data. When the prescribed-data is not stored in the cache memory (S51: NO), the controller reads out the prescribed-data from the storage device (S52).

The controller checks whether or not the first data guarantee code of the prescribed-data is correct (S53), and when the first data guarantee code is incorrect (S53: NO), changes the attribute of the prescribed-data to first error (S54). In this case, since the target-data cannot be restored to the correct data using RAID, the controller sends an error response to the host 20 (S62).

When the first data guarantee code of the prescribed-data is correct (S53: YES), the controller determines whether or not the first data guarantee code of the prescribed-data matches the second data guarantee code of the prescribed-data (S55). When the first data guarantee code of the prescribed-data does not match the second data guarantee code of the prescribed-data (S55: NO), the controller respectively changes the prescribed-data attribute and parity attribute to first error (S56), and sends an error response to the host 20 (S62).

When this first data guarantee code and second data guarantee code of the prescribed-data match one another (S55:

YES), the controller changes the attribute of the prescribed-data to checked (S57), and restores the target-data on the basis of the prescribed-data and parity (S58).

The controller changes both the attribute of the target-data and the attribute of the parity to checked (S59), and sends the target-data to the host 20 (S60). Furthermore, the controller writes the restored target-data over the old data in the storage device (S61).

Figure 14:
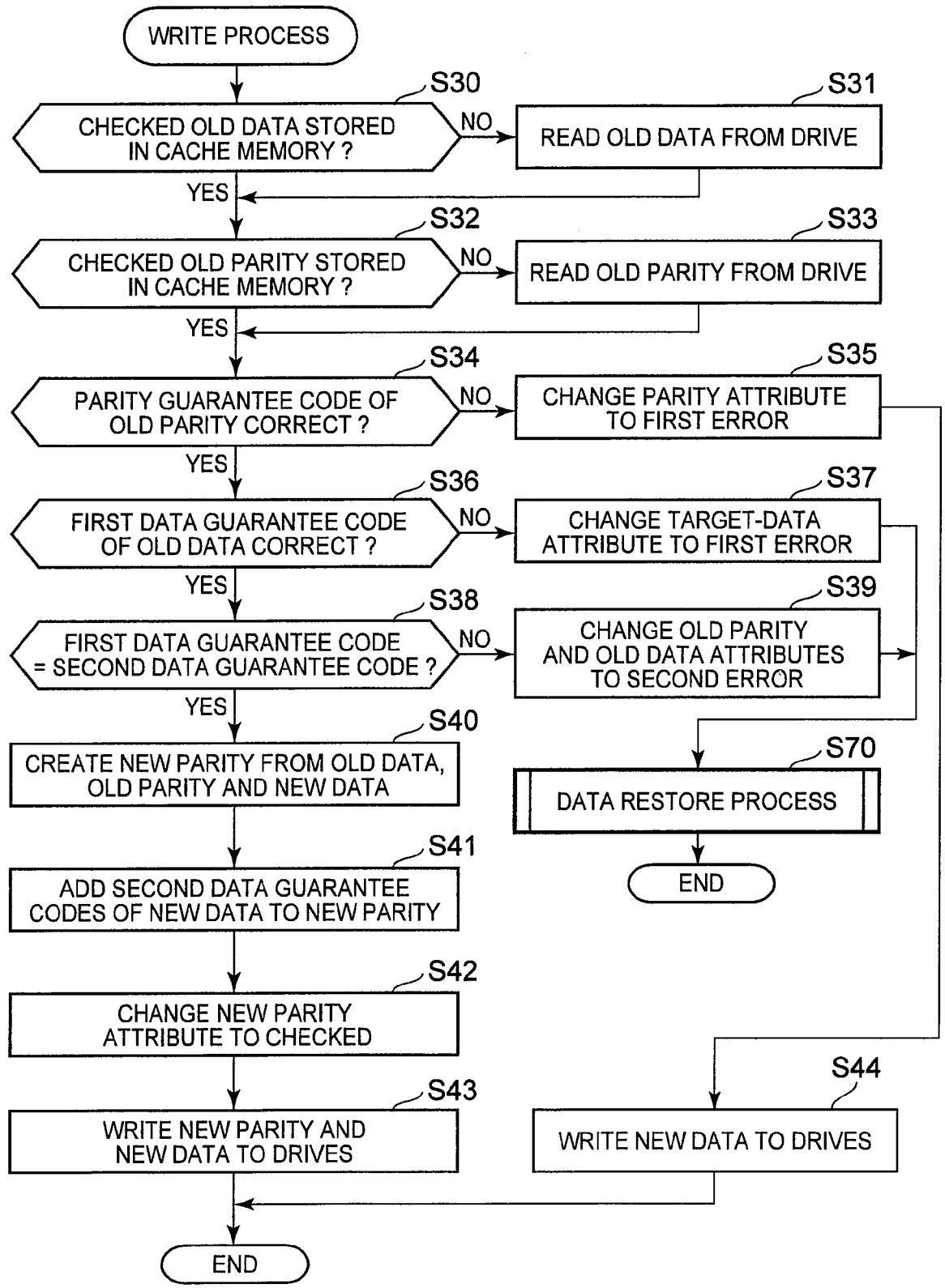
FIG. 14 is a flowchart showing a write process, to which steps have been added for restoring a failure.

FIG. 14 is a flowchart showing an improved write process. In this flowchart, the controller executes the data restore process (S70) when the attribute of the target-data is changed to first error (S37), or when the attribute of the old parity and the attribute of the old data are changed to second error (S39).

Figure 15:
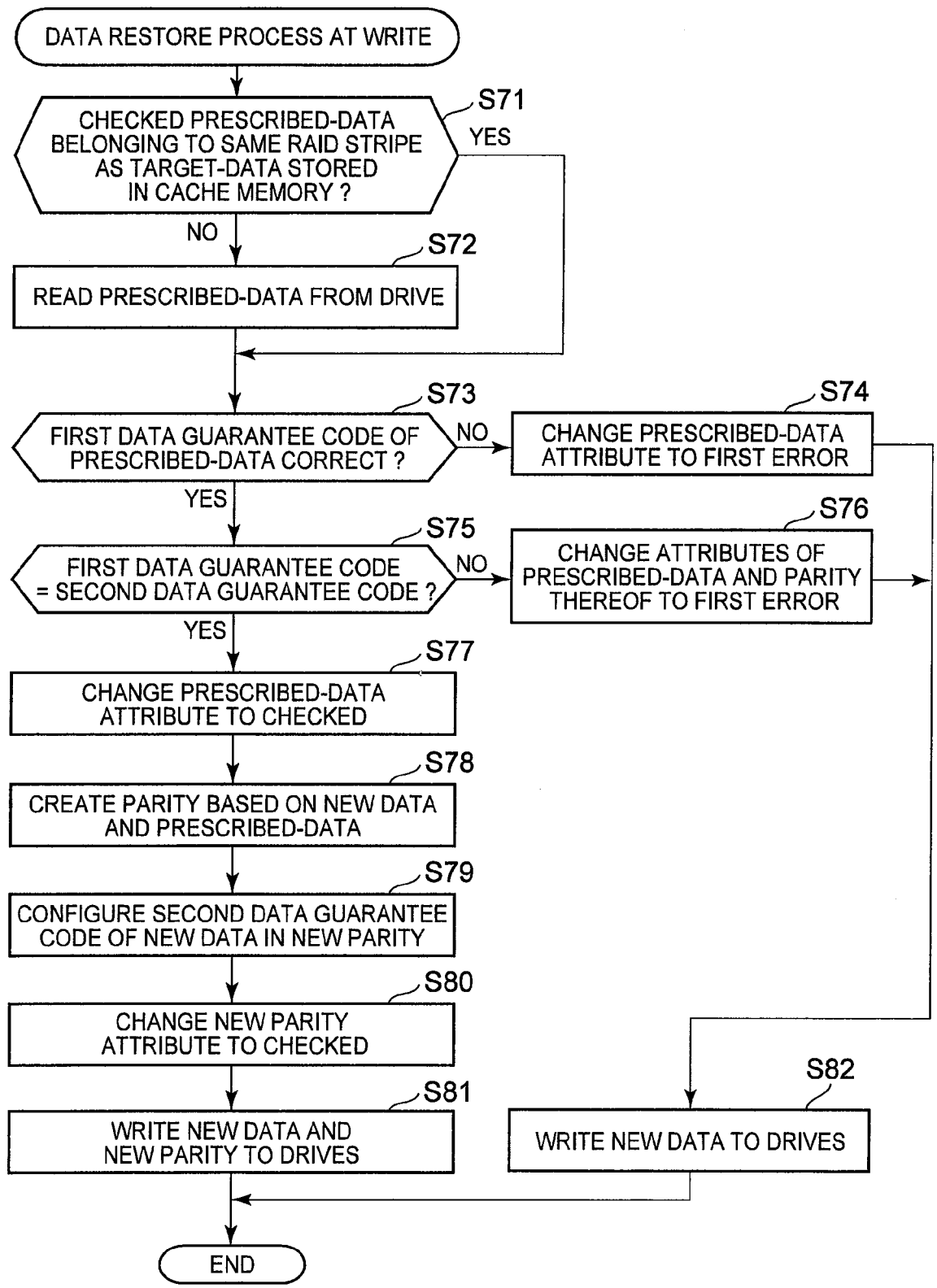
FIG. 15 is a flowchart showing a data restore process.

FIG. 15 is a flowchart showing the details of the data restore process of FIG. 14. The controller determines whether or not checked prescribed-data, which belongs to the same stripe as the target-data, is stored in the cache memory (S71). When the checked prescribed-data is not stored in the cache memory (S71: NO), the controller reads out the prescribed-data from the storage device (S72).

The controller checks whether or not the first data guarantee code of the prescribed-data is correct (S73), and when the first data guarantee code is incorrect (S73: NO), changes the attribute of the prescribed-data to first error (S74), and write the new data to the storage device (S82).

When the first data guarantee code of the prescribed-data is correct (S73: YES), the controller determines whether or not the first data guarantee code of the prescribed-data matches the second data guarantee code of the prescribed-data (S75). When the two data guarantee codes do not match (S75: NO), the controller changes both the attribute of the targeted data and the attribute of the old parity to first error (S76), and sends an error response to the host 20 (S82).

When it has been confirmed that there is no failure in the prescribed-data (S75: YES), the controller changes the attribute of the prescribed-data to checked (S77), and creates a new parity based on the new data and the prescribed-data (S78).

The controller adds a new-data second data guarantee code to the new parity (S79), changes the attribute of the new parity to checked (S80), and respectively stores the new data and new parity in the storage devices (S81). Furthermore, a second data guarantee code of the prescribed-data is also added to the new parity.

According to this embodiment, which is constituted like this, since a data guarantee code for detecting data correctness is correspondingly stored in both data and parity, a so-called write-error failure and read-error failure can be detected by comparing the respective data guarantee codes.

According to this embodiment, either data or parity can be restored based on RAID when a failure occurs, thereby enhancing storage controller reliability and user ease-of-use.

Second Embodiment

Figure 16:
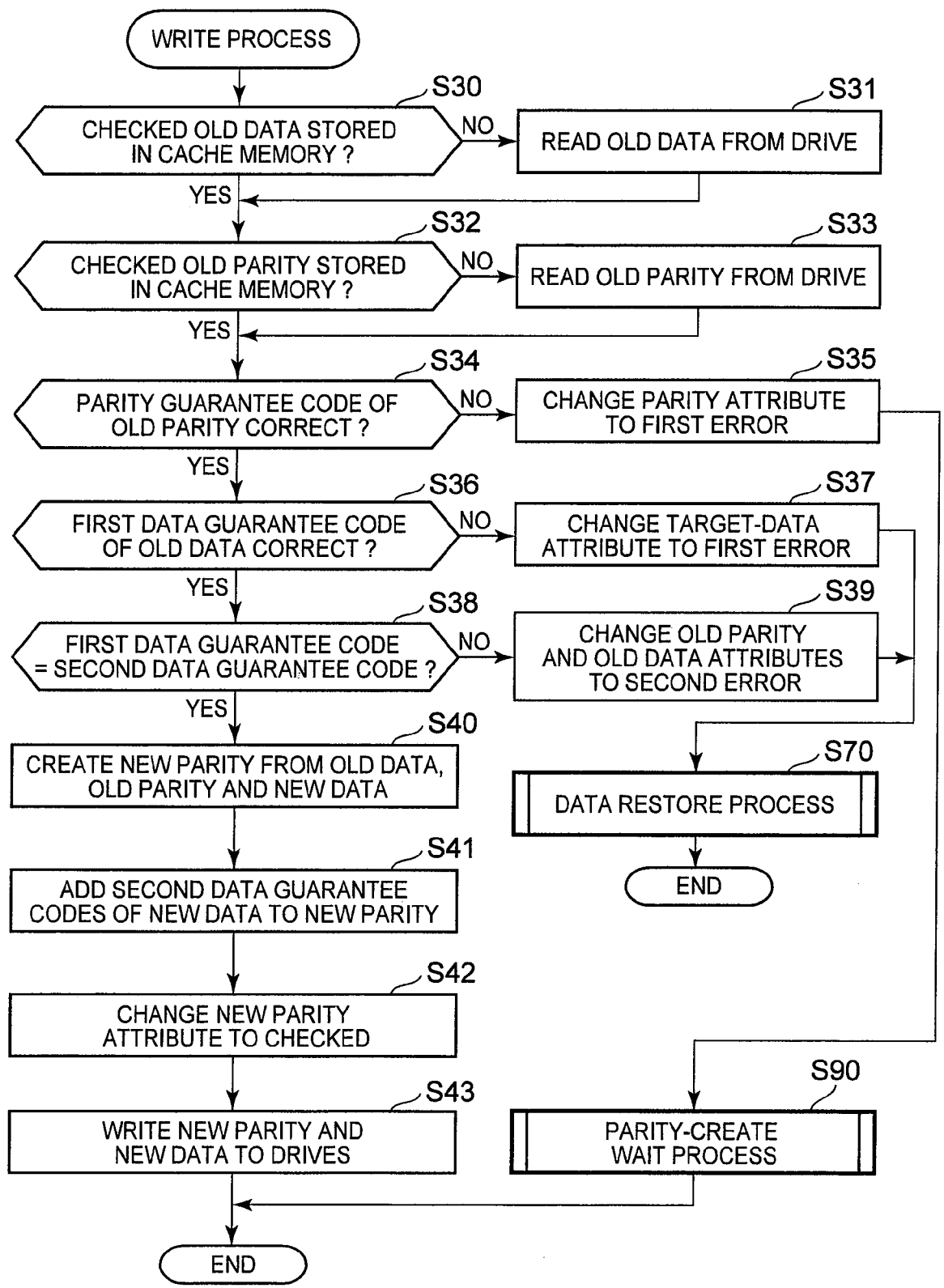
FIG. 16 is a flowchart showing a write process, which is executed by a storage controller related to a second embodiment.

FIG. 16 shows a write process, which is executed by the storage controller in accordance with a second embodiment. In this embodiment, when it is not possible to restore data in accordance with RAID, the controller waits for all the data in a stripe to be stored in the cache memory before creating a new parity (S90). Furthermore, the respective embodiments described hereinbelow are equivalent to variations of the first embodiment.

Figure 17:
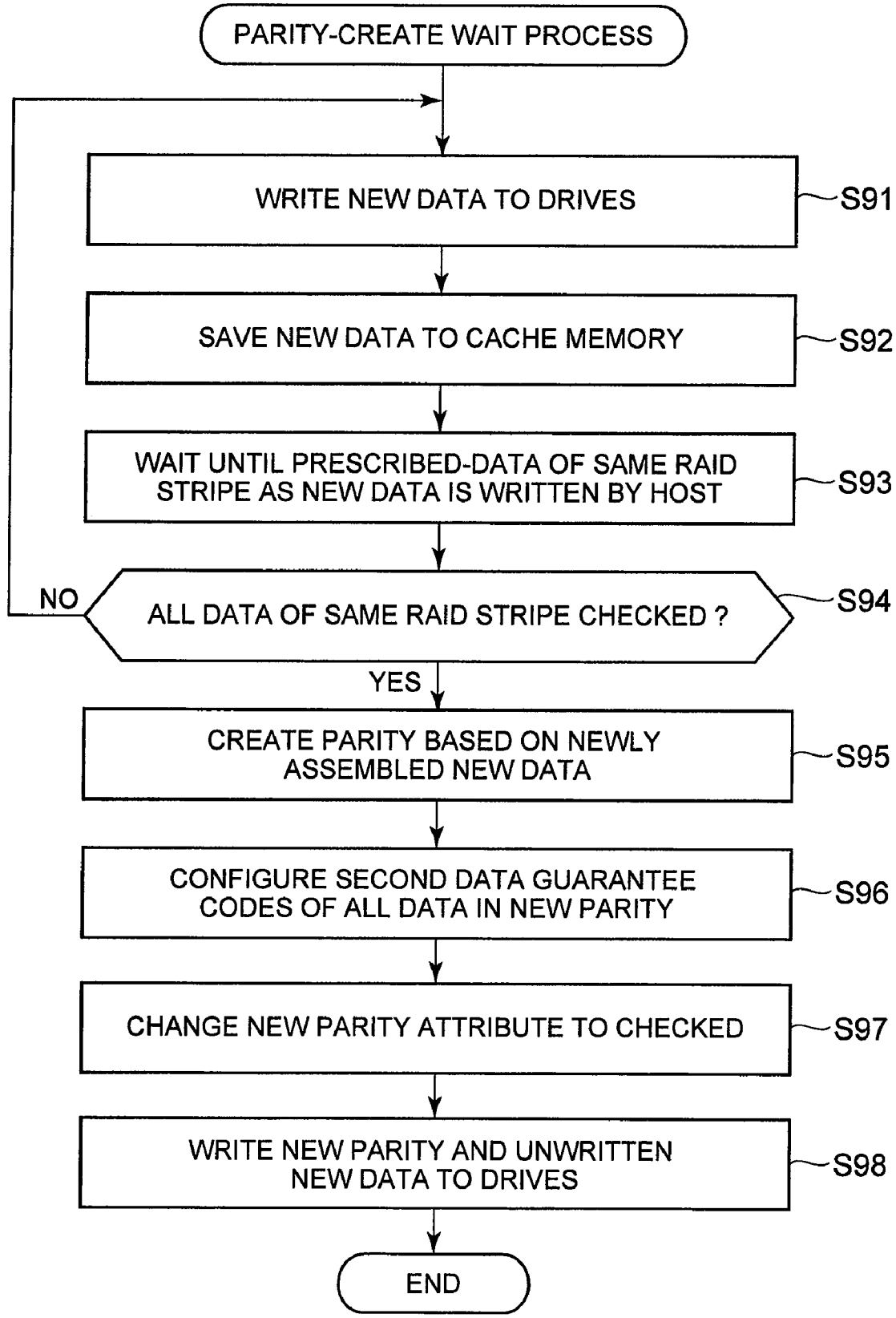
FIG. 17 is a flowchart showing a process, which waits until all data in a stripe has been updated before creating a new parity.

FIG. 17 is a flowchart showing the details of the parity-create wait process (S90) of FIG. 16. The controller writes new data to the storage device (S91), and also stores the new data in cache memory (S92). The controller stands by until prescribed-data belonging to the same stripe as the new data is written in by the host 20 (S93), and determines whether or not all of the data, which belongs to the same stripe, is checked (S94). S91 through S94 are repeated until all the data in the same stripe is updated.

When all the data in the same stripe is updated (S94: YES), the controller creates a new parity based on the respective new data (S95). The controller respectively configures the second data guarantee codes of the respective new data in the new parity (S96), and changes the attribute of the new parity to checked (S97). The controller respectively stores the new parity and unwritten new data to the storage devices (S98).

This embodiment, which is constituted like this, also exhibits the same effects as the first embodiment. Furthermore, in this embodiment, even when data cannot be restored in accordance with RAID, it is possible to restore a failure by waiting for all the data in a stripe to be updated by the host.

Third Embodiment

A third embodiment will be explained based on FIGS. 18 through 23. In this embodiment, information showing an update sequence (TC, SEQ#) is comprised inside the data guarantee codes.

Figure 18:
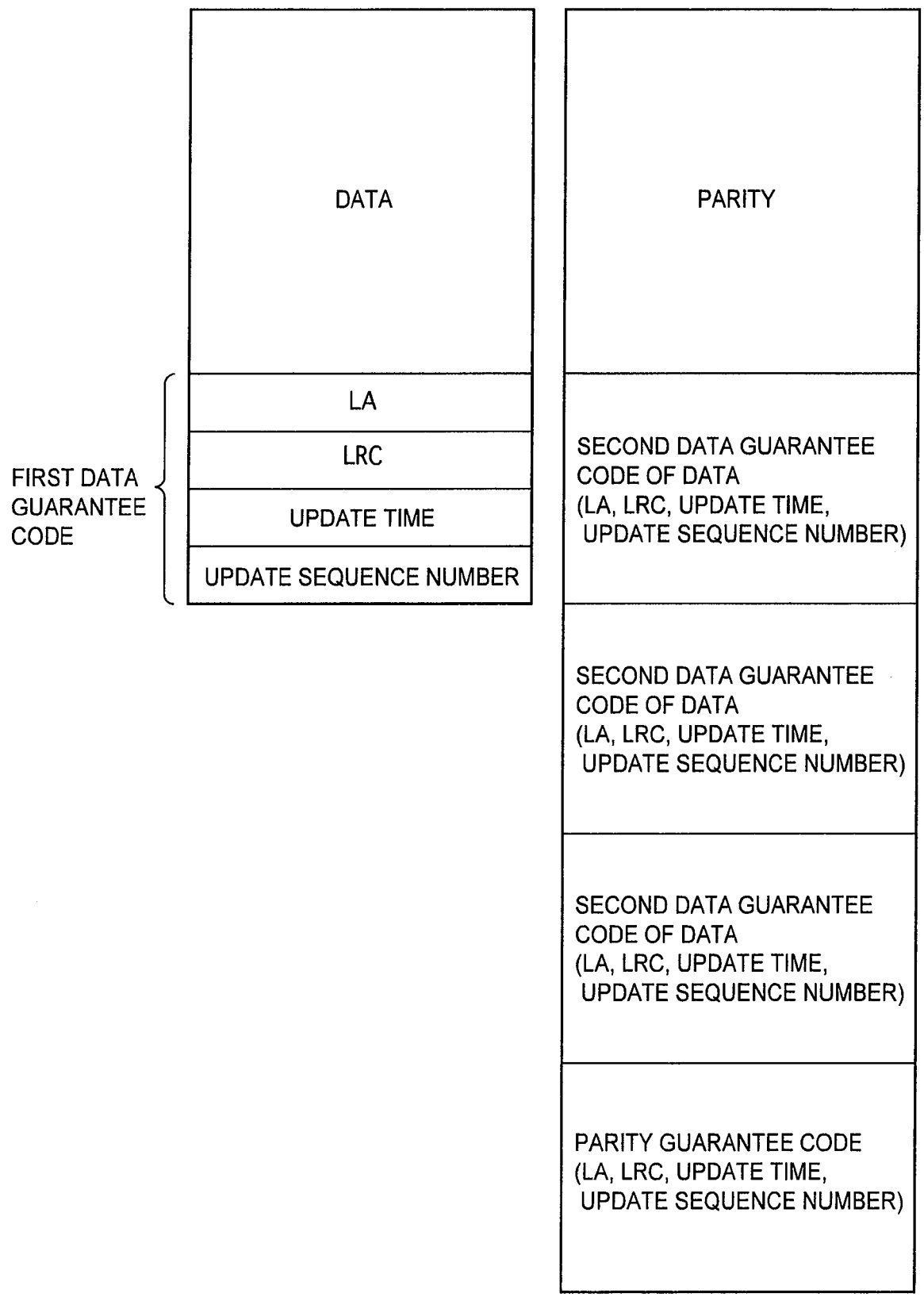
FIG. 18 is a schematic diagram showing a data guarantee code configuration method used by a storage controller related to a third embodiment.

FIG. 18 is a schematic diagram showing the contents of data guarantee codes. A first data guarantee code comprises LA, LRC, an update time (TC), and an update sequence number (SEQ#). The update time shows the time at which the host 20 requested that the storage controller carry out an update. The update sequence number is a number showing the order in which updating was carried out. The update sequence number is incremented by 1 each time data is updated.

As shown in the right side of FIG. 18, second data guarantee codes related to the respective data and a parity guarantee code are configured in the parity. The second data guarantee codes and parity guarantee code comprise LA, LRC, update times, and update sequence numbers the same as the first data guarantee code.

Figure 19:
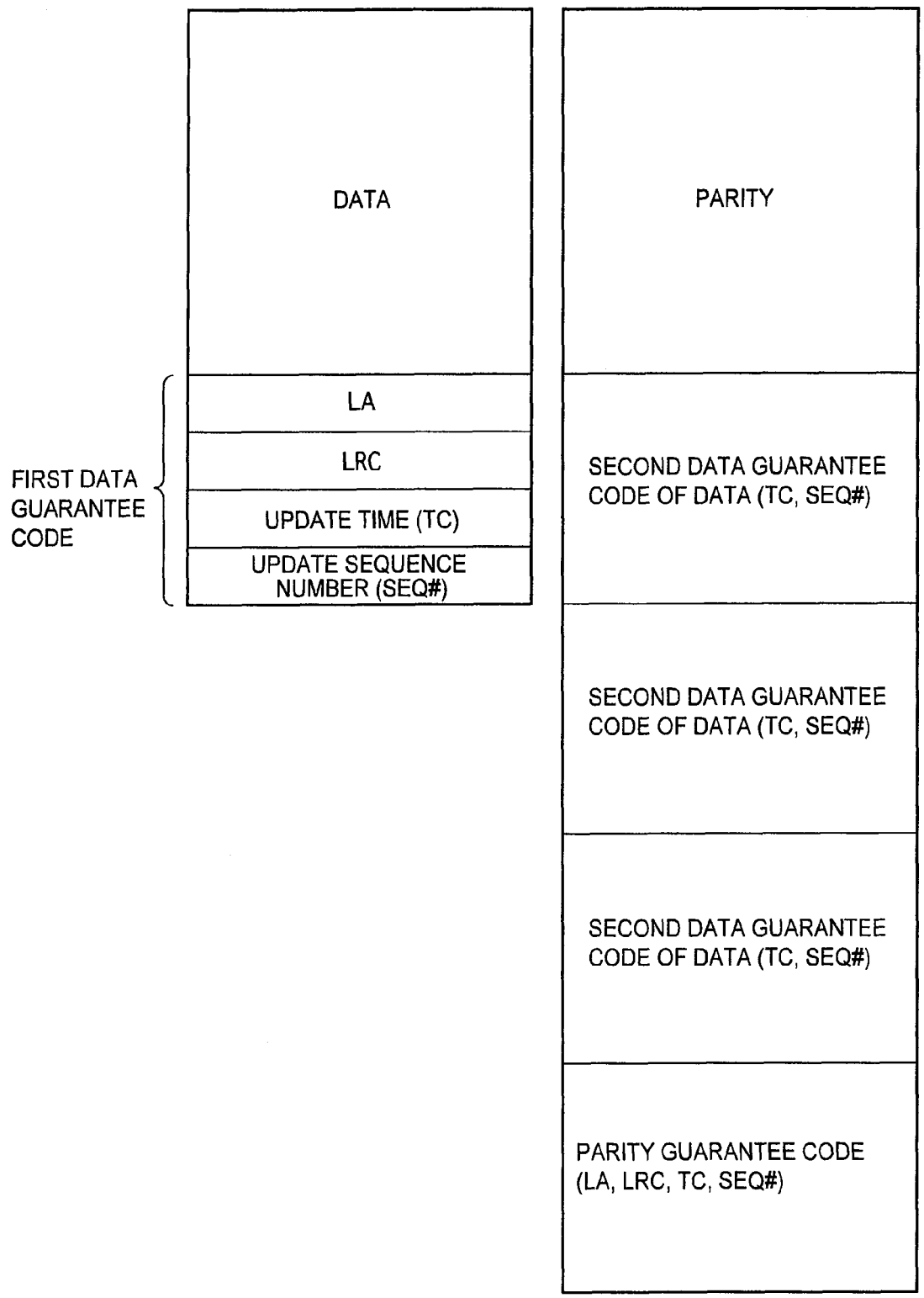
FIG. 19 is a schematic diagram showing another data guarantee code configuration method.

FIG. 19 is a schematic diagram showing different examples of data guarantee codes. The first data guarantee code is the same as that shown in FIG. 18. However, the second data guarantee codes shown in FIG. 19 comprise only update time and update sequence number, and do not comprise LA and LRC. This is because it is possible to determine whether or not a failure has occurred in the data by simply comparing information showing the update sequences of the data and the parity. Furthermore, information showing the update sequence comprises the two types update time and update sequence number, and either one of the two can be used. Further, other information besides these two types can also be used as information showing the update sequence.

FIGS. 20 through 23 show a read process. First, FIG. 20 will be referenced. When the first data guarantee code of target-data read out from the storage controller is incorrect (S12: NO), the controller changes the attribute of the target-data to first error (S100). Then, the controller executes the processing shown in FIG. 23. This processing will be explained below.

When the first data guarantee code is correct (S12: YES), and the parity guarantee code is also correct (S16: YES), the controller determines whether or not the update sequence R1 of the first data guarantee code matches the update sequence R2 of the second data guarantee code (S101). Update sequence R1 can also be called the first update sequence, and update sequence R2 can also be called the second update sequence.

When update times and update sequence numbers exist inside both the first and second data guarantee codes, the controller first determines the chronology of the update times, and if these update times are the same, also determines the sizes of the update sequence numbers (S101). When the first and second data guarantee codes comprise both update times and update sequence numbers, it is possible to decide whether data or parity is incorrect even when updating was carried out at the same time.

When the first update sequence R1 and second update sequence R2 match (S101: YES), it is determined that a failure has not occurred. Accordingly, the controller changes the attribute of the target-data to checked (S20), and sends the target-data to the host 20 (S21).

When the first update sequence R1 and second update sequence R2 do not match (S101: NO), the controller determines if either update sequence R1 or update sequence R2 is new (S102).

When R1 is larger than R2 (S102: YES), the data can be new and the parity old. That is, a failure has not occurred in the data, but there could be a failure in the parity. Accordingly, the controller executes the processing shown in FIG. 21. This processing will be explained below.

When R2 is larger than R1 (S102: NO), the parity can be new and the data old. That is, a failure may have occurred in the data. Accordingly, the controller executes the processing shown in FIG. 22. This processing will be explained below.

Figure 20:
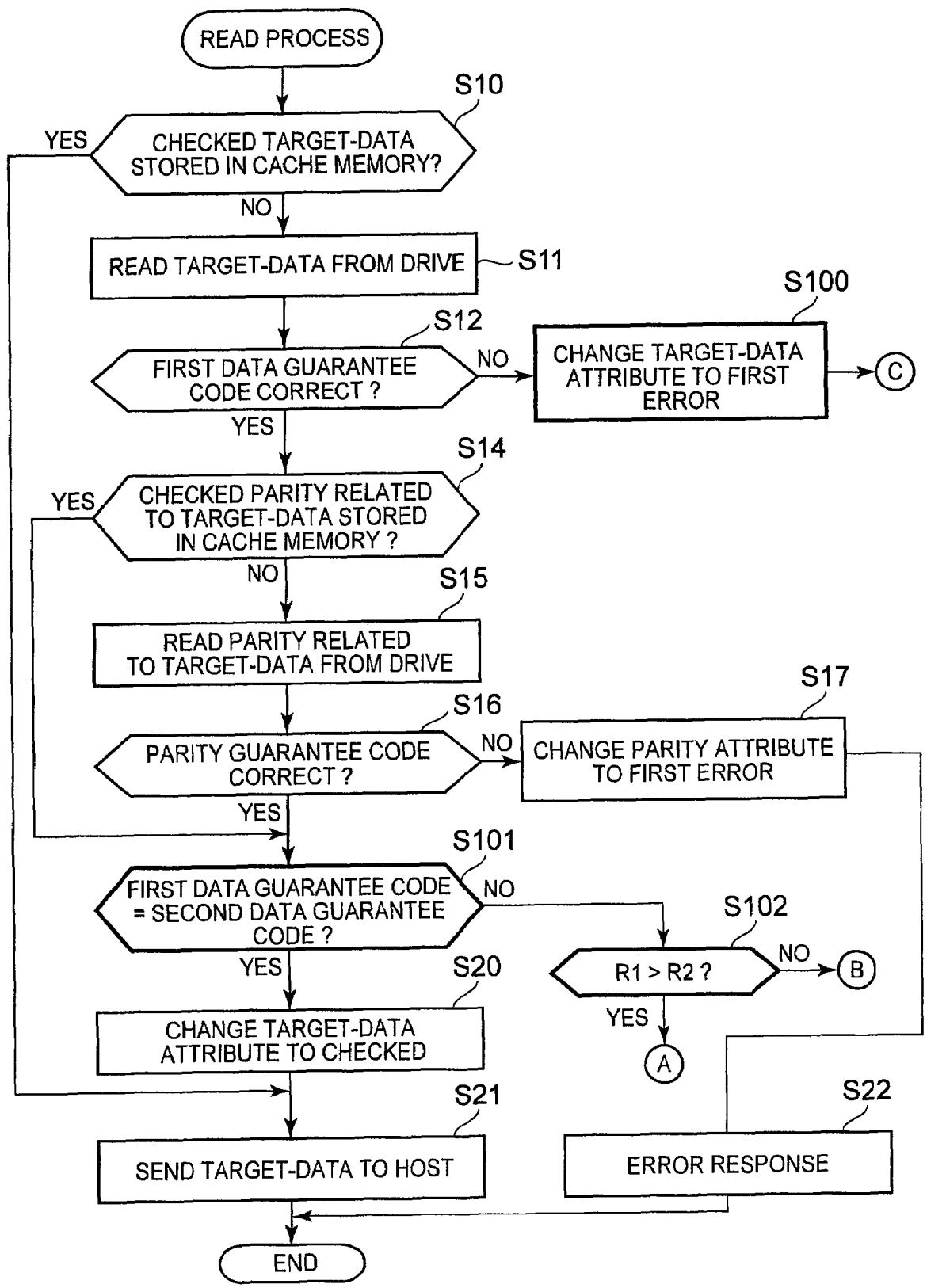
FIG. 20 is a flowchart showing a read process.
Figure 21:
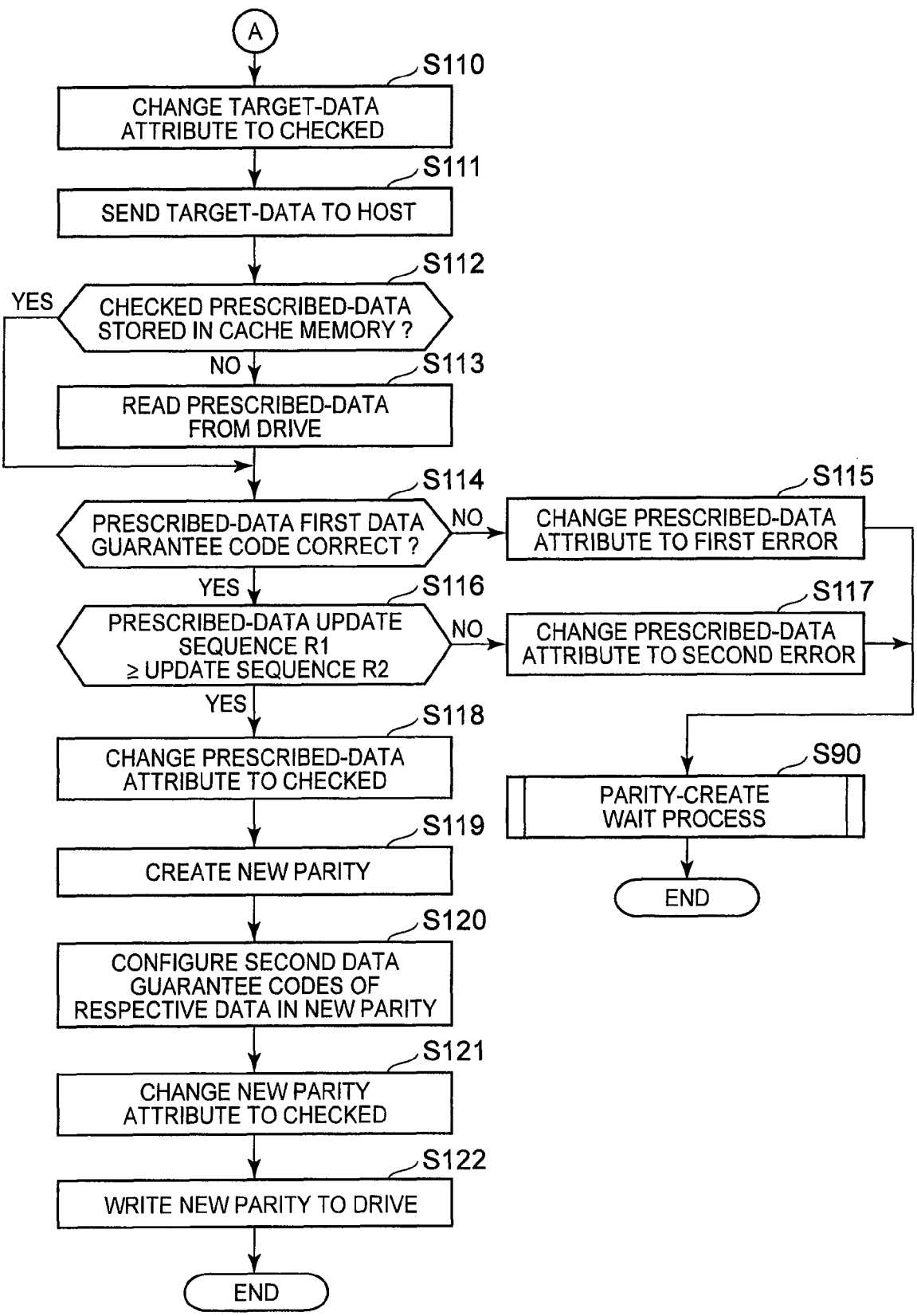
FIG. 21 is a continuation flowchart of FIG. 20.

FIG. 21 is a flowchart, which continues the flowchart of FIG. 20 from connector (A). That is, FIG. 21 shows the processing carried out when the data is correct and the parity is incorrect.

The controller changes the attribute of the target-data to checked (S110), and sends the target-data to the host 20 (S111). Since the target-data is correct, the controller can send the target-data to the host 20, and notify the host 20 of the end of the read process. Next, the controller restores the parity.

The controller determines whether or not checked prescribed-data is stored in the cache memory (S112). When checked prescribed-data is not stored in the cache memory (S112: NO), the controller reads out the prescribed-data from the storage device (S113).

The controller determines whether or not the first data guarantee code of the prescribed-data is correct (S114). If the first data guarantee code configured in the prescribed-data is incorrect (S114: NO), the controller changes the attribute of the prescribed-data to first error (S115), and executes the above-mentioned parity-create wait process (S90).

When the first data guarantee code of the prescribed-data is correct (S114: YES), the controller compares the R1 and R2 related to the prescribed-data (S116). That is, the controller checks whether or not the prescribed-data is the correct data by comparing the data update sequence R1 against the parity update sequence R2.

When the second update sequence R2 is larger than the first update sequence R1 (S116: NO), the prescribed-data could be older than the parity, and a failure could have occurred in the prescribed-data. Accordingly, the controller changes the attribute of the prescribed-data to second error (S117), and executes the parity-create wait process (S90).

When the first update sequence R1 is either equivalent to or larger than the second update sequence R2 (S116: YES), it is determined that a failure has not occurred in the prescribed-data. Accordingly, the controller changes the attribute of the prescribed-data to checked (S118), and creates a new parity based on the target-data and the prescribed-data (S119).

The controller configures second data guarantee codes related to the respective data in the new parity (S120), and changes the attribute of the new parity to checked (S121). The controller stores the new parity in the storage device (S122).

Figure 22:
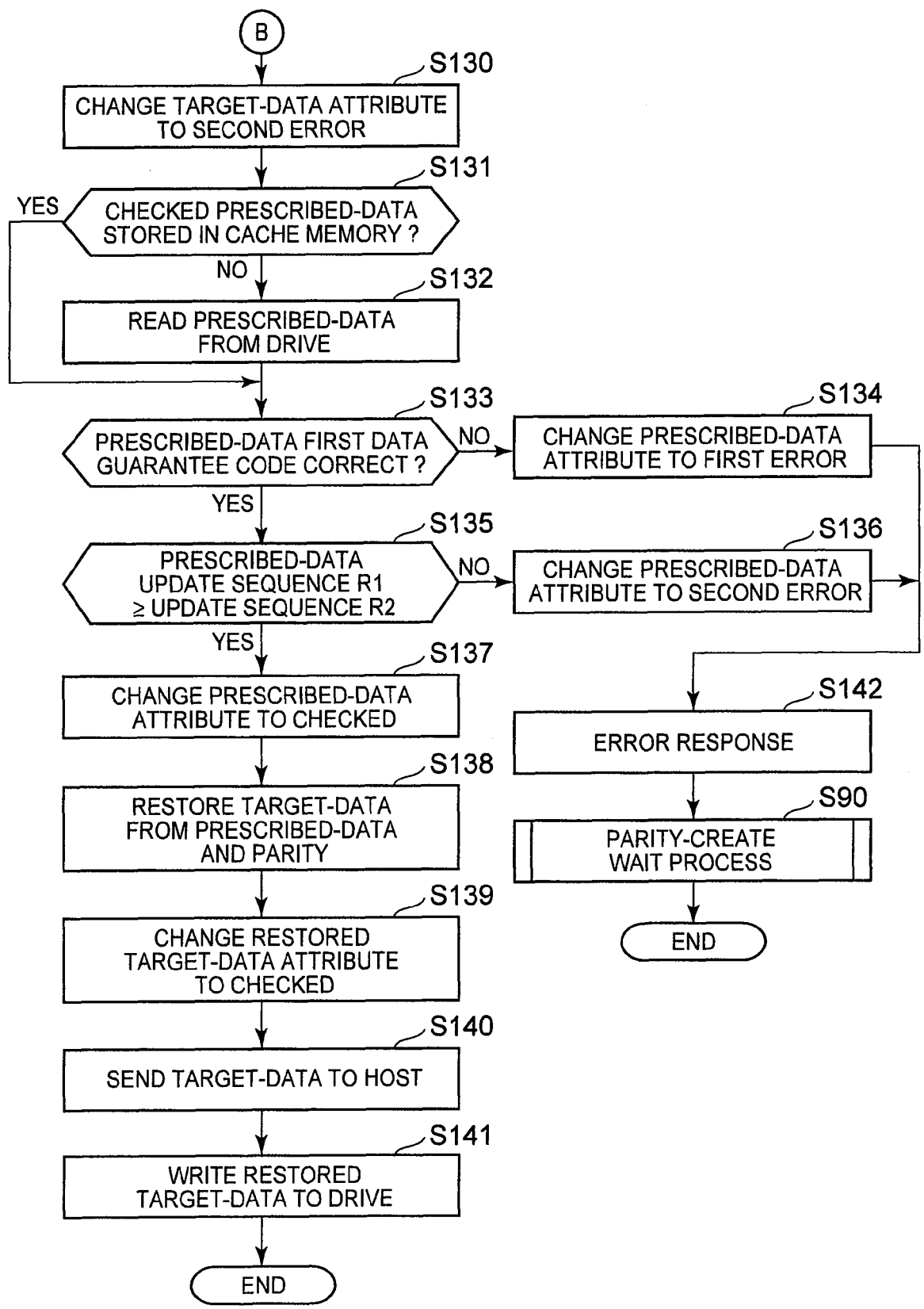
FIG. 22 is another continuation flowchart of FIG. 20.

FIG. 22 is a flowchart, which continues the flowchart of FIG. 20 from connector (B). That is, FIG. 22 shows the processing carried out when the parity is correct, and a failure has occurred in the target-data. The controller changes the attribute of the target-data to second error (S130).

The controller determines whether or not checked prescribed-data is stored in the cache memory (S131). When checked prescribed-data is not stored in the cache memory (S131: NO), the controller reads out the prescribed-data from the storage device (S132).

The controller checks whether or not the first data guarantee code configured in the prescribed-data is correct (S133). When the controller determines that the first data guarantee code is incorrect (S133: NO), the controller changes the attribute of the prescribed-data to first error (S134), and sends an error response to the host 20 (S142). Then, the controller executes the parity-create wait process (S90).

When the first data guarantee code of the prescribed-data is correct (S133: YES), the controller compares the first update sequence R1 against the second update sequence R2 for the prescribed-data (S135). When the second update sequence R2 is larger than the first update sequence R1 (S135: NO), that is, when a failure has occurred in the prescribed-data, the controller changes the attribute of the prescribed-data to second error (S136). The controller sends an error response to the host 20 (S142), and executes the parity-create wait process (S90).

When the first update sequence R1 is either equivalent to or larger than the second update sequence R2 (S135: YES), there is no failure in the prescribed-data. Accordingly, the controller changes the attribute of the prescribed-data to checked (S137), and restores the target-data on the basis of the prescribed-data and the parity (S138).

The controller changes the attribute of the restored target-data to checked (S139), and sends the restored target-data to the host 20 (S140). Furthermore, the controller writes the restored target-data to the storage device, and overwrites the old target-data with the new data (S141).

Figure 23:
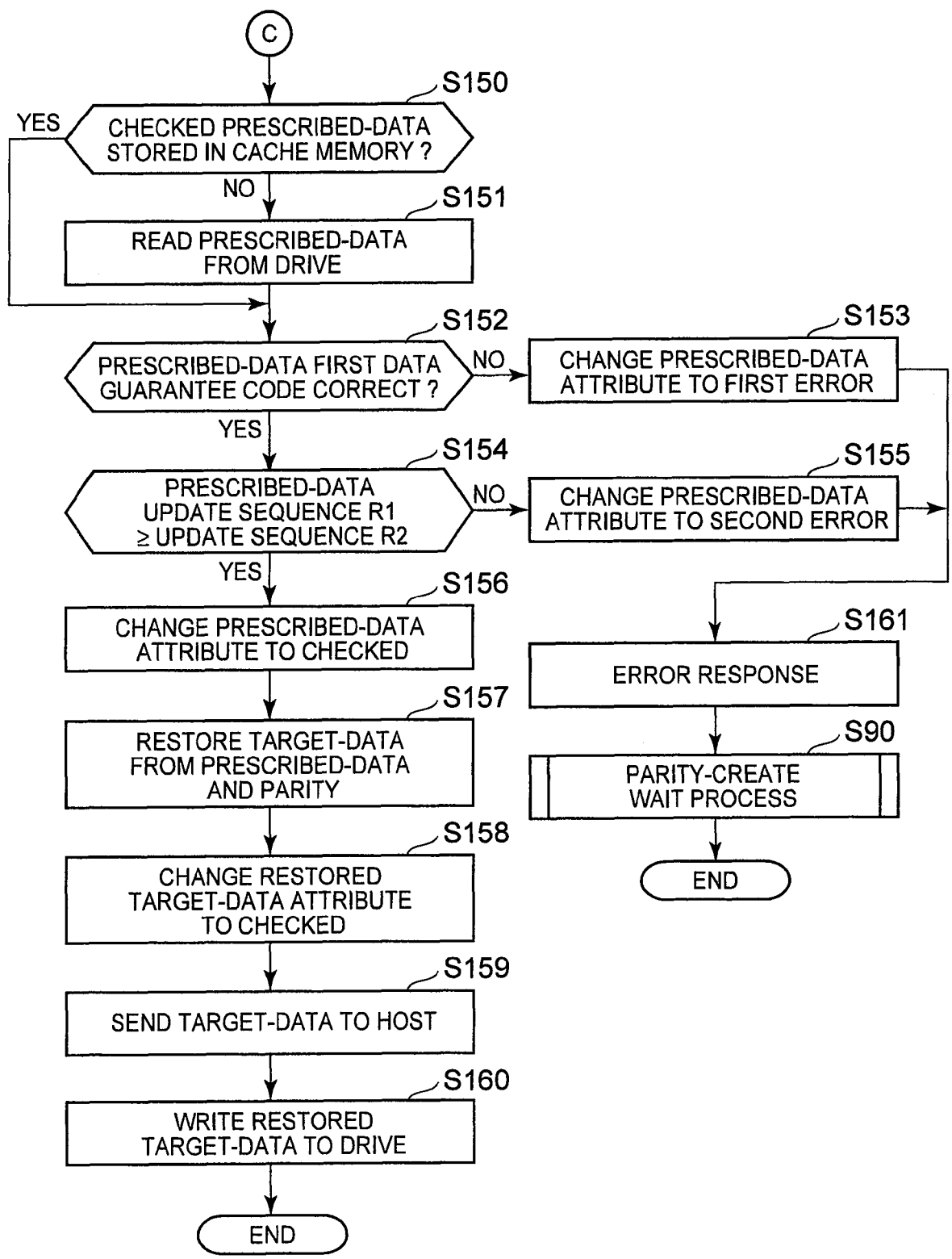
FIG. 23 is yet another continuation flowchart of FIG. 20.

FIG. 23 is a flowchart, which continues the flowchart of FIG. 20 from connector (C). That is, FIG. 23 shows the processing carried out when only the target-data, for which a read was requested by the host 20, is incorrect. In this case, the same processing as that described in FIG. 22 is executed.

The controller determines whether or not checked prescribed-data is stored in the cache memory (S150), and if checked prescribed-data is not stored in the cache memory (S150: NO), reads the prescribed-data from the storage device (S151).

The controller checks whether or not the first data guarantee code configured in the prescribed-data is correct (S152), and when the controller determines that the first data guarantee code is incorrect (S152: NO), the controller changes the attribute of the prescribed-data to first error (S153). The controller sends an error response to the host 20 (S161), and executes the parity-create wait process (S90).

When the first data guarantee code of the prescribed-data is correct (S152: YES), the controller compares the first update sequence R1 against the second update sequence R2 for the prescribed-data (S154). When the second update sequence R2 is larger than the first update sequence R1 (S154: NO), the controller changes the attribute of the prescribed-data to second error (S155). The controller sends an error response to the host 20 (S161), and executes the parity-create wait process (S90).

When the first update sequence R1 is either equivalent to or larger than the second update sequence R2 (S154: YES), the controller changes the attribute of the prescribed-data to checked (S156), and restores the target-data on the basis of the prescribed-data and the parity (S157).

The controller changes the attribute of the restored target-data to checked (S158), and sends the restored target-data to the host 20 (S159). Furthermore, the controller writes the restored target-data to the storage device, and overwrites the old target-data with the new data (S160).

This embodiment, which is constituted like this, also exhibits the same effects as the first embodiment. Furthermore, in this embodiment, since information showing the update sequence is respectively comprised in the first data guarantee code and the second data guarantee code, it is possible to determine if a failure has occurred in either data or parity. Then, appropriate restore processing can be carried out in accordance with the location of the failure.

Fourth Embodiment

A fourth embodiment will be explained based on FIGS. 24 through 29. This embodiment will be explained by giving a RAID 1+0 configuration as an example. Initially, the basic constitution of this embodiment will be explained based on FIGS. 24 through 26, and then the improved technique will be explained based on FIGS. 27 through 29.

FIG. 24 is a schematic diagram showing how a first data guarantee code and second data guarantee code are configured in a RAID 1+0 configuration. The two storage devices shown as "drive 0" and "drive 1" in the figure are the primary storage devices. The two storage devices shown as "drive 2" and "drive 3" are the secondary storage devices.

Data stored in a primary storage device will be called primary data, and data stored in a secondary storage device will be called mirror data. The data guarantee code configured in the primary data will be called the first data guarantee code, and the data guarantee code configured in the mirror data will be called the second data guarantee code. Under normal circumstances, the storage contents of the primary storage device and secondary storage device will coincide.

Figure 25:
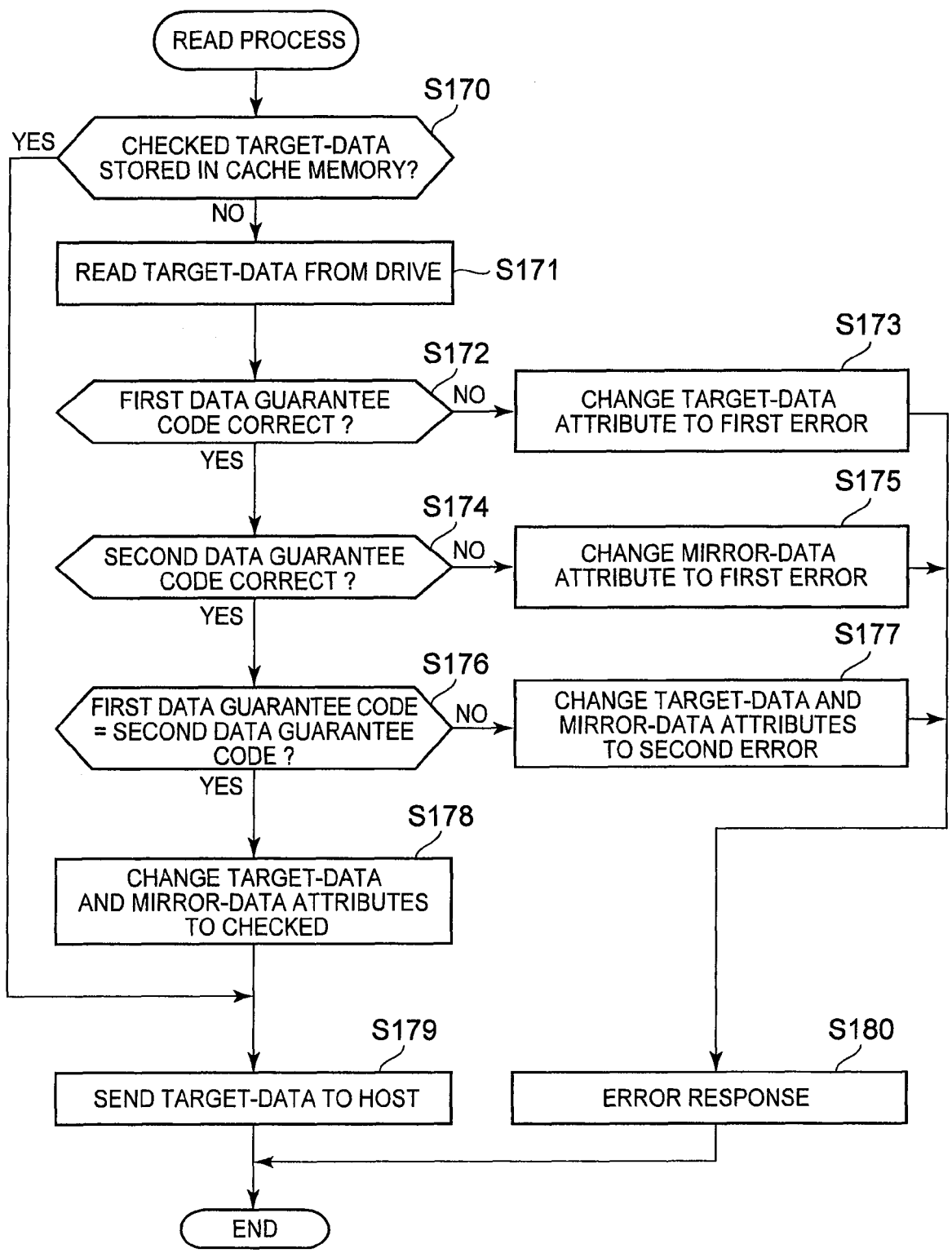
FIG. 25 is a flowchart showing a read process.

FIG. 25 shows a flowchart of a read process. The controller determines whether or not checked target-data is stored in the cache memory (S170). When checked target-data is stored in the cache memory (S170: YES), the controller sends this checked target-data to the host 20 (S179).

When checked target-data is not stored in the cache memory (S170: NO), the controller reads out the target-data from the primary storage device (S171), and checks whether or not the first data guarantee code of the target-data is correct (S172). When the first data guarantee code of the target-data is incorrect (S172: NO), the controller changes the attribute of the target-data to first error (S173), and notifies the host 20 of the error (S180).

When the first data guarantee code is correct (S172: YES), the controller reads out the second data guarantee code from the secondary storage device, and checks whether or not the second data guarantee code is correct (S174). If the second data guarantee code is incorrect (S174: NO), the controller changes the attribute of the mirror data to first error (S175), and sends an error response to the host 20 (S180).

When the second data guarantee code is correct (S174: YES), the controller determines whether or not the first data guarantee code and the second data guarantee code match (S176). When the first data guarantee code and the second data guarantee code do not match (S176: NO), the controller sends an error response to the host 20 (S180).

When the first data guarantee code and the second data guarantee code match (S176: YES), the controller changes both the attribute of the target-data and the attribute of the mirror data to checked (S178), and sends the target-data to the host 20 (S179).

Figure 26:
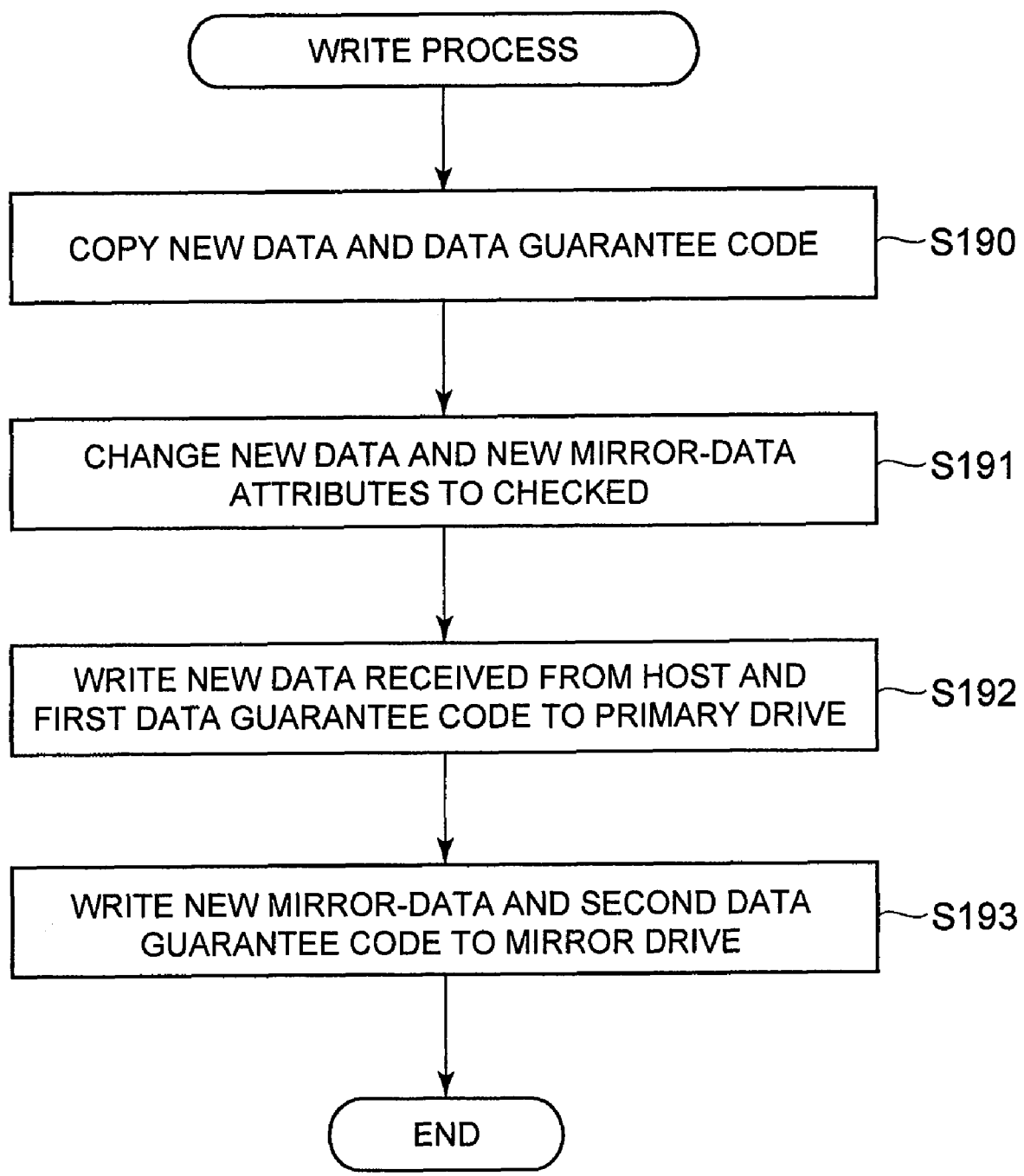
FIG. 26 is a flowchart showing a write process.

FIG. 26 is a flowchart showing a write process. The controller copies the new data received from the host 20 and the data guarantee code correspondent to this new data to the secondary storage device (S190). The original data guarantee code becomes the first data guarantee code, and the copied data guarantee code becomes the second data guarantee code.

The controller changes both the attribute of the new data and the attribute of the new mirror data to checked (S191). The controller writes the new data and the first data guarantee code to the primary storage device (S192), and also writes the new mirror data and second data guarantee code to the secondary storage device (S193).

FIG. 27 is a schematic diagram showing different examples of data guarantee codes. In the examples shown in FIG. 27, update times and update sequence numbers are comprised inside the data guarantee codes.

Figure 28:
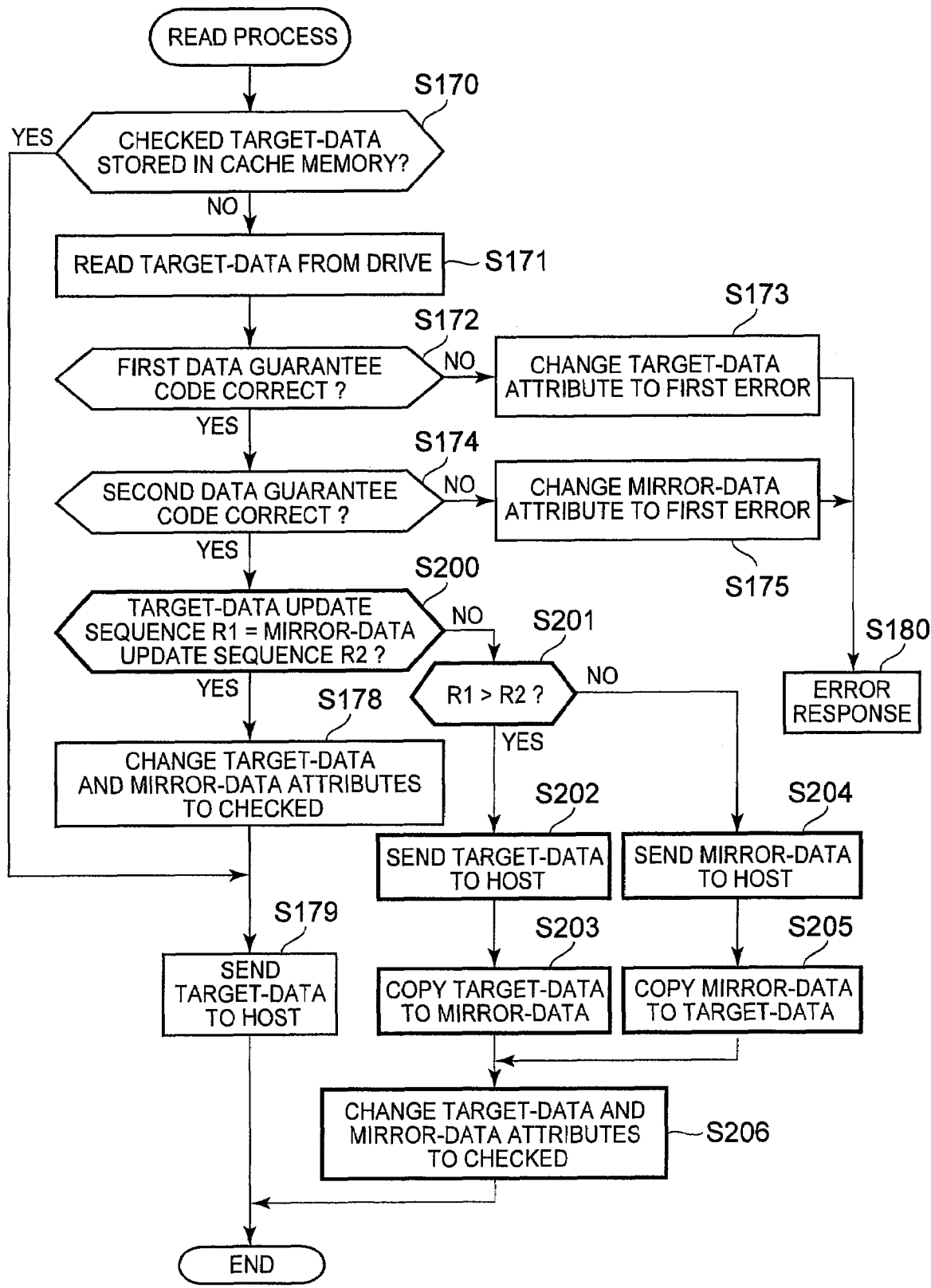
FIG. 28 is a flowchart showing a read process.

FIG. 28 is a flowchart of an improved read process. The explanation will focus on the parts that differ from FIG. 25. When the second data guarantee code is correct (S174: YES), the controller determines whether or not the update sequence R1 of the target-data matches the update sequence R2 of the mirror data (S200).

When the two update sequences R1, R2 match (S200: YES), there is no failure, and therefore the controller changes both the attribute of the target-data and the attribute of the mirror data to checked (S178), and sends the target-data to the host 20 (S179).

When the update sequence R1 of the target-data does not match the update sequence R2 of the mirror data (S200: NO), the controller compares the size of update sequence R1 against that of update sequence R2 (S201). When update sequence R1 is larger than update sequence R2 (S201: YES), the target-data could be newer than the mirror data.

Accordingly, the controller sends the target-data to the host 20 (S202), and copies the target-data to the mirror data (S203). That is, the controller eliminates the error by overwriting the incorrect mirror data with the correct target-data. The controller changes both the attribute of the target-data and the attribute of the mirror data to checked (S206).

When update sequence R2 is larger than update sequence R1 (S201: NO), the mirror data is newer than the target-data. Accordingly, the controller sends the mirror data to the host 20 (S204), and copies the mirror data to the target-data (S205).

That is, the controller eliminates the error by overwriting the target-data with the correct mirror data. The controller changes both the attribute of the target-data and the attribute of the mirror data to checked (S206).

Figure 29:
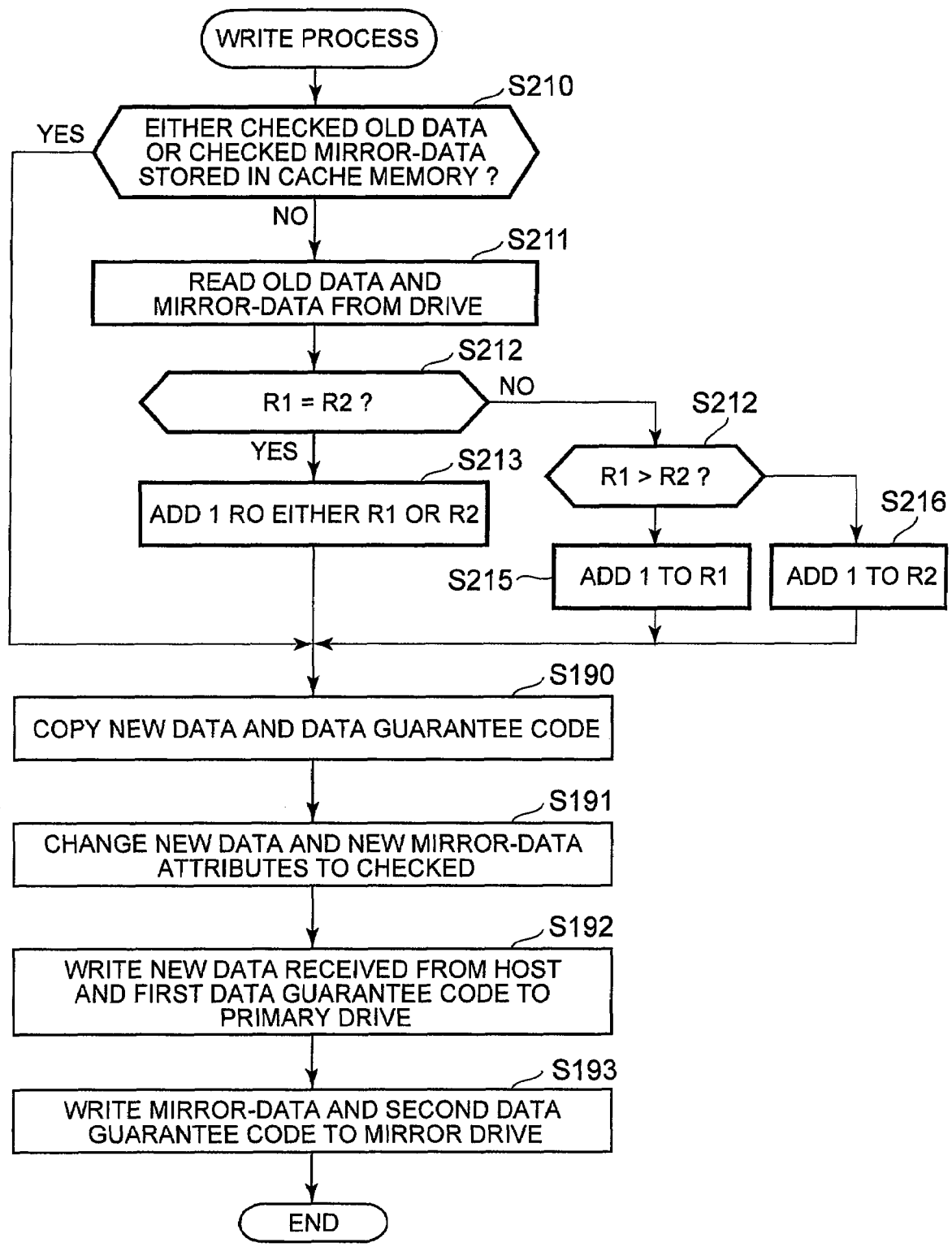
FIG. 29 is a flowchart showing a write process.

FIG. 29 is a flowchart showing an improved write process. The controller determines whether or not either checked old data or checked old mirror data is stored in the cache memory (S210).

When neither checked old data nor checked old mirror data is stored in the cache memory (S210: NO), the controller reads out the old data and old mirror data from the storage devices (S211), and compares update sequence R1 against update sequence R2 (S212).

When update sequence R1 and update sequence R2 match (S212: YES), the controller adds 1 to either R1 or R2 (S213).

When update sequence R1 and update sequence R2 do not match (S212: NO), the controller determines which of R1 or R2 is larger (S214). If R1 is larger than R2 (S214: YES), the controller adds 1 to R1 (S215). If R2 is larger than R1 (S214: NO), the controller adds 1 to R2 (S216).

Adding 1 to R1 and R2 signifies respectively updating both the update times and update sequence numbers. This is because the update sequence of the old data read out in S211 is updated and stored in advance.

Thereafter, the same as described in FIG. 26, the controller copies the new data and data guarantee code to the secondary storage device (S190), and changes both the attribute of the new data and the attribute of the new mirror data to checked (S191). The new data and first data guarantee code are written to the primary storage devices (S192), and the mirror data and second data guarantee code are written to the secondary storage devices (S193).

This embodiment, which is constituted like this, also exhibits the same effects as the first embodiment.

Fifth Embodiment

A fifth embodiment will be explained based on FIGS. 30 through 36. This embodiment and the subsequently explained sixth embodiment describe cases in which the present invention is applied to RAID 6. In this embodiment, a "P+Q Galois Method (Maximum Distance Separable RAID 6)" will be explained, and in the sixth embodiment, a "2D–XOR Method (2-Dimensional–XOR RAID 6)" will be explained.

Figure 30:
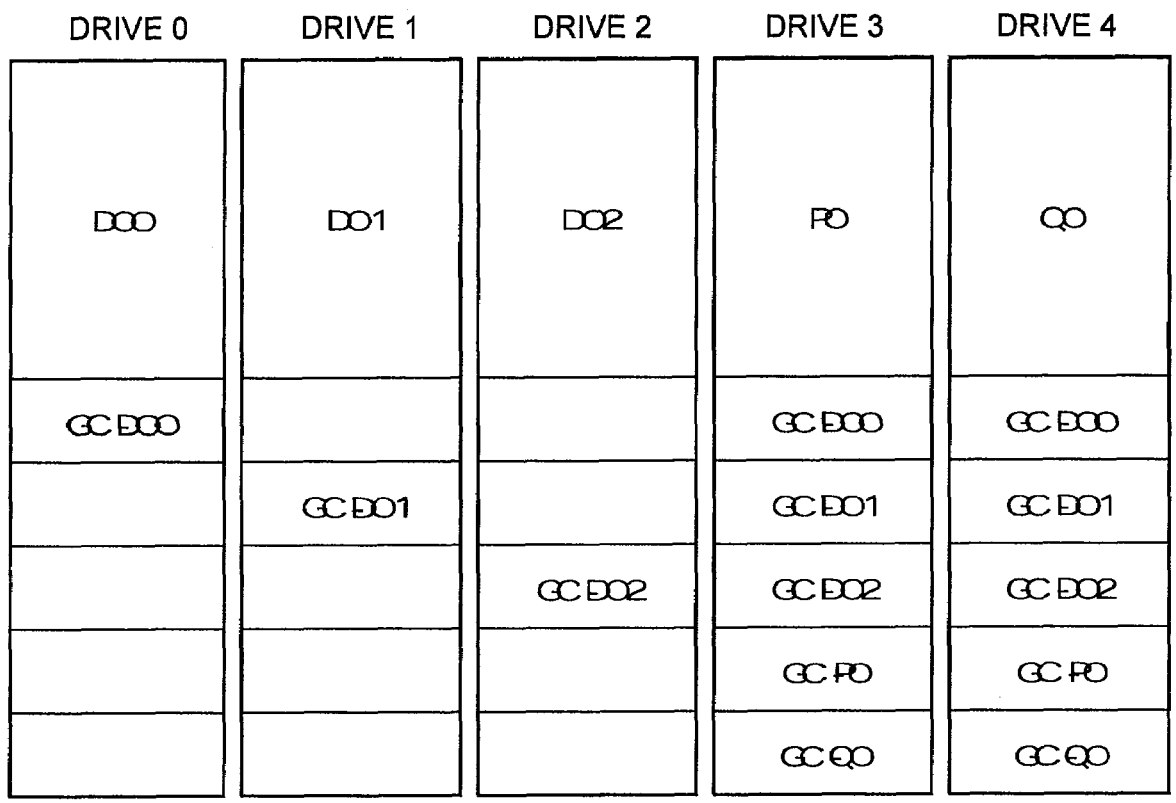
FIG. 30 is a flowchart showing a data guarantee code configuration method used by a storage controller related to a fifth embodiment.

FIG. 30 is a schematic diagram showing a data guarantee code storage method in a 3D+2P RAID 6. "Drive 0", "drive 1" and "drive 2" are storage devices for storing data, "drive 3" is the storage device for storing P-parity, and "drive 4" is the storage device for storing Q-parity. A storage device for storing data can be called a data storage device, the storage device for storing P-parity can be called the P-parity storage device, and the storage device for storing Q-parity can be called the Q-parity storage device. Further, generically the P-parity storage device and Q-parity storage device can also be called parity storage devices.

Data, and the first data guarantee codes that are correspondent to these data, are respectively stored in the data storage devices (drives 0 through 2). The P-parity storage device stores a P-parity, second data guarantee codes respectively corresponding to the respective first data guarantee codes, a P-parity guarantee code, and a Q-parity guarantee code. Similarly, the Q-parity storage device stores a Q-parity, the respective second data guarantee codes, a P-parity guarantee code, and a Q-parity guarantee code. The guarantee code for checking the correctness of P-parity will be called the P-parity guarantee code, and the guarantee code for checking the correctness of Q-parity will be called the Q-parity guarantee code.

Figure 31:
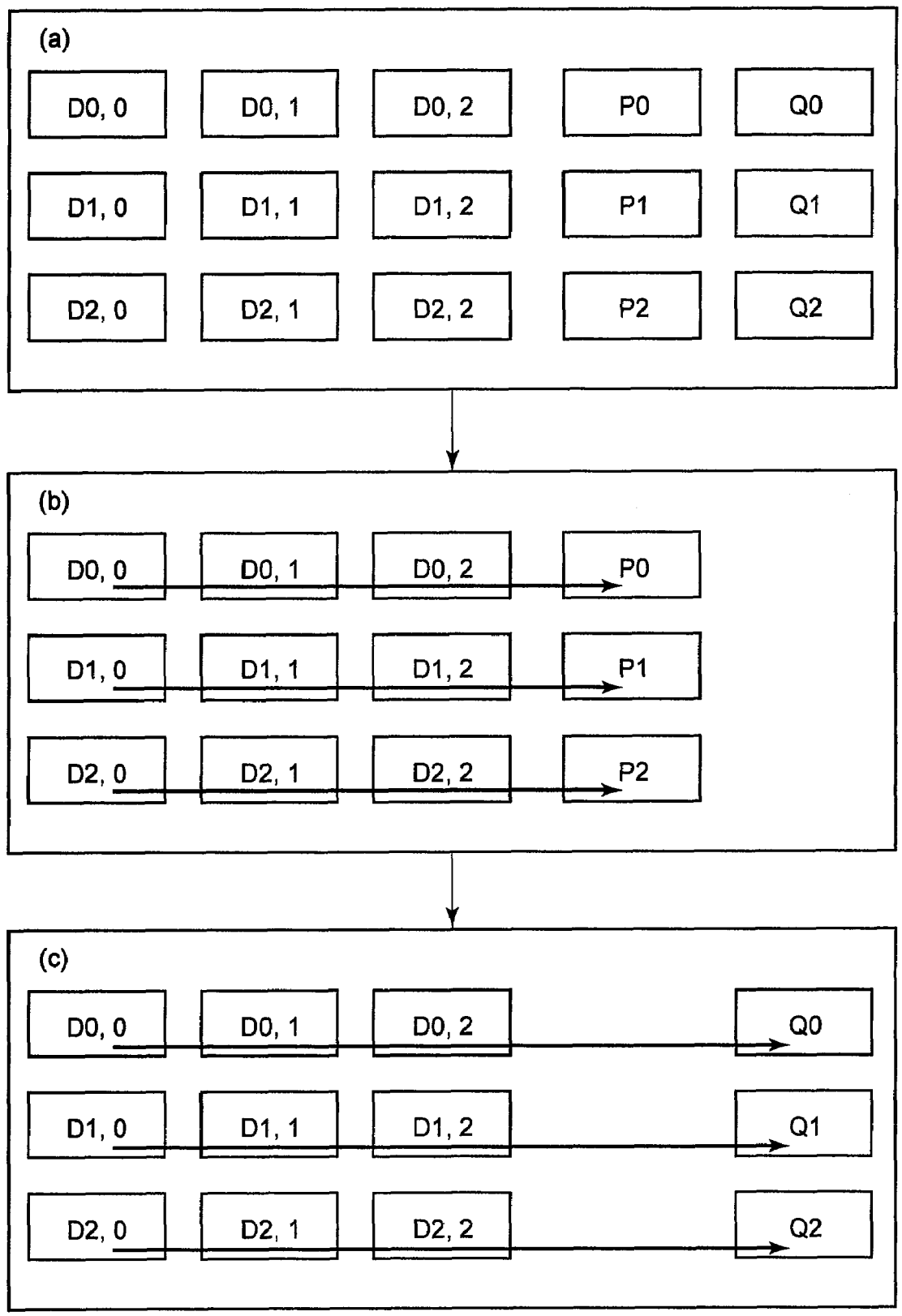
FIG. 31 is a schematic diagram showing a RAID 6 P+Q method.

FIG. 31 is a schematic diagram illustrating the "P+Q Galois Method". FIG. 31A shows the data and parity stored in the respective storage devices. As shown in FIG. 31B, P-parity is created on the basis of data in a stripe. As shown in FIG. 31C, Q-parity is created on the basis of data in a stripe. That is, both P-parity and Q-parity are calculated for the same data group.

Figure 32:
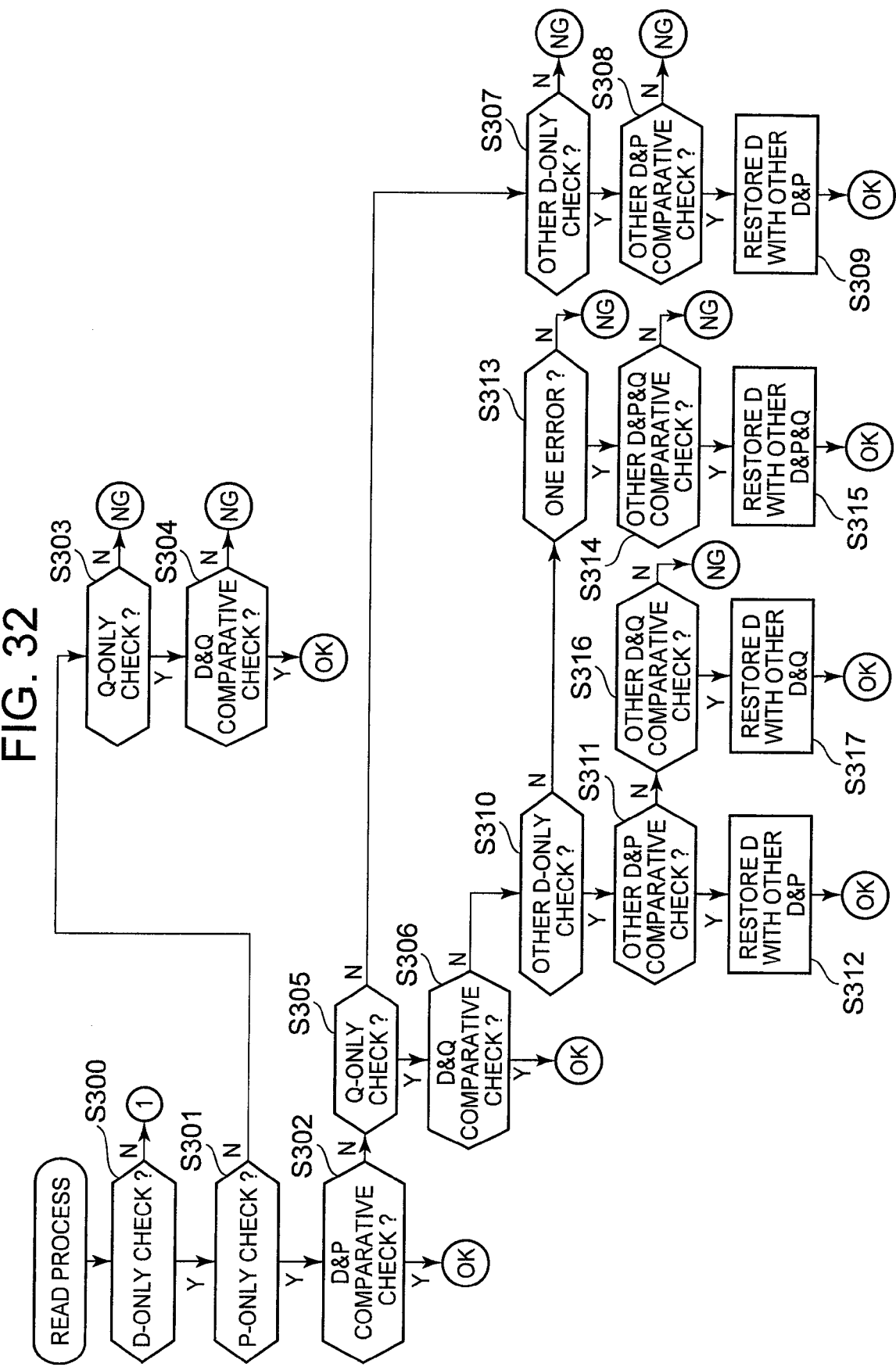
FIG. 32 is a flowchart showing a read process in the RAID 6 P+Q method.

A read process will be explained based on FIGS. 32 through 34. Furthermore, to conserve paper, the step for determining whether or not data is stored in the cache memory, the step for carrying out staging, and the step for changing the attributes of the data and parity will be omitted from the explanation.

Further, for the sake of conserving paper, the contents of processing will be expressed in simplified terms in the flowcharts. A number of these simplified expressions will be explained in advance. "D-only check" signifies checking the correctness of the data based solely on the first data guarantee code. In the following explanation, this may be called the data-only check.

Similarly, a "P-only check" signifies checking the correctness of P-parity based solely on the P-parity guarantee code, and a "Q-only check" signifies checking the correctness of Q-parity based solely on the Q-parity guarantee code. In the following explanation, these may be called the P-parity-only check and the Q-parity-only check.

"Other D-only check" signifies checking the correctness of the prescribed-data based solely on the first data guarantee code configured in this prescribed-data for other data (prescribed-data) belonging to the same stripe. In the following explanation, this may be called the prescribed-data-only check.

Furthermore, "D&P comparative check" signifies comparatively checking the first data guarantee code configured in the data and the second data guarantee code configured in P-parity. In the following explanation, this may be called a data-and-P-parity-based comparative check. "D&Q comparative check" signifies comparatively checking the first data guarantee code configured in data and the second data guarantee code configured in Q-parity. In the following explanation, this may be called a data-and-Q-parity-based comparative check.

As for the execution order of the P-parity-only check and Q-parity-only check described hereinbelow, either can be performed first. Also, either the data-and-P-parity-based comparative check or the data-and-Q-parity-based comparative check can be performed first, or these checks can be performed at the same time. Furthermore, when either the P-parity or Q-parity is incorrect, in addition to responding to the host 20, the incorrect parity can also be restored from the data.

"OK" in the flowcharts signifies that processing ended normally, and "NG" signifies that processing did not end normally. The contents of both of these are shown in FIG. 34.

Figure 33:
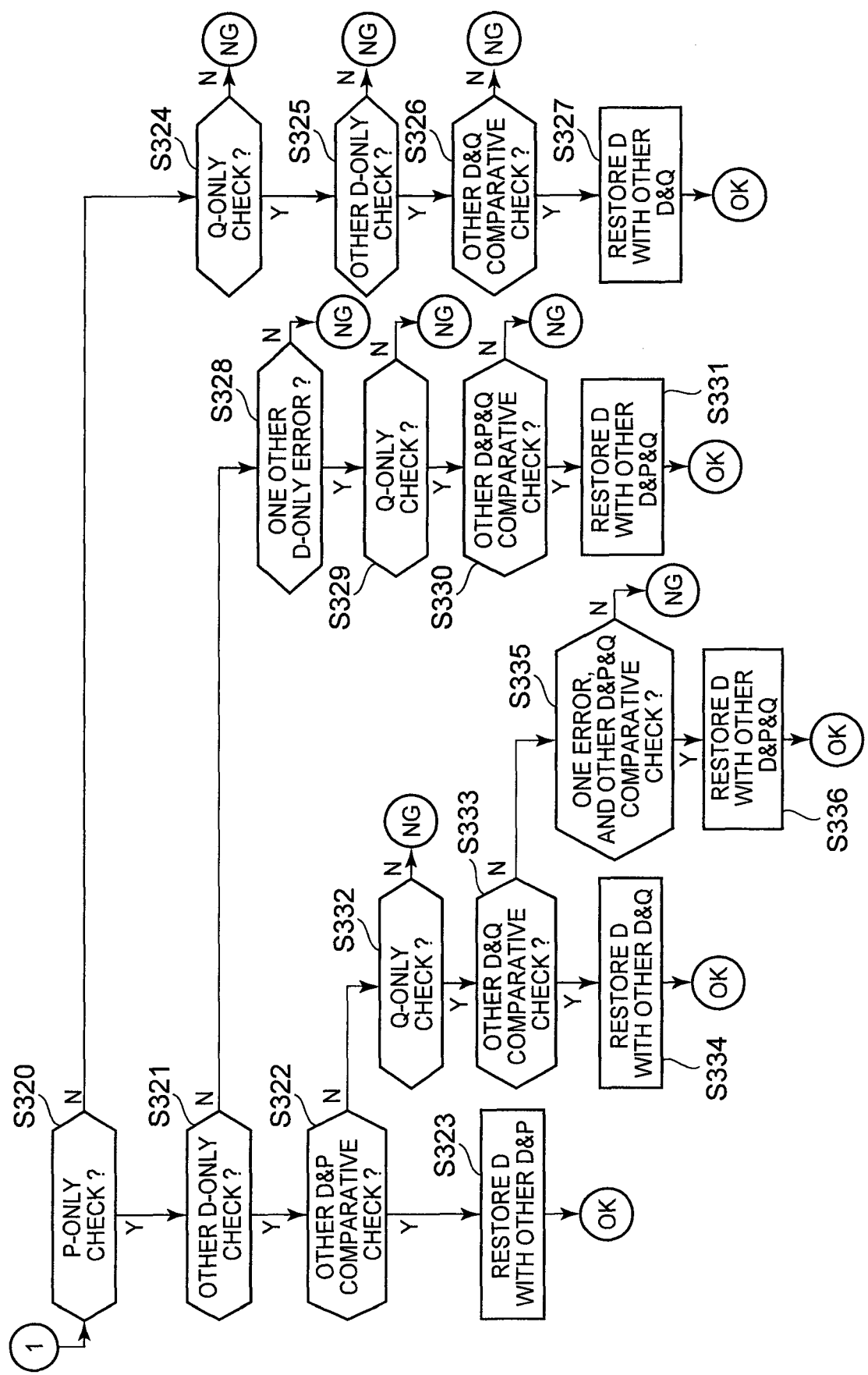
FIG. 33 is a continuation flowchart of FIG. 32.
Figure 34:
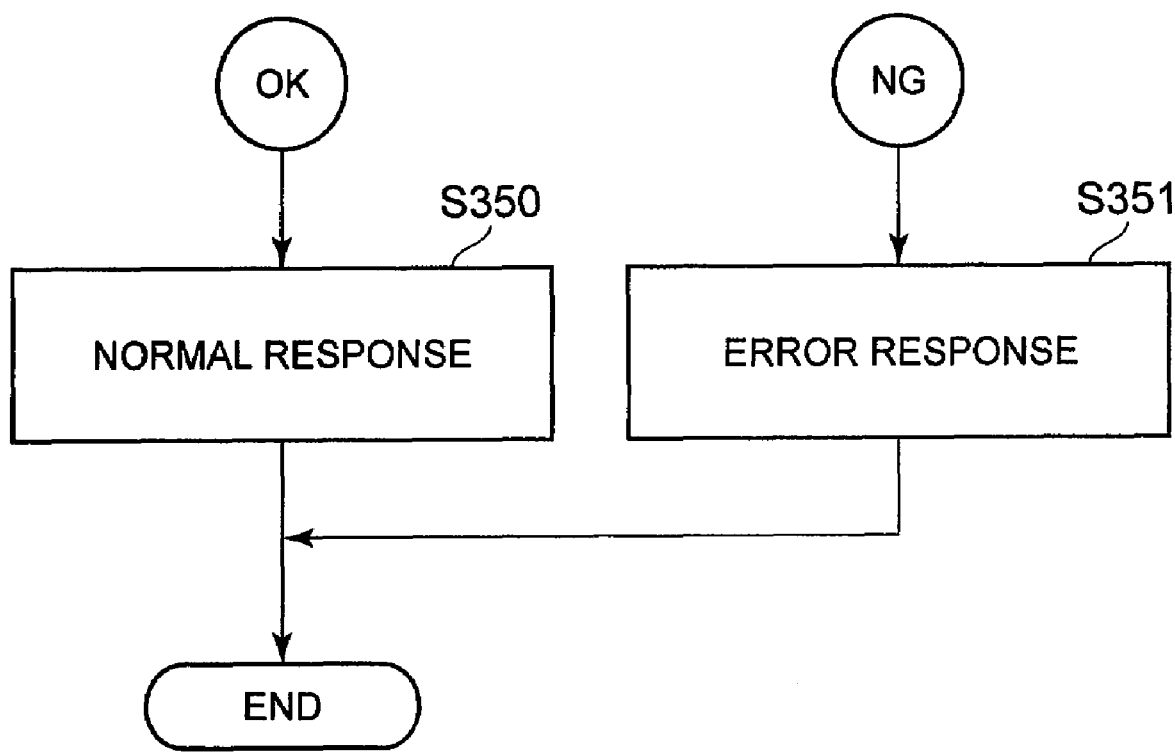
FIG. 34 is another continuation flowchart of FIG. 32.

Returning to the explanation of the read process, the controller checks the data alone based on the first data guarantee code (S300), and if the data is incorrect, moves to FIG. 33 by way of connector (1). The processing of FIG. 33 will be explained below. When this data is determined to be correct based on the results of the data-only check (S300: YES), the controller uses the P-parity guarantee code to check the correctness of the P-parity related to this data (S301). When the P-parity is correct (S301: YES), the controller performs a comparative check in use of the data and P-parity (S 302) and determines the presence or absence of a failure. When the failure is not detected (S302: YES), processing ends normally. As shown in FIG. 34, the controller sends the data to the host 20 (S350).

When it is determined that P-parity is incorrect (S301: NO), the controller performs a Q-parity-only check (S303), and also carries out a data-and-Q-parity-based comparative check (S304). That is, even if the P-parity is incorrect, when a correct Q-parity exists (S303: YES), and the first data guarantee code and the second data guarantee code configured in the Q-parity match (S304: YES), a determination can be made that a failure did not occur in the target-data. In this case, the controller sends the data to the host 20, and ends the read process normally (S350).

When the Q-parity guarantee code is incorrect (S303: NO), and the first data guarantee code does not match the second data guarantee code appended to the Q-parity (S304: NO), the data cannot be restored on the basis of RAID 6. Accordingly, the controller sends an error response to the host 20 (S351).

When the first data guarantee code and the second data guarantee code appended to the P-parity do not match (S302: NO), the controller checks the Q-parity alone (S305), and if the Q-parity is correct (S305: YES), carries out a data-and-Q-parity-based comparative check (S306). If the first data guarantee code and the second data guarantee code appended to the correct Q-parity match (S306: YES) the controller determines that the target-data is correct, and sends this data to the host 20 (S350).

That is, since two types of parity, P-parity and Q-parity, are made correspondent to the data, even if a failure is detected by a comparative check using either one of the P-parity or Q-parity, the data is determined to be correct when a failure is not detected by a comparative check using the other parity.

When it is determined that Q-parity is incorrect based on the results of a Q-parity-only check (S305: NO), the controller performs a prescribed-data-only check (S307), and also carries out a prescribed-data-and-P-parity-based comparative check (S308).

When there is no failure in the prescribed-data (S307: YES, S308: YES), the controller restores the target-data on the basis of the prescribed-data and the P-parity (S309), and sends the restored data to the host 20 (S350).

When the first data guaranteed code of the prescribed-data is incorrect (S307: NO), and the first data guarantee code and second data guarantee code related to the prescribed-data do not match (S308: NO), it is not possible to restore the target-data. Accordingly, the controller sends an error response to the host 20 (S351).

When the first data guarantee code and the second data guarantee code appended to the Q-parity do not match (S306: NO), the controller carries out data-only checks of the respective other data (prescribed-data) managed by the same parity as the target-data (S310). When the first data guarantee code appended to the prescribed-data is correct (S310: YES), the controller compares the first data guarantee code of the prescribed-data against the prescribed-data-related second data guarantee code, which is appended to the P-parity (S311).

If it is confirmed that a failure has not occurred in the prescribed-data (S311: YES), the controller restores the target-data on the basis of the prescribed-data and P-parity (S312). The controller sends the restored data to the host 20 (S350). Furthermore, upon restoring the data, the controller sends this data to the host, and also writes the restored data to the storage devices 210. The same holds true for the following explanation as well.

When the first data guarantee code of the prescribed-data is incorrect (S310: NO), the controller determines whether or not an error occurred in only one prescribed-data (S313). When there are errors in two or more prescribed-data (S313: NO), it is not possible to restore the target-data using the RAID 6 mechanism. In this case, the controller sends an error response to the host (S351).

When an error occurred in only one prescribed-data (S313: YES), the controller compares the first data guarantee code appended to the prescribed-data in which an error did not occur against the second data guarantee code appended to the P-parity and the second data guarantee code appended to the Q-parity (S314).

If it is determined that a failure did not occur in a prescribed-data for which no error was detected (S314: YES), the controller restores the target-data on the basis of the prescribed-data for which an error was not detected, the P-parity and the Q-parity (S315). The controller sends the restored target-data to the host 20 (S350). When the determination in S314 is NO, the controller sends an error response to the host 20 (S351).

When the first data guarantee code of the prescribed-data and the second data guarantee code of the prescribed-data appended to the P-parity do not match (S311: NO), the controller determines whether or not the first data guarantee code of the prescribed-data matches the second data guarantee code of the prescribed-data appended to the Q-parity (S316). When the first data guarantee code and second data guarantee code of the prescribed-data do not match (S316: NO), the controller sends an error response to the host 20 (S351).

When the first data guarantee code of the prescribed-data and the second data guarantee code of the prescribed-data appended to the Q-parity match (S316: YES), the controller restores the target-data on the basis of the prescribed-data and Q-parity (S317). The controller sends the restored data to the host 20, and writes this restored data to the storage devices 210 (S350).

Refer to FIG. 33. When an error is detected in the first data guarantee code of the read-targeted data in S300 of FIG. 32 (S300: NO), the controller checks the P-parity guarantee code (S320).

When the P-parity guarantee code is correct (S320: YES), the controller checks the first data guarantee code of the prescribed-data (S321). Furthermore, the controller compares this first data guarantee code against the second data guarantee code appended to the P-parity for the prescribed-data (S322).

When the first data guarantee code of the prescribed-data and the second data guarantee code of the prescribed data appended to the P-parity match (S322: YES), the controller restores the target-data on the basis of the prescribed-data and the P-parity (S323). The controller sends the restored data to the host 20, and writes the restored data to the storage devices 210 (S350).

When the P-parity guarantee code is incorrect (S320: NO), the controller checks the Q-parity guarantee code (S324). If the Q-parity is incorrect (S324: NO), this means that both the P-parity and Q-parity are in error, and the controller therefore sends an error response to the host 20 (S351).

When the Q-parity is normal (S324: YES), the controller checks the first data guarantee code of the prescribed-data (S325). If any of the prescribed-data are incorrect (S325: NO), the controller sends an error response to the host 20 (S351).

When the prescribed-data is normal (S325: YES), the controller determines whether or not the first data guarantee code and the second data guarantee code appended to the Q-parity relative to the prescribed-data match (S326).

When the first data guarantee code of the prescribed-data and the second data guarantee code of the prescribed-data appended to the Q-parity do not match (S326: NO), the controller sends an error response to the host 20 (S350).

When the first data guarantee code of the prescribed-data and the second data guarantee code of the prescribed-data appended to the Q-parity match (S326: YES), the controller restores the target-data on the basis of the prescribed-data and the Q-parity (S327).

When it is determined in accordance with the first data guarantee code of the prescribed-data that the prescribed-data is incorrect (S321: NO), the controller determines whether or not only one prescribed-data is incorrect (S328). When two or more prescribed-data are incorrect (S328: NO), the controller sends an error response to the host 20 (S351).

When only one prescribed-data is incorrect (S328: YES), the controller checks the Q-parity based on the Q-parity guarantee code (S329). When the Q-parity is not normal (S329: NO), the controller sends an error response to the host 20 (S351).

When the Q-parity is normal (S329: YES), the controller restores the target-data on the basis of the normal prescribed-data, the P-parity and the Q-parity (S330). The controller sends the restored data to the host 20, and writes the restored data to the storage device 210 (S350).

If the first data guarantee code of the prescribed-data, and the second data guarantee code of the prescribed-data appended to the P-parity do not match (S322: NO), the controller determines whether or not the Q-parity is normal based on the Q-parity guarantee code (S332). If the Q-parity is not normal (S332: NO), the controller sends an error response to the host 20 (S351).

When the Q-parity is normal (S332: YES), the controller determines whether or not the first data guarantee code of the prescribed-data and the second data guarantee code of the prescribed-data appended to the Q-parity match (S333). When the first data guarantee code and second data guarantee code related to the prescribed-data match (S333: YES), the controller restores the target-data on the basis of the prescribed-data and the Q-parity (S334). The controller sends the restored data to the host 20, and writes the restored data to the storage device 210 (S350).

When the first data guarantee code of the prescribed-data and the second data guarantee code of the prescribed-data appended to the Q-parity do not match (S333: NO), the controller respectively determines whether or not there is only one incorrect prescribed-data, and whether or not the first data guarantee codes of the normal prescribed-data match the second data guarantee codes respectively appended to the P-parity and Q-parity (S335).

When either two or more incorrect prescribed-data exist, or the first data guarantee codes do not match the second data guarantee codes (S335: NO), the controller sends an error response to the host 20 (S351).

When there is only one incorrect prescribed-data, and the first data guarantee codes and second data guarantee codes related to the normal prescribed-data match (S335: YES), the controller restores the target-data on the basis of the normal prescribed-data, P-parity and Q-parity (S336). The controller sends the restored data to the host 20, and writes the restored data to the storage devices 210 (S350).

Figure 35:
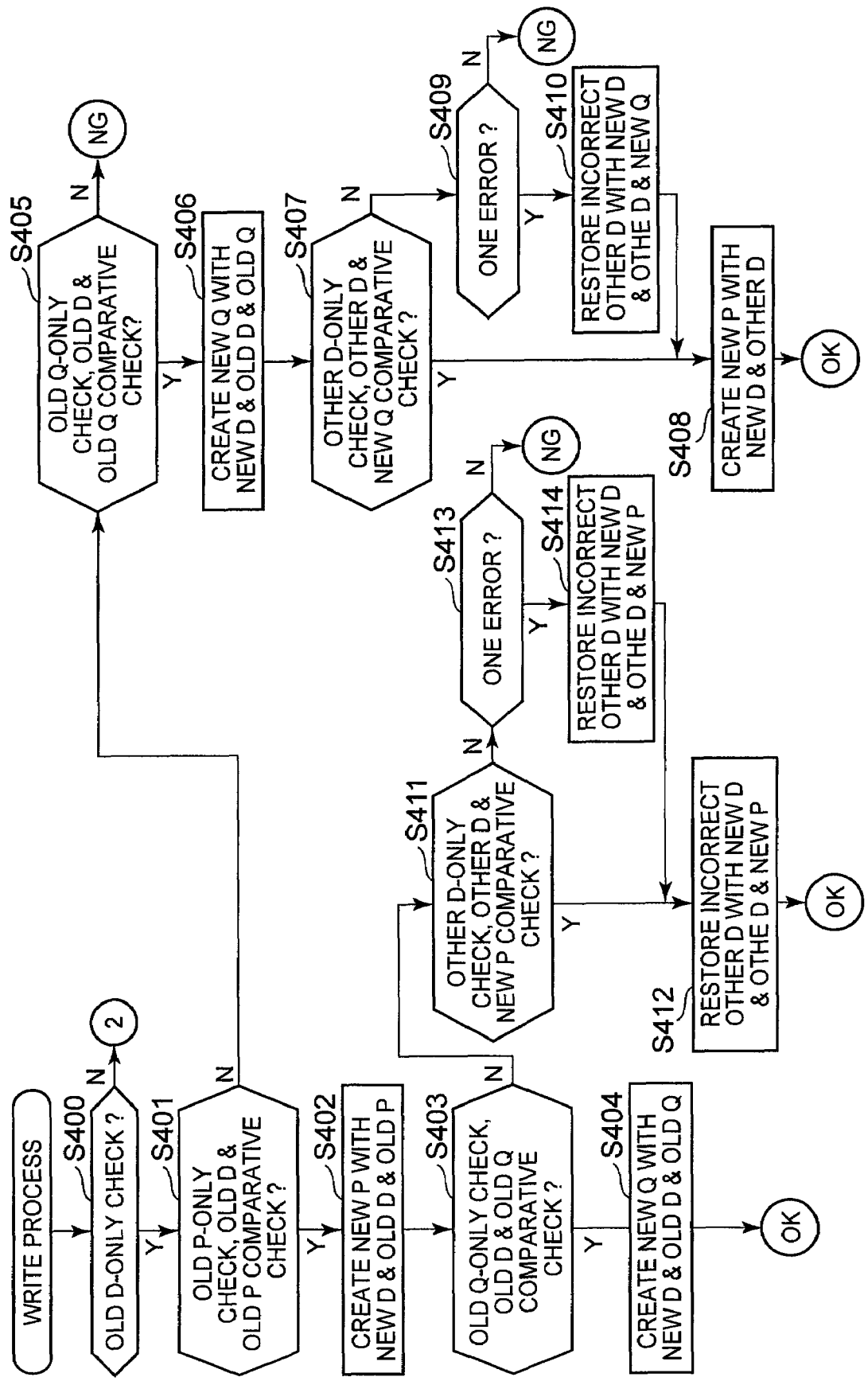
FIG. 35 is a flowchart showing a write process in the RAID 6 P+Q method.
Figure 36:
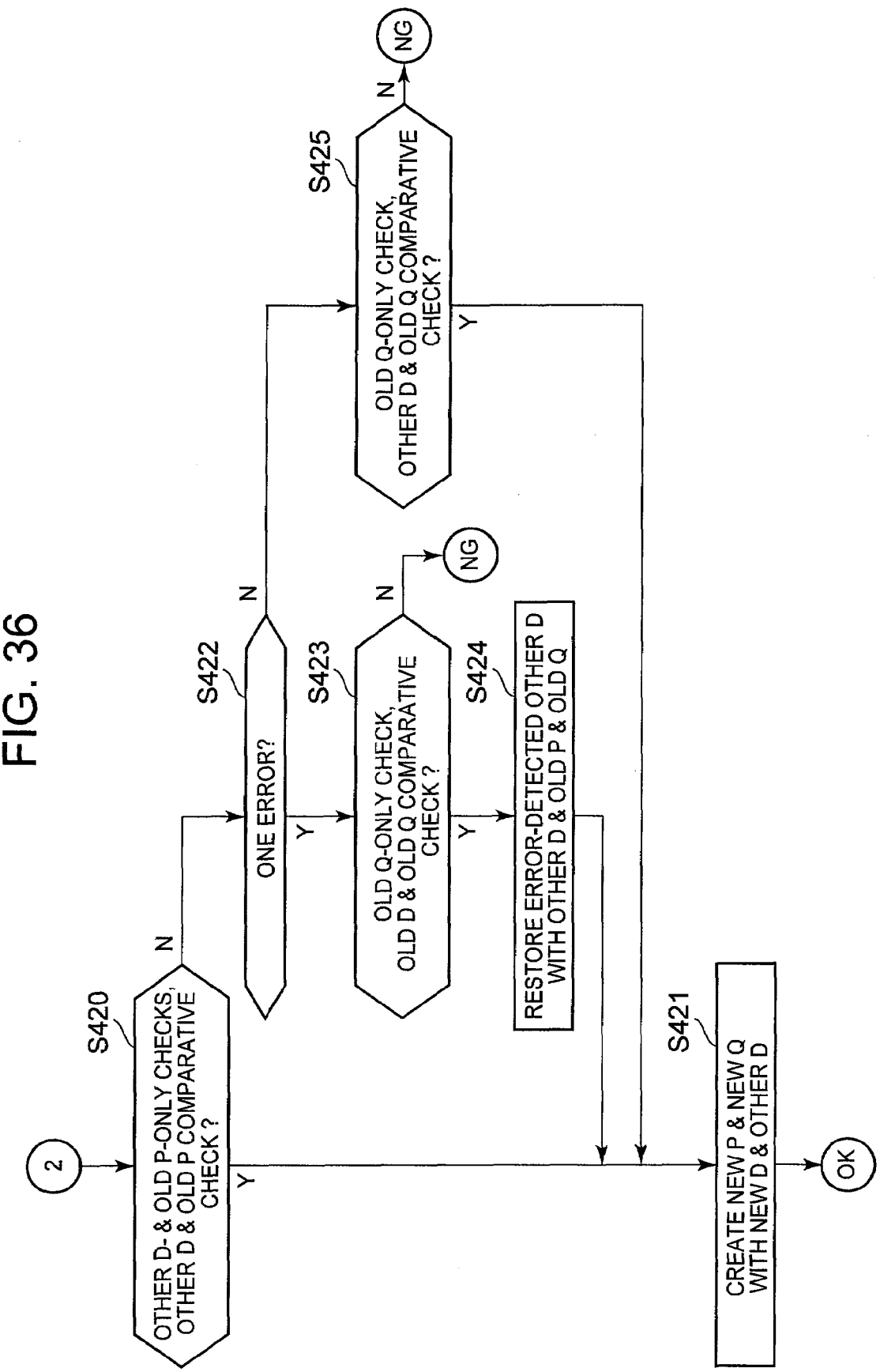
FIG. 36 is a continuation flowchart of FIG. 35.

FIGS. 35 and 36 are flowcharts showing a write process. First, the controller checks the old data alone based on the first data guarantee codes appended to the old data (S400). When the first data guarantee codes of the old data are incorrect (S400: NO), that is, when the old data is incorrect (S400: NO), processing moves to the flowchart shown in FIG. 36 by way of connector (2). This flowchart will be explained below.

When the old data is determined to be normal (S400: YES), the controller carries out a parity-only check on the old P-parity, and an old-data-and-old-P-parity-based comparative check (S401). That is, the controller confirms that an error has not occurred in the old P-parity on the basis of the old P-parity guarantee code appended to the old P-parity, and determines whether or not the first data guarantee codes of the old data match the second data guarantee codes appended to the old P-parity (S401).

When the old data and the old P-parity have been confirmed to be correct (S401: YES), the controller creates a new P-parity based on the new data, and the old data and P-parity (S403).

The controller determines whether or not an error has occurred in the old Q-parity based on the old Q-parity guarantee code, and also determined whether or not the first data guarantee codes of the old data match the second data guarantee codes appended to the old Q-parity (S403).

When the lack of a failure in the old Q-parity has been confirmed (S403: YES), the controller creates a new Q-parity on the basis of new data, old data, and the old Q-parity (S404). Then, the controller notifies the host 20 to the effect that the write process has ended normally, and ends the write process normally.

Furthermore, when the write process ends normally, "OK" is shown in the figure. When the write process does not end normally, "NG" is shown in the figure. In the case of "NG", the controller sends an error response to the host 20.

Either when an error exists in the old P-parity guarantee code, or when the first data guarantee codes of the old data do not match the second data guarantee codes appended to the old P-parity (S401: NO), in either case, the controller checks the old Q-parity alone, and checks whether or not the first data guarantee codes of the old data match the second data guarantee codes appended to the old Q-parity (S405).

Either when an error exists in the old Q-parity, or when the first data guarantee codes of the old data do not match the second data guarantee codes appended to the old Q-parity (S405: NO), in either case, the controller sends an error response to the host 20.

When the old parity guarantee code is correct, and the first data guarantee codes of the old data match the second data guarantee codes appended to the old Q-parity (S405: YES), the controller creates a new Q-parity on the basis of new data, old data, and the old Q-parity (S406).

The controller checks whether or not the first data guarantee codes of the prescribed-data are correct, and checks whether or not the first data guarantee codes of the prescribed-data match the second data guarantee codes appended to the new Q-parity (S407).

When the first data guarantee codes of the prescribed-data are correct, and the first data guarantee codes of the prescribed-data match the second data guarantee codes appended to the new Q-parity (S407: YES), the controller creates a new P-parity on the basis of the new data and prescribed-data (S408), and ends the write process normally.

Either when an error exists in the first data guarantee codes of the prescribed-data, or when the first data guarantee codes of the prescribed-data do not match the second data guarantee codes appended to the new Q-parity (S407: NO), in either case, the controller determines whether or not there is only one incorrect prescribed-data (S409).

When there are two or more incorrect prescribed-data (S409: NO), the controller sends an error response to the host 20. When there is only one incorrect prescribed-data (S409: YES), the controller restores the prescribed-data in which the error occurred to new data on the basis of the new data, the normal prescribed-data, and the new Q-parity (S410). The controller creates a new P-parity on the basis of the new data and the prescribed-data (S408).

Either when the old Q-parity guarantee code is incorrect, or when the first data guarantee codes of the old data do not match the second data guarantee codes appended to the old Q-parity (S403: NO), in either case, the controller carries out a prescribed-data-only check, and carries out a prescribed-data-and-new-P-parity-based comparative check (S411).

When there is no error in the prescribed-data, and the first data guarantee codes of the prescribed-data match the second data guarantee codes appended to the new P-parity (S411: YES), the controller creates a new Q-parity on the basis of the new data and prescribed-data (S412).

Either when an error has occurred in the prescribed-data, or when the first data guarantee codes of the prescribed-data do not match the second data guarantee codes appended to the new P-parity (S411: NO), in either case, the controller determines whether or not there is only one prescribed-data in which the error was detected (S413).

When there are two or more incorrect prescribed-data (S413: NO), the controller sends an error response to the host 20. When there is only one incorrect prescribed-data (S413: YES), the controller restores the prescribed-data in which the error occurred on the basis of the new data, the normal prescribed-data, and the new P-parity (S414). Then, the controller moves to S412, and ends the write process normally.

Refer to FIG. 36. When an error is detected in the first guarantee codes of the old data (S400: NO), processing moves to the flowchart of FIG. 36 by way of connector (2). The controller carries out a prescribed-data-only check, and carries out an old P-parity-only check, and also carries out a prescribed-data-and-old-P-parity-based comparative check (S420). That is, in S420, the controller respectively determines whether or not the first data guarantee codes of the prescribed-data are correct, whether or not the P-parity guarantee code of the old P-parity is correct, and whether or not the first data guarantee codes of the prescribed-data match the second data guarantee codes appended to the old P-parity.

When the respective checks of S420 have all been satisfied (S420: YES), the controller respectively creates a new P-parity and a new Q-parity in accordance with the new data and prescribed-data (S421), and ends the write process normally.

If any one of the respective checks in S420 is not satisfied (S420: NO), the controller determines whether or not there is only one prescribed-data in which an error was detected (S422). When there is only one incorrect prescribed-data (S422: YES), the controller carries out a old Q-parity-only check, and carries out an old-data-and-old-Q-parity-based comparative check (S423). That is, in S423, the controller checks whether or not the Q-parity guarantee code of the old Q-parity is correct, and checks whether or not the first data guarantee codes of the old data match the second data guarantee codes appended to the old Q-parity.

When the respective checks of S423 have all been satisfied (S423: YES), the controller restores the prescribed-data in which the error was detected on the basis of the normal prescribed-data, old P-parity, and old Q-parity (S424), moves to S421, and ends the write process normally. By contrast, when any one of the respective checks in S423 are not satisfied (S423: NO), the controller sends an error response to the host 20.

In S422, when errors are detected in two or more prescribed-data (S422: NO), the controller respectively determines whether or not the Q-parity guarantee code of the old Q-parity is correct, and whether or not the first data guarantee codes of the prescribed-data match the second data guarantee codes appended to the old Q-parity (S425).

When the respective checks of S425 are all satisfied (S425: YES), the controller moves to S421 and ends the write process normally. When any one of the respective checks of S425 is not satisfied (S425: NO), the controller sends an error response to the host 20.

This embodiment, which is constituted like this, also exhibits the same effects as the first embodiment. Furthermore, since this embodiment applies RAID 6, which uses a P-parity and a Q-parity created from the same data, reliability is enhanced compared to when RAID 5 is used.

Sixth Embodiment

Figure 37:
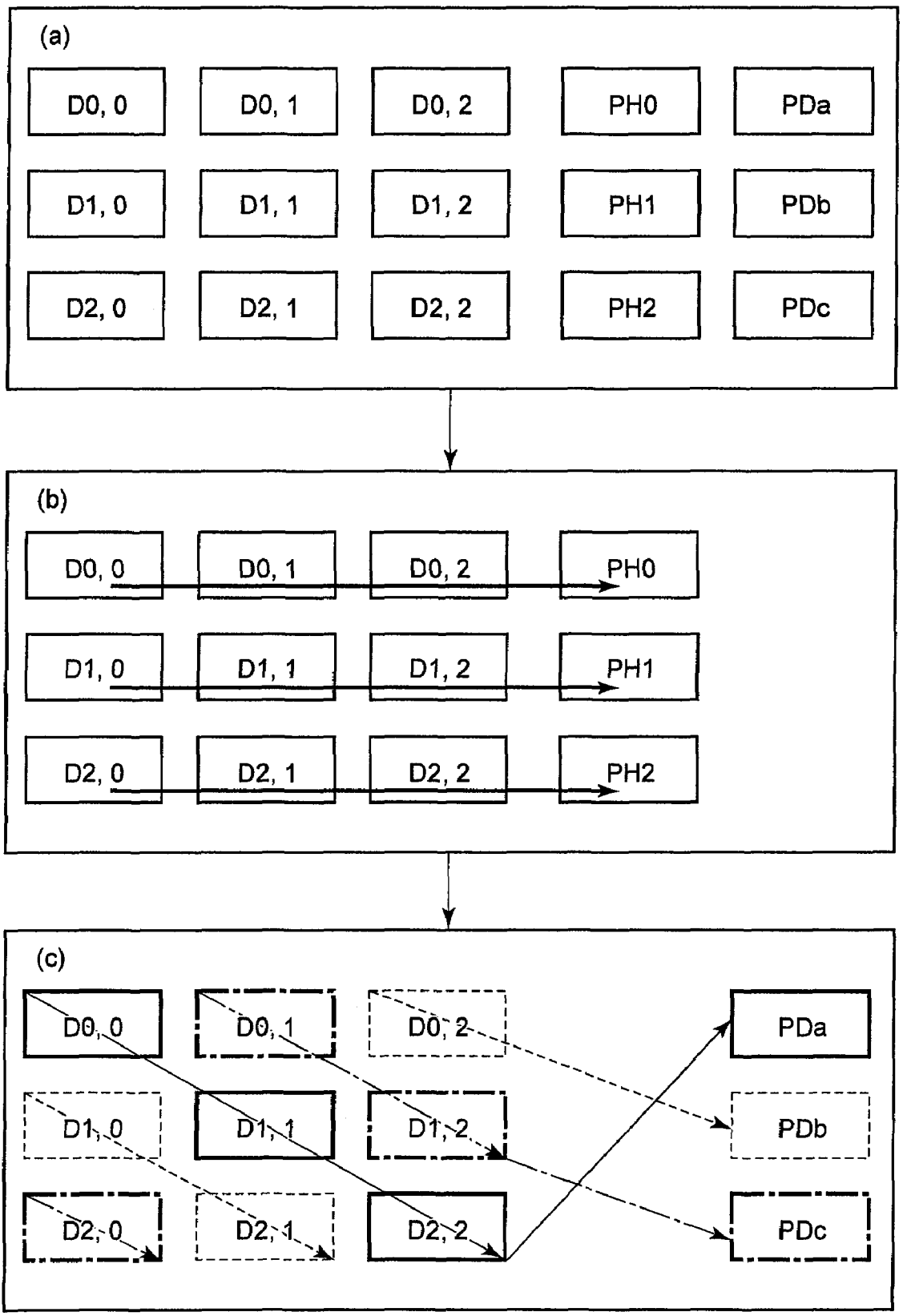
FIG. 37 is a schematic diagram showing a RAID 6 2D-XOR method applied in a storage controller related to a sixth embodiment.
Figure 38:
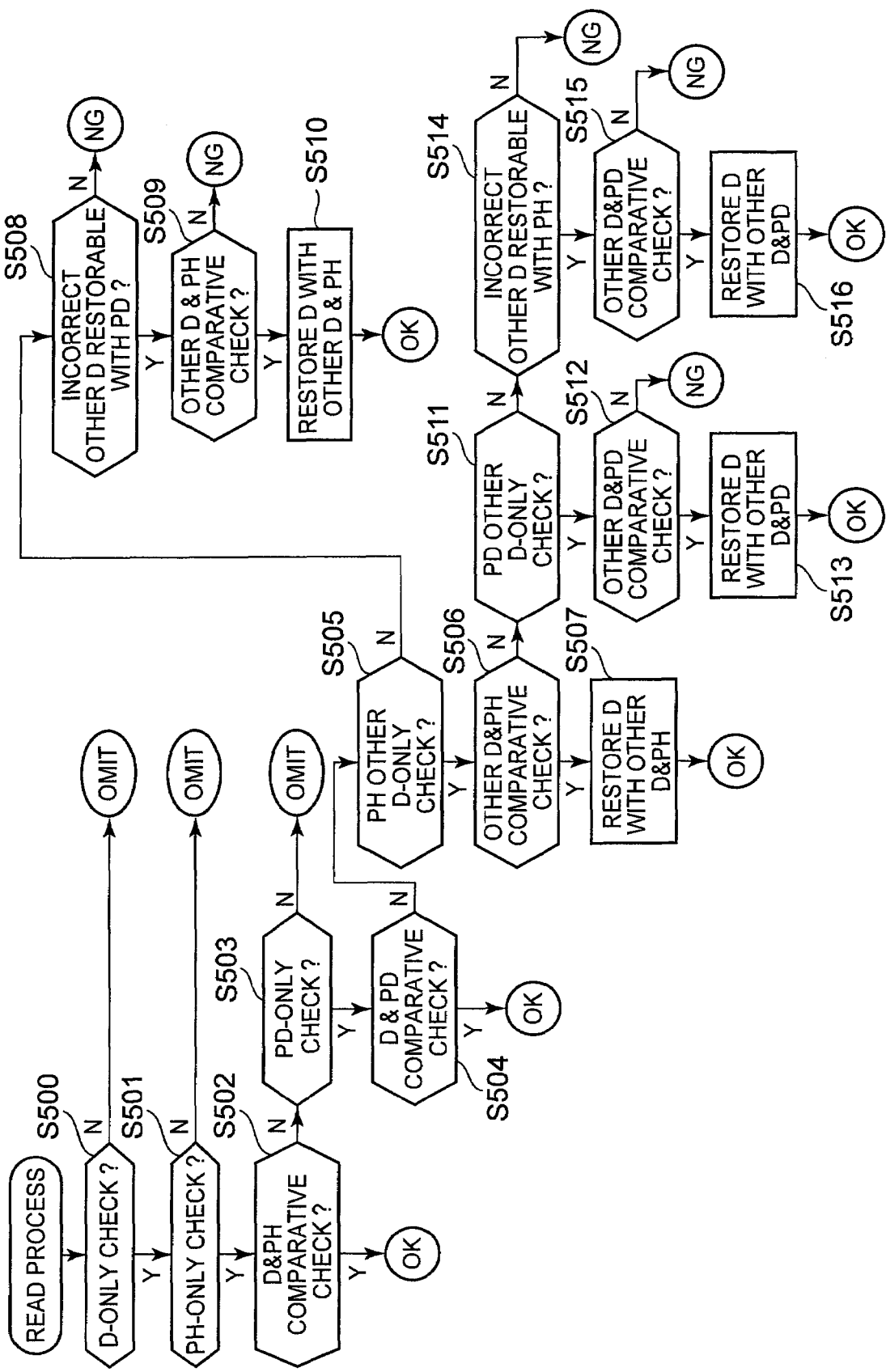
FIG. 38 is a flowchart showing a read process.

A sixth embodiment will be explained based on FIGS. 37 and 38. FIG. 37 is a schematic diagram showing the RAID 6 method utilized in this embodiment. As shown in FIG. 37A, two types of parities are used in this method, a horizontal-parity (PH) and a diagonal-parity (PD).

As shown in FIG. 37B, the horizontal-parity (PH) is created on the basis of data in a stripe the same as the P-parity and Q-parity described in the fifth embodiment. As shown in FIG. 37C, the diagonal-parity (PD) is created across a plurality of storage devices and a plurality of stripes.

That is, the data, which is used as the respective bases for the horizontal-parity and diagonal-parity, differ. Therefore, when two errors occur in the stripe of the horizontal-parity, it is possible to restore one error by using the diagonal-parity, and thereafter, to restore the other error by using the horizontal-parity. Similarly, when two errors occur in the diagonal stripe, which constitutes the basis of the diagonal-parity, it is possible to restore one error by using the horizontal-parity, and thereafter, to restore the other error by using the diagonal-parity.

A read process will be explained while referring to FIG. 38 so as to clarify the differences between the "P+Q" method described in the fifth embodiment, and the "2D–XOR" method to be described in this embodiment. The parts omitted in the flowchart of FIG. 38 can be readily understood and put into practice by a so-called person having an ordinary skill in the art based on technical knowhow related to the disclosures of the fifth embodiment and the "2D–XOR" method.

In a horizontal-parity (PH), second data guarantee codes related to all the data in the stripe that constitutes the basis of the horizontal-parity are made correspondent to the horizontal-parity guarantee code for detecting whether or not the horizontal-parity is normal. Hereinafter, horizontal-parity will be called PH-parity.

In a diagonal-parity (PD), the second guarantee codes related to all the data in the diagonal stripe constituting the basis of the diagonal-parity are made correspondent to the diagonal-parity guarantee code for detecting whether or not the diagonal-parity is normal. Hereinafter, diagonal-parity will be called PD-parity.

The controller checks the first data guarantee codes of the target-data, and determines whether or not an error has occurred in the target-data (S500). The processing when an error is detected in the target-data will be omitted.

When an error is not detected in the target-data (S500: YES), the controller determines whether or not the PH-parity guarantee code is correct (S501). The processing when an error is detected in the PH-parity will be omitted.

When an error is not detected in the PH-parity (S501: YES), the controller determines whether or not the first data guarantee codes of the target-data match the second data guarantee codes appended to the PH-parity (S502).

When the first data guarantee codes of the target-data match the second data guarantee codes of the PH-parity (S502: YES), the controller sends the target-data to the host 20, and ends the read process normally.

When the first data guarantee codes of the target-data do not match the second data guarantee codes of the PH-parity (S502: NO), the controller checks if the PD-parity guarantee code is correct (S503). The processing when an error has occurred in the PD-parity will be omitted. When an error is not detected in the PD-parity (S503: YES), the controller determines whether or not the first data guarantee code of the target-data matches the second data guarantee code appended to the PD-parity related to this targeted data (S504).

When the first data guarantee code of the target-data matches the second data guarantee code appended to the PD-parity (S504: YES), the controller sends the target-data to the host 20, and ends the read process normally.

When the first data guarantee code of the target-data does not match the second data guarantee code appended to the PD-parity (S504: NO), the controller checks the first data guarantee codes of the prescribed-data for the PH-parity-related prescribed-data (all the other data in the stripe constituting the basis of the PH-parity) (S505).

If an error is not detected in the first data guarantee codes of the prescribed-data related to the PH-parity (S505: NO), the controller determines whether or not the first data guarantee codes of the prescribed-data related to the PH-parity match the second data guarantee codes of the PH-parity (S506). When the two data guarantee codes match (S506: YES), the controller restores the target-data on the basis of the prescribed-data related to the PH-parity and the PH-parity (S507). The controller sends the restored target-data to the host 20, and ends the read process. The restored data is written to the storage devices 210.

In S505, when an error is detected in the prescribed-data related to the PH-parity (S505: NO), the controller determines whether or not the prescribed-data in which the error was detected can be restored using the PD-parity (S508). When the error cannot be restored using the PD-parity (S508: NO), the controller sends an error response to the host 20.

When the prescribed-data in which the error was detected (the prescribed-data related to the PH-parity, and the prescribed-data in which the error was detected by the first data guarantee codes) can be restored using the PD-parity (S508: YES), the controller determines whether or not the first data guarantee codes of the prescribed-data match the second data guarantee codes of the PH-parity (S509).

When the two data guarantee codes do not match (S509: NO), the controller sends an error response to the host 20. When the two data guarantee codes match (S509: YES), the controller restores the target-data on the basis of the prescribed-data related to the PH-parity and the PH-parity (S510). The controller sends the restored data to the host 20. The restored data is written to the storage devices 210. In S506, when the first data guarantee codes of the prescribed-data related to the PH-parity do not match the second data guarantee codes appended to the PH-parity (S506: NO), the controller checks if the first data guarantee codes of the prescribed-data related to the PD-parity are correct (S511).

If there is no error in the first data guarantee code (S511: YES), the controller determines whether or not the first data guarantee codes of the prescribed-data related to the PD-parity match the second data guarantee codes appended to the PD-parity (S512). When the two data guarantee codes do not match (S512: NO), the controller sends an error response to the host 20. When the two data guarantee codes match (S512: YES), the controller restores the target-data on the basis of the prescribed-data related to the PD-parity and the PD-parity (S513). The controller sends the restored data to the host 20. The restored data is written to the storage devices 210.

In S511, when an error is detected in the prescribed-data related to the PD-parity (S511: NO), the controller determines whether or not the error on the prescribed-data related to the PD-parity can be restored using the PH-parity (S514).

When the error in prescribed-data related to the PD-parity cannot be restored using the PH-parity (S514: NO), the controller sends an error response to the host 20. When the error in prescribed-data related to the PD-parity can be restored using the PH-parity (S514: YES), the controller determines whether or not the first data guarantee codes of the prescribed-data related to the PD-parity match the second data guarantee codes appended to the PD-parity (S515).

When the two data guarantee codes do not match (S515: NO), the controller sends an error response to the host 20. When the two data guarantee codes match (S515: YES), the controller restores the target-data on the basis of the prescribed-data related to the PD-parity and the PD-parity (S516). The controller sends the restored data to the host 20. The restored data is written to the storage devices 210.

This embodiment, which is constituted like this, also exhibits the same effects as the first embodiment and the fifth embodiment.

Seventh Embodiment

Figure 39:
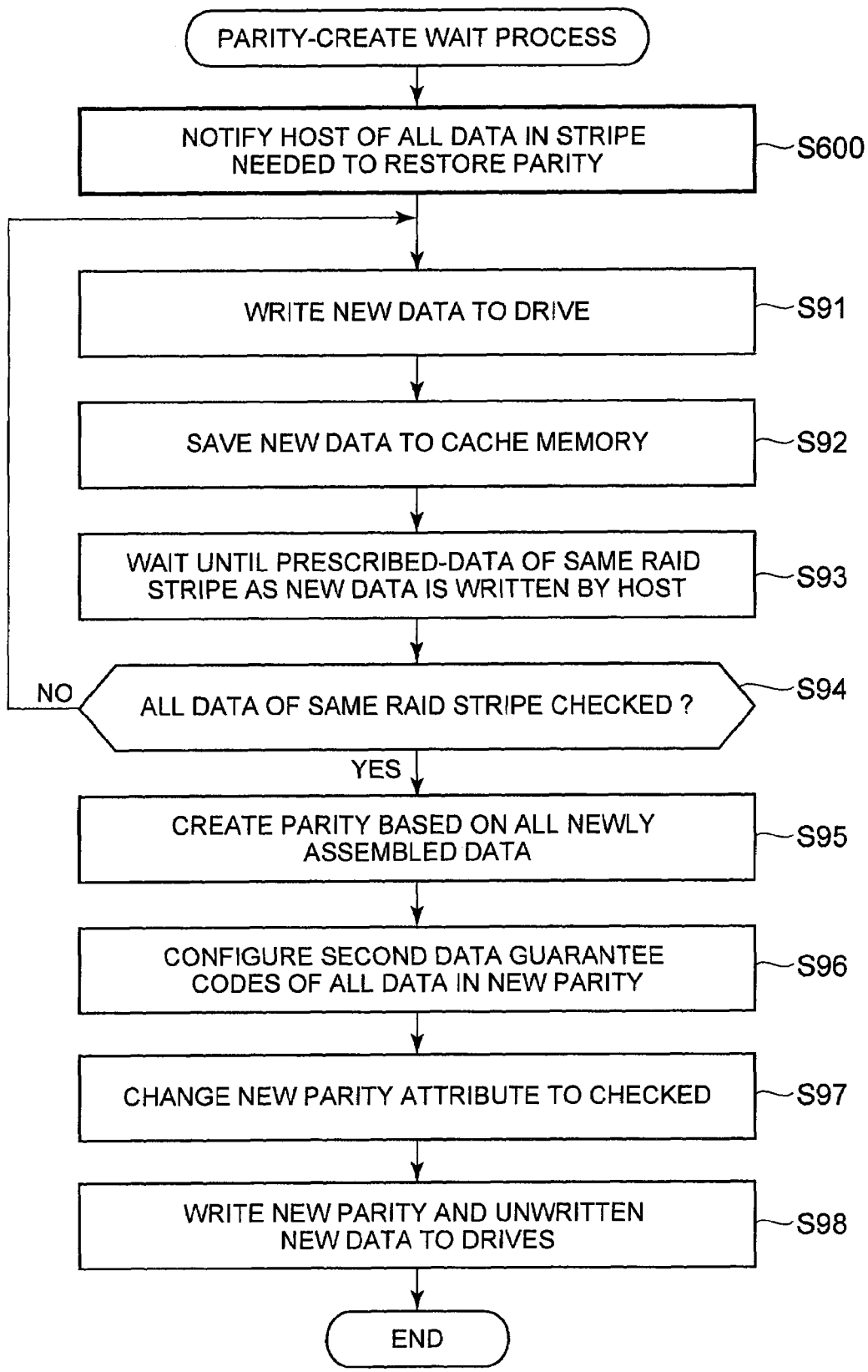
FIG. 39 is a flowchart of a parity-create wait process used by a storage controller related to a seventh embodiment.

A seventh embodiment will be explained based on the flowchart of FIG. 39. FIG. 39 is a flowchart, which improves the parity-create wait process described in FIG. 17. In this embodiment, data needed to restore parity is notified to the host and management server (S600).

That is, in S600, the controller notifies the host of all the data areas in a stripe, which are necessary to create a parity. The areas of all the required data can be shown as an address range. In accordance with this notification, a parity can be created more rapidly if the host writes anew the data deemed as necessary. This embodiment, which is constituted like this, also exhibits the same effects as the above-mentioned first embodiment.

Furthermore, the present invention is not limited to the above-described embodiments. A person having ordinary skill in the art can make various additions and changes without departing from the scope of the present invention.

For example, FIG. 17 describes a case in which, when a failure occurs, a parity is created after all the data in the same stripe has been assembled. However, for example, when there is no longer a free area in the cache memory, or when data in the cache memory is lost due to a power stoppage, it is not possible to wait until all the data in the same stripe is assembled.

Further, the constitution can also be such that, when a failure has been detected, the place where this failure occurred and the nature of the failure are notified to the management server, and the status of the failure is displayed on the screen of the management server.

What is claimed is:

1. A storage controller which inputs/outputs data to/from a storage device in accordance with a request from a computer, comprising:

a check data setting unit, which creates a first check data and second check data on the basis of a first data, and which associates the first check data with the first data and stores the associated first check data in a first storage area in which the first data is stored, and associates the second check data with a second data, which is associated to the first data, and stores the associated second check data in a second storage area; and a checking unit which, if the first data is read out from the first storage area, checks whether or not the first check data read out from the first storage area matches the second check data read out from the second storage area, and which, if the first check data matches the second check data, determines that the first data is correctly read out from the first storage area, and if the first check data and the second check data do not match, detects an occurrence of a failure, wherein the first check data and the second check data respectively comprise update sequence information, which shows an update sequence of the first data stored in the first storage area, and if the first check data and the second check data do not match, the checking unit compares the update sequence information inside the first check data with the update sequence information inside the second check data, determines whether one of the first data and the second date is older than the other, and determines that older data is incorrect data.

2. The storage controller according to claim 1, wherein the update sequence information comprises either one of an update time, which shows the time at which the first data was stored in the first storage area, and a sequence number, which shows order in which the first data has been issued from the computer.

3. The storage controller according to claim 1, wherein the update sequence information comprises both the update time, which shows time at which the first data has been stored in the first storage area, and the sequence number, which shows order in which the first data has been issued from the computer, and the checking unit, determines whether one of the first data and the second data is older than the other based on update time in the first check data and update time in the second check data, and furthermore, if the update time in the first check data and the update time in the second check data are the same time, determines that data with smaller sequence numbers is older based on the sequence number in the first check data and the sequence number in the second check data.

4. The storage controller according to claim 1, wherein the check data setting unit creates the first check data and the second check data as the same data.

5. The storage controller according to claim 1, wherein the check data setting unit creates the second check data from a portion of the first check data.

6. The storage controller according to claim 1, wherein a plurality of the respectively different first data exist in the same stripe, and the second data is created as parity data of the respective first data.

7. The storage controller according to claim 6, further comprising:

a restore unit which, if the checking unit detects a failure, restores the failure in use of the second data;

wherein the restore unit uses the plurality of first data and the second data in accordance with Redundant Array of Inexpensive Disks (RAID) and restores either one or both of the first data for which a read is requested by the computer, or the second data which should be updated in accordance with the first data for which an update is requested by the computer.

8. The storage controller according to claim 7, wherein, if the computer requests update of the first data stored in the first storage area and the failure, which is determined to be unrecoverable by use of RAID (Redundant Array of Independent Disks) processing, is detected, the restore unit stores new first data received from the computer in the first storage area until all new first data are assembled in the same stripe, and if all the new first data have been assembled in the same stripe, creates the second data on the basis of these respective first data.

9. The storage controller according to claim 8, wherein the restore unit notifies the computer of all the new first data in the same stripe, which are necessary for creating the second data.

10. The storage controller according to claim 6, wherein, if the computer requests update of the first data stored in the first storage area, and the failure is detected, the restore unit stores new first data received from the computer in the first storage area until all the new first data are assembled in the same stripe, and if all the new first data have been assembled in the same stripe, creates the second data on the basis of these respective first data.

11. The storage controller according to claim 1, wherein the storage device is constituted as a device for storing new first data in an address that differs from a storage-destination address of a stored first data, and for updating the stored first data with the new first data by changing address mapping.

12. The storage controller according to claim 1, wherein the storage device is constituted as a device for updating the stored first data with the new first data by storing the new first data in the same address as a storage-destination address of the stored first data.

13. A storage device failure detection method, which detects and restores a failure of data stored in a storage device, comprising the steps of:

creating a first check data on the basis of a first data if the first data received from a computer is written to the storage device, associating this first check data correspondent to the first data, and storing the associated first check data in a first storage area;

creating a second check data which is associated with the first check data, associating this second check data with a second data associated with the first data, and storing the associated second check data in a second storage area;

checking whether or not the first check data read out from the first storage area matches the second check data read out from the second storage area if the first data is read out from the first storage area;

determining that the first data was correctly read out from the first storage area if the first check data matches the second check data; and detecting an occurrence of a failure if the first check data does not match the second check data, wherein the first check data and the second check data respectively comprise update sequence information, which shows an update sequence of the first data stored in the first storage area, and if the first check data and the second check data do not match, the update sequence information in the first check data is compared with the update sequence information in the second check data, whether one of the first data and the second data is older than the other is determined, and the occurrence of a failure in the older data is detected.

14. The storage device failure detection method according to claim 13, further comprising:

restoring the failure by using the second data if the failure is detected by a checking unit.

15. A storage controller which operates in accordance with a request from a computer, comprising:

a controller for controlling a plurality of storage devices in accordance with a request from the computer, the controller comprising:

a first communication control unit for communicating with the computer;

a second communication control unit for communicating with the respective storage devices which provide respective storage areas;

a check data setting unit which creates a first check data and a second check data on the basis of a first data received via the first communication control unit from the computer, and which associates the first check data with the first data and stores the associated first check data via the second communication control unit in a first storage area in which the first data is stored, and associates the second check data with parity data which is created based on the first data and other first data in the same stripe, and stores the second check data via the second communication control unit in a second storage area;

a checking unit which checks whether or not the first check data corresponding to the first data read out via the second communication control unit from the first storage area matches the second check data read out via the second communication control unit from the second storage area, and which, if the first check data matches the second check data, determines that the first data was read out correctly from the first storage area, and if the first check data and the second check data do not match, detects an occurrence of a failure; and a restore unit which restores the failure if the checking unit detects the failure, and which, if the failure can be restored on the basis of RAID, restores the first data, in which the failure occurred, on the basis of other first data and parity data in the same stripe, and if the failure cannot be restored on the basis of RAID, stores a new first data received from the computer in the first storage area until all new first data are assembled in the same stripe, and if all the new first data have been assembled in the same stripe, creates a new parity data on the basis of these respective first data.

* * * * *